US012783785B2

(12) United States Patent
Varasano

(10) Patent No.: US 12,783,785 B2
(45) Date of Patent: Nov. 3, 2026

(54) DYSLEXIA TEXT CONVERSION SYSTEM AND METHODS FOR USE THEREWITH

(71) Applicant: Trivium AGI, LLC, Atlanta, GA (US)

(72) Inventor: Jeffrey Varasano, Atlanta, GA (US)

(73) Assignee: Trivium AGI, LLC, Atlanta, GA (US)

( * ) Notice: Subject to any disclaimer, the term of this patent is extended or adjusted under 35 U.S.C. 154(b) by 168 days.

(21) Appl. No.: 18/937,535

(22) Filed: Nov. 5, 2024

(65) Prior Publication Data

US 2025/0061267 A1 Feb. 20, 2025

Related U.S. Application Data

(63) Continuation of application No. 18/659,189, filed on May 9, 2024, now Pat. No. 12,175,184.

(60) Provisional application No. 63/502,158, filed on May 15, 2023.

(51) Int. Cl.
*G06F 40/109* (2020.01)

(52) U.S. Cl.
CPC .................................. *G06F 40/109* (2020.01)

(58) Field of Classification Search
CPC ..................................................... G06F 40/109
USPC .......................................................... 345/467
See application file for complete search history.

(56) References Cited

U.S. PATENT DOCUMENTS

| | | | | |
|---|---|---|---|---|
| 10,372,788 | B2 | 8/2019 | Landau | |
| 2013/0212469 | A1 | 8/2013 | Tian | |
| 2020/0050653 | A1 | 2/2020 | Abu-Huwaij | |
| 2021/0019364 | A1 | 1/2021 | Govindjee et al. | |
| 2021/0183361 | A1* | 6/2021 | Silverzweig ........... | G09B 19/06 |
| 2023/0134226 | A1* | 5/2023 | Souche .................. | A61B 3/032 715/256 |

FOREIGN PATENT DOCUMENTS

| | | | |
|---|---|---|---|
| WO | 2005086118 | A2 | 9/2005 |
| WO | 20230118967 | | 6/2023 |

OTHER PUBLICATIONS

International Searching Authority; International Search Report and Written Opinion; International Application No. PCT/US2024/029028; Sep. 9, 2024; 8 pgs.
KOBI; All the Tools Your Kid Needs on the Path to Reading Fluency; 2023; 6 pages [downloaded May 2024 https://kobiapp.io/en/].
KOBI; Tackling Reading Difficulties One Color at a Time; 2023; 5 pages [downloaded May 2024 https://kobiapp.io/en/].

* cited by examiner

*Primary Examiner* — Thomas J Lett
(74) *Attorney, Agent, or Firm* — Katz Ruby & Carle LLP; Bruce E. Stuckman

(57) ABSTRACT

A dyslexia text conversion system includes a dyslexia conversion tool that converts input text to dyslexia converted text having a colored dyslexia font that partitions the set of characters into subsets of non-dyslexia-conflicting characters, wherein a union of the subsets of non-dyslexia-conflicting characters is the set of characters, wherein an intersection between each pair of the subsets of non-dyslexia-conflicting characters is a null set, and wherein each of the subsets of non-dyslexia-conflicting characters is assigned to at least one of a plurality of colors.

20 Claims, 53 Drawing Sheets
(39 of 53 Drawing Sheet(s) Filed in Color)

Processing System 10-2

Processing System 10-1

Processing System 10-2 computing entity 110 computing entity 110 computing entity 110 computing entity 110 computing entity 110 computing device 120 computing device 120 computing device 120 computing device 120

HWI = hardware interface (driver)

computing device 120 hardware 180 database

300

Allographs

Examples of Allographs in Arabic

| Name | Initial | Medial | Final | Separate |
|---|---|---|---|---|
| alif* | ا | ـا | ـا | ا |
| baa' | بـ | ـبـ | ـب | ب |
| taa' | تـ | ـتـ | ـت | ت |
| thaa' | ثـ | ـثـ | ـث | ث |
| jiim | جـ | ـجـ | ـج | ج |
| Haa' | حـ | ـحـ | ـح | ح |
| khaa' | خـ | ـخـ | ـخ | خ |
| daal* | د | ـد | ـد | د |
| dhaal* | ذ | ـذ | ـذ | ذ |
| raa'* | ر | ـر | ـر | ر |
| zaay* | ز | ـز | ـز | ز |
| siin | سـ | ـسـ | ـس | س |
| shiin | شـ | ـشـ | ـش | ش |
| etc... | | | | |

FIG. 3D

FIG. 3J

Shape Selections & Modifications

| Conflict | Rejected Shapes | Final Shapes | Final with Color | Notes |
|---|---|---|---|---|
| M W | W M | W M | W M | Eliminate Mirrors: W has angled sides and reduced height center, whereas M has vertical sides and full height center |
| 9 6 | 6 9 | 6 9 | 6 9 | Eliminate Mirrors: One has curved extender and the other a straight extender |
| f t | tf | t f | t f | exaggerated hook on t, separate heights for crosses |
| | g | g | g | double story vs single story - This is the one example where I rejected the distinguished character because it's too rare and may be obsolete to young readers |
| o | a | a | a | double story vs single story, which is now more standard and distinct |
| j | i | i | i | serif at base clarifies it from j |
| l | I | I | I | Serif at Top and Bottom distinguishes it from lower L |
| I | l | l | l | slight extender distinguishes it from lower i |
| i | j | j | j | more exaggerated descender |
| T | J | J | J | reject the top Line because it adds to conflict with the T & I |
| x | k | k | k | bottom diagonal joins to top diagonal, rather than to left vertical line |
| dbp | q | q | q | extender makes shape less of a mirror for 3 conflicting forms |
| O | Q | Q | Q | extender goes inside the circle to separate from O |
| c | u | u | u | clarifying serif |
| C | U | U | U | clarifying serif |
| u | c | c | c | close c so it doesn't conflict with open u via rotation |
| O | 0 | 0 | 0 | More Oval shape, Clarifying Slash |
| l7 | 1 | 1 | 1 | Longer, curved serif |
| 8 | 3 | 3 | 3 | Straight upper section, as opposed to two similar curves |
| S | 5 | 5 | 5 | More distinct drop |
| 1 | 7 | 7 | 7 | Curved stroke and clarifying Slash |
| oo | 8 | 8 | 8 | top smaller than bottom |

Application of a subset of the Dyslexia Conversion Process

This tool to used to identify glyphs, which, when paired can be similar in shape to other glyphs or groups.

Common Standard for 3 and 2 Color Users

These color assignments provide adequate distinction to resolve common conflicts for users with normal 3 Color vision, but lose distinction for users who compress down into 2 Colors.

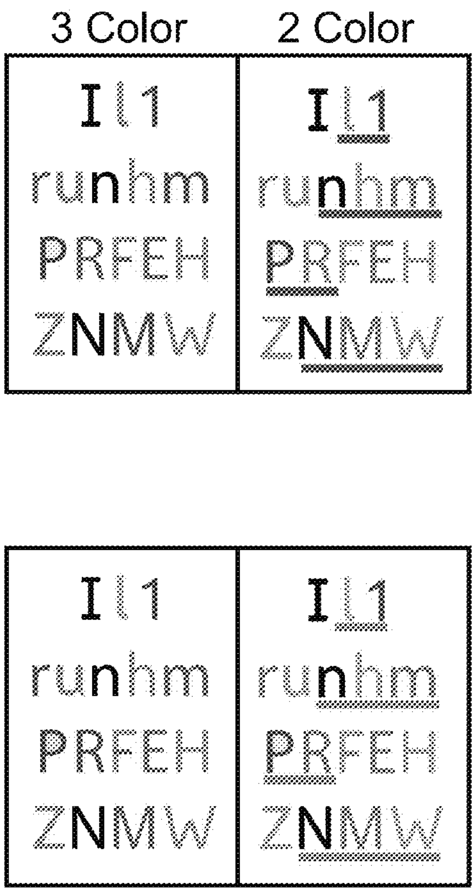

This 3 color scheme would require a different version for people with red or green color blindness as the conflicts underlined in red lack distinction. This would make it impossible to create a single standard for printed (as opposed to screen) versions, as might be used for SAT testing and other educational or public uses.

These color assignments provide adequate distinction for 3 Color and 2 Color versions at the same time Users wtih red or green color blindness still see adequate distinction for these common conflicts after compression to 2 colors. The dyslexia conversion process also involves cross checking blue color blindness (a different version of 2 color which only affects 1:10,000 people) and also ink colors, which can vary from screen colors.

FIG. 5C

Intensity is another dimension of distinction

Hue vs Intensity with Small Point Size Text

Different Hues can be easy to distinguish in large blocks but if they are similar intensity, they can be hard to tell apart at small point sizes. This limits the selection of useful colors

The "Useful Color Set"

Useful Color Set = Black + the band of colors between the black and white lines. These colors are distinct from each other, but with sufficient contrast against a white background.

In 'dark mode' White + a different band of lighter of colors may be used (not shown).

RGB Letters as seen from Deuteranopia Color Space (Red/Green Color Blind)

For 2 Color Users, Glyphs will appear with fewer Hues than designed

FIG. 5R

Dual Color Glyphs

A B D P Q O
a b d p q o

Selective Use of dual color letters in about 25% of characters creates distinct visual patterns – unique signatures which serve to identify words. The outer color is selected from within the 'Useful Color Set', but the inner can be from below the white line

FIG. 5S

Sporatic dual color glyphs create visual signatures for Anagrams

| | | | | |
|---|---|---|---|---|
| brag | pit | tea | reed | elbow |
| grab | tip | ate | deer | below |

FIG. 5T

N Ñ
n ñ

FIG. 5U

A Á
E É Ë
I Í
O Ó Ö Ő
U Ú Ü Ű

→

A Á
E É Ë
I Í
O Ó Ö Ő
U Ú Ü Ű

Hungarian Vowels with Diacritical Marks

All glyphs for the Latin Alphabet and other common ascii encodings

Tool to check that glyphs with the most common shape conflicts are made distinct for 2 & 3 Color Users FIG. 6C Pairs Examined and Confirmed with Color

| | a | b | c | d | e | f | g | h | i | j | k | l | m | n | o | p | q | r | s | t | u | v | w | x | y | z |
|---|---|---|---|---|---|---|---|---|---|---|---|---|---|---|---|---|---|---|---|---|---|---|---|---|---|---|
| a | aa | ab | ac | ad | ae | af | ag | ah | ai | aj | ak | al | am | an | ao | ap | aq | ar | as | at | au | av | aw | ax | ay | az |
| b | ba | bb | bc | bd | be | bf | bg | bh | bi | bj | bk | bl | bm | bn | bo | bp | bq | br | bs | bt | bu | bv | bw | bx | by | bz |
| c | ca | cb | cc | cd | ce | cf | cg | ch | ci | cj | ck | cl | cm | cn | co | cp | cq | cr | cs | ct | cu | cv | cw | cx | cy | cz |
| d | da | db | dc | dd | de | df | dg | dh | di | dj | dk | dl | dm | dn | do | dp | dq | dr | ds | dt | du | dv | dw | dx | dy | dz |
| e | ea | eb | ec | ed | ee | ef | eg | eh | ei | ej | ek | el | em | en | eo | ep | eq | er | es | et | eu | ev | ew | ex | ey | ez |
| f | fa | fb | fc | fd | fe | ff | fg | fh | fi | fj | fk | fl | fm | fn | fo | fp | fq | fr | fs | ft | fu | fv | fw | fx | fy | fz |
| g | ga | gb | gc | gd | ge | gf | gg | gh | gi | gj | gk | gl | gm | gn | go | gp | gq | gr | gs | gt | gu | gv | gw | gx | gy | gz |
| h | ha | hb | hc | hd | he | hf | hg | hh | hi | hj | hk | hl | hm | hn | ho | hp | hq | hr | hs | ht | hu | hv | hw | hx | hy | hz |
| i | ia | ib | ic | id | ie | if | ig | ih | ii | ij | ik | il | im | in | io | ip | iq | ir | is | it | iu | iv | iw | ix | iy | iz |
| j | ja | jb | jc | jd | je | jf | jg | jh | ji | jj | jk | jl | jm | jn | jo | jp | jq | jr | js | jt | ju | jv | jw | jx | jy | jz |
| k | ka | kb | kc | kd | ke | kf | kg | kh | ki | kj | kk | kl | km | kn | ko | kp | kq | kr | ks | kt | ku | kv | kw | kx | ky | kz |
| l | la | lb | lc | ld | le | lf | lg | lh | li | lj | lk | ll | lm | ln | lo | lp | lq | lr | ls | lt | lu | lv | lw | lx | ly | lz |
| m | ma | mb | mc | md | me | mf | mg | mh | mi | mj | mk | ml | mm | mn | mo | mp | mq | mr | ms | mt | mu | mv | nw | mx | my | mz |
| n | na | nb | nc | nd | ne | nf | ng | nh | ni | nj | nk | nl | nm | nn | no | np | nq | nr | ns | nt | nu | nv | nw | nx | ny | nz |
| o | oa | ob | oc | od | oe | of | og | oh | oi | oj | ok | ol | om | on | oo | op | oq | or | os | ot | ou | ov | ow | ox | oy | oz |
| p | pa | pb | pc | pd | pe | pf | pg | ph | pi | pj | pk | pl | pm | pn | po | pp | pq | pr | ps | pt | pu | pv | pw | px | py | pz |
| q | qa | qb | qc | qd | qe | qf | qg | qh | qi | qj | qk | ql | qm | qn | qo | qp | qq | qr | qs | qt | qu | qv | qw | qx | qy | qz |
| r | ra | rb | rc | rd | re | rf | rg | rh | ri | rj | rk | rl | rm | rn | ro | rp | rq | rr | rs | rt | ru | rv | rw | rx | ry | rz |
| s | sa | sb | sc | sd | se | sf | sg | sh | si | sj | sk | sl | sm | sn | so | sp | sq | sr | ss | st | su | sv | sw | sx | sy | sz |
| t | ta | tb | tc | td | te | tf | tg | th | ti | tj | tk | tl | tm | tn | to | tp | tq | tr | ts | tt | tu | tv | tw | tx | ty | tz |
| u | ua | ub | uc | ud | ue | uf | ug | uh | ui | uj | uk | ul | um | un | uo | up | uq | ur | us | ut | uu | uv | uw | ux | uy | uz |
| v | va | vb | vc | vd | ve | vf | vg | vh | vi | vj | vk | vl | vm | vn | vo | vp | vq | vr | vs | vt | vu | vv | vw | vx | vy | vz |
| w | wa | wb | wc | wd | we | wf | wg | wh | wi | wj | wk | wl | wm | wn | wo | wp | wq | wr | ws | wt | wu | wv | ww | wx | wy | wz |
| x | xa | xb | xc | xd | xe | xf | xg | xh | xi | xj | xk | xl | xm | xn | xo | xp | xq | xr | xs | xt | xu | xv | xw | xx | xy | xz |
| y | ya | yb | yc | yd | ye | yf | yg | yh | yi | yj | yk | yl | ym | yn | yo | yp | yq | yr | ys | yt | yu | yv | yw | yx | yy | yz |
| z | za | zb | zc | zd | ze | zf | zg | zh | zi | zj | zk | zl | zm | zn | zo | zp | zq | zr | zs | zt | zu | zv | zw | zx | zy | zz |

Common Pair Conflicts With Improved Colors

| B&W | | 1 Color | | 2 Color | | 3 Color | |
|---|---|---|---|---|---|---|---|
| ol | d | ol | d | ol | d | ol | d |
| cl | d | cl | d | cl | d | cl | d |
| oo | 8 | oo | 8 | oo | 8 | oo | 8 |
| co | 8 | co | 8 | co | 8 | co | 8 |
| lo | b | lo | b | lo | b | lo | b |
| l3 | B | l3 | B | l3 | B | l3 | B |
| Pi | R | Pi | R | Pi | R | Pi | R |
| LI | U | LI | U | LI | U | LI | U |
| il | ll | il | ll | il | ll | il | ll |
| ru | nu | ru | nu | ru | nu | ru | nu |
| ri | n | ri | n | ri | n | ri | n |
| ln | h | ln | h | ln | h | ln | h |
| rl | h | rl | h | rl | h | rl | h |
| rri | m | rri | m | rri | m | rri | m |
| rn | m | rn | m | rn | m | rn | m |
| vv | w | vv | w | vv | w | vv | w |
| vw | ww | vw | ww | vw | ww | vw | ww |

Tool to check that common pairs with shape conflicts are made distinct for 2 & 3 Color Users

FIG. 6E

Words with Similar Shapes

| B&W | 1 Color | 2 Color | 3 Color |
|---|---|---|---|
| Pair | Pair | Pair | Pair |
| Pain | Pain | Pain | Pain |
| Rain | Rain | Rain | Rain |
| Palm | Palm | Palm | Palm |
| Balm | Balm | Balm | Balm |
| nail | nail | nail | nail |
| hail | hail | hail | hail |
| hall | hall | hall | hall |
| hill | hill | hill | hill |
| I'll | I'll | I'll | I'll |
| Carried | Carried | Carried | Carried |
| Cameo | Cameo | Cameo | Cameo |
| CLIP | CLIP | CLIP | CLIP |
| CUP | CUP | CUP | CUP |
| Mom | Mom | Mom | Mom |
| Morn | Morn | Morn | Morn |
| thought | thought | thought | thought |
| through | through | through | through |

FIG. 6F

Anagrams - Same Letters but in a Different Order

| B&W | 1 Color | 2 Color | 3 Color |
|---|---|---|---|
| felt | felt | felt | felt |
| left | left | left | left |
| pit | pit | pit | pit |
| tip | tip | tip | tip |
| does | does | does | does |
| dose | dose | dose | dose |
| was | was | was | was |
| saw | saw | saw | saw |
| brag | brag | brag | brag |
| grab | grab | grab | grab |
| elbow | elbow | elbow | elbow |
| below | below | below | below |
| state | state | state | state |
| taste | taste | taste | taste |
| save | save | save | save |
| vase | vase | vase | vase |
| tried | tried | tried | tried |
| tired | tired | tired | tired |

FIG. 6G

Words with Similar Sounds

| B&W | 1 Color | 2 Color | 3 Color |
|---|---|---|---|
| Affect | Affect | Affect | Affect |
| Effect | Effect | Effect | Effect |
| Further | Further | Further | Further |
| Father | Father | Father | Father |
| Insure | Insure | Insure | Insure |
| Ensure | Ensure | Ensure | Ensure |
| Accept | Accept | Accept | Accept |
| Expect | Expect | Expect | Expect |
| advise | advise | advise | advise |
| advice | advice | advice | advice |
| meet | meet | meet | meet |
| meat | meat | meat | meat |
| flour | flour | flour | flour |
| flower | flower | flower | flower |
| they're | they're | they're | they're |
| their | their | their | their |
| than | than | than | than |
| then | then | then | then |

FIG. 6H

User Setable Contrast Level 67.6% Contrast - High Saturation
Four score and seven years ago our fathers brought forth on this continent, a new nation, conceived in Liberty, and dedicated to the proposition that all men are created equal.

73.5% Contrast - Medium Saturation
Four score and seven years ago our fathers brought forth on this continent, a new nation, conceived in Liberty, and dedicated to the proposition that all men are created equal.

76.1% Contrast - Low Saturation
Four score and seven years ago our fathers brought forth on this continent, a new nation, conceived in Liberty, and dedicated to the proposition that all men are created equal.

FIG. 7A

Examples of Arabic Glyphs Colored by Allograph

| Name | Initial | Medial | Final | Separate |
|---|---|---|---|---|
| alif* | ا | ـا | ـا | ا |
| baa' | بـ | ـبـ | ـب | ب |
| taa' | تـ | ـتـ | ـت | ت |
| thaa' | ثـ | ـثـ | ـث | ث |
| jiim | جـ | ـجـ | ـج | ج |
| Haa' | حـ | ـحـ | ـح | ح |
| khaa' | خـ | ـخـ | ـخ | خ |
| daal* | د | ـد | ـد | د |
| dhaal* | ذ | ـذ | ـذ | ذ |
| raa'* | ر | ـر | ـر | ر |
| zaay* | ز | ـز | ـز | ز |
| etc... | | | | |

FIG. 8B

DYSLEXIA TEXT CONVERSION SYSTEM AND METHODS FOR USE THEREWITH

CROSS-REFERENCE TO RELATED APPLICATIONS

The present U.S. Utility Patent application claims priority pursuant to 35 U.S.C. § 120 as a continuation of U.S. Utility application Ser. No. 18/659,189, entitled "PROCESSING SYSTEM WITH DYSLEXIA TEXT CONVERSION AND METHODS FOR USE THEREWITH", filed May 9, 2024, which claims priority pursuant to 35 U.S.C. § 119 (e) to U.S. Provisional Application No. 63/502,158, entitled "PROCESSING SYSTEM WITH DYSLEXIA TEXT CONVERSION AND METHODS FOR USE THEREWITH", filed May 15, 2023, each of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

The disclosed subject matter relates to computer systems and devices for reproducing text and in particular for color conversion processing directed to aiding readability by individuals with dyslexia.

BRIEF DESCRIPTION OF THE SEVERAL VIEWS OF THE DRAWING(S)

The patent or application file contains at least one drawing executed in color. Copies of this patent or patent application publication with color drawing(s) will be provided by the Office upon request and payment of the necessary fee.

Figure 2A:
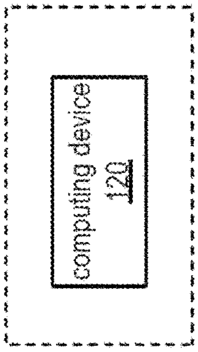
FIGS. 2A through 2E are schematic block diagrams of embodiments of computing entities that are part of an improved computer technology.
Figure 2B:
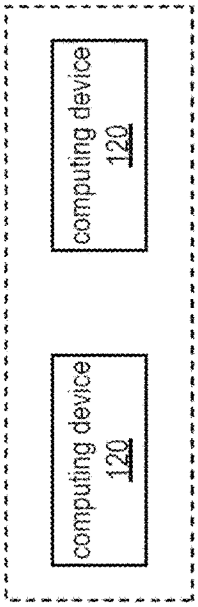
Figure 2C:
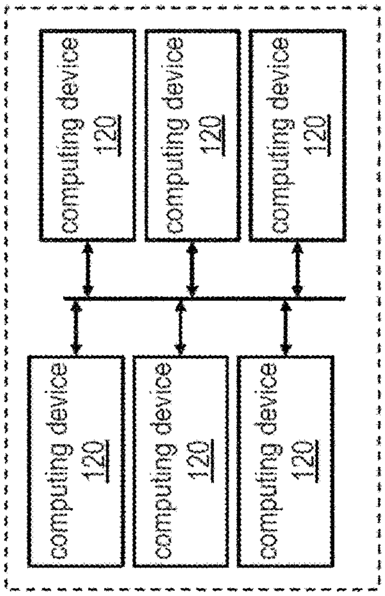
Figure 2D:
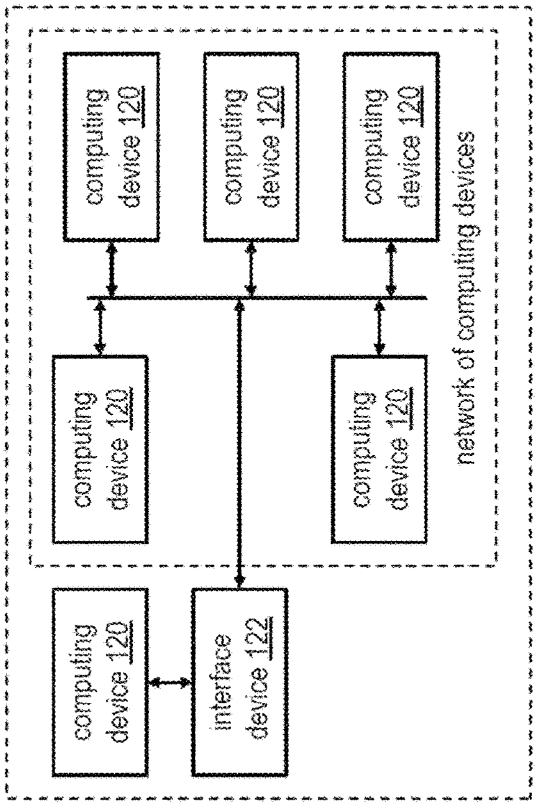
Figure 2E:
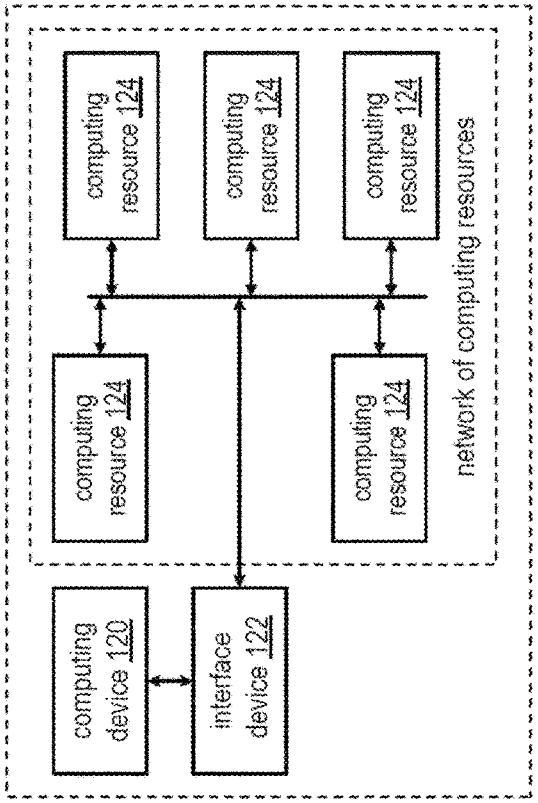
Figure 2F:
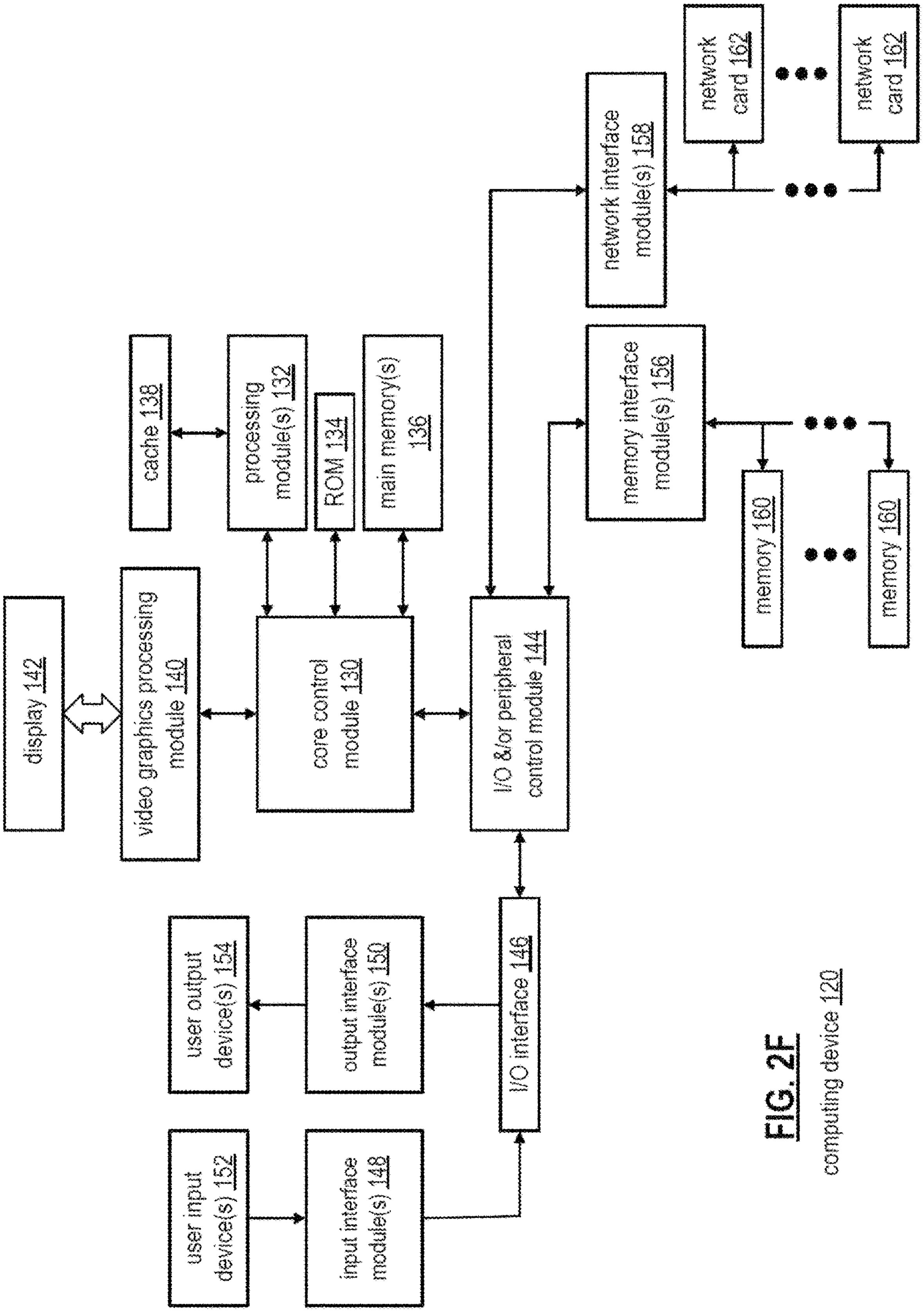
FIGS. 2F through 2L are schematic block diagrams of embodiments of computing devices that form at least a portion of a computing entity.
Figure 2G:
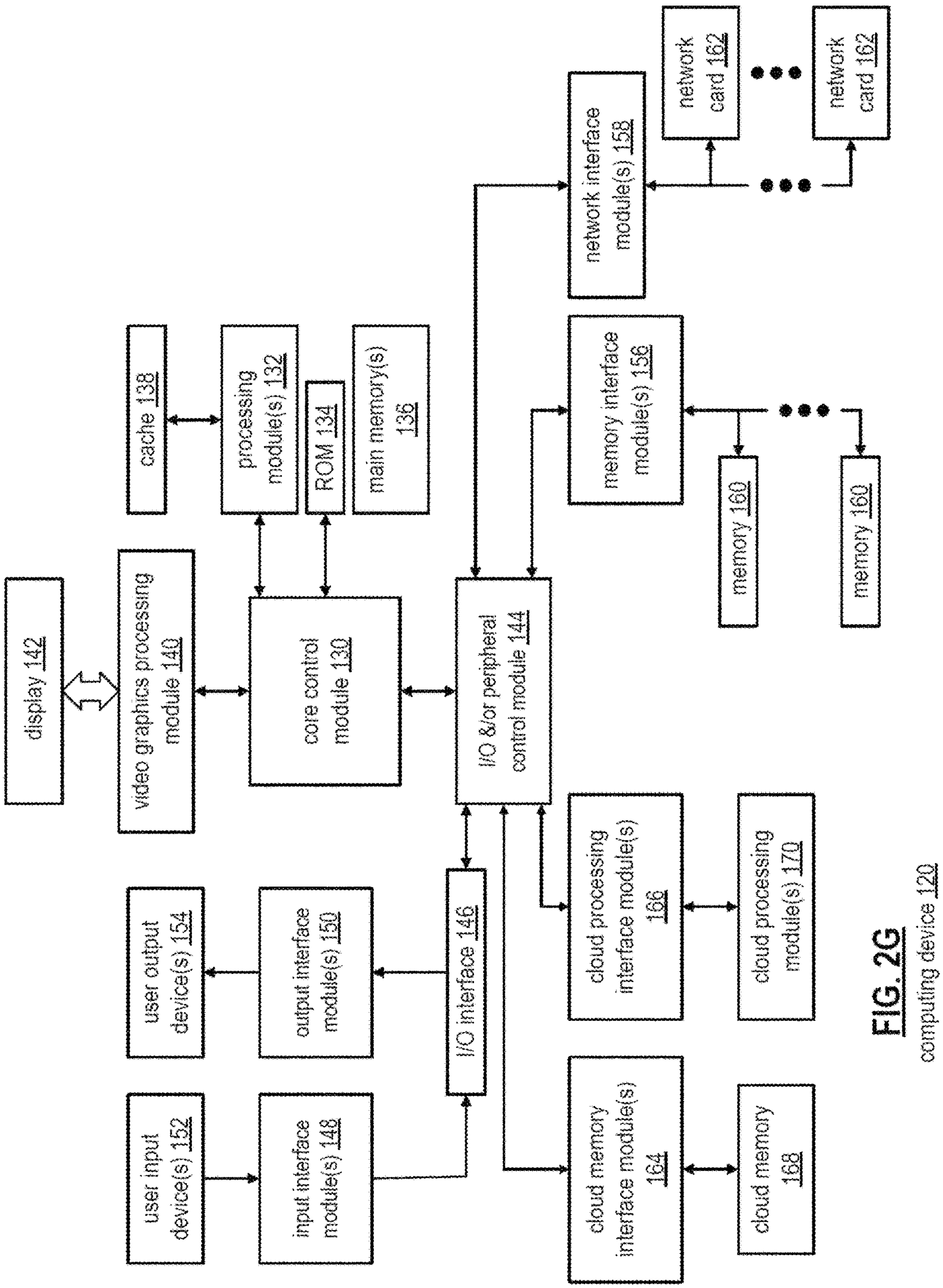
Figure 2H:
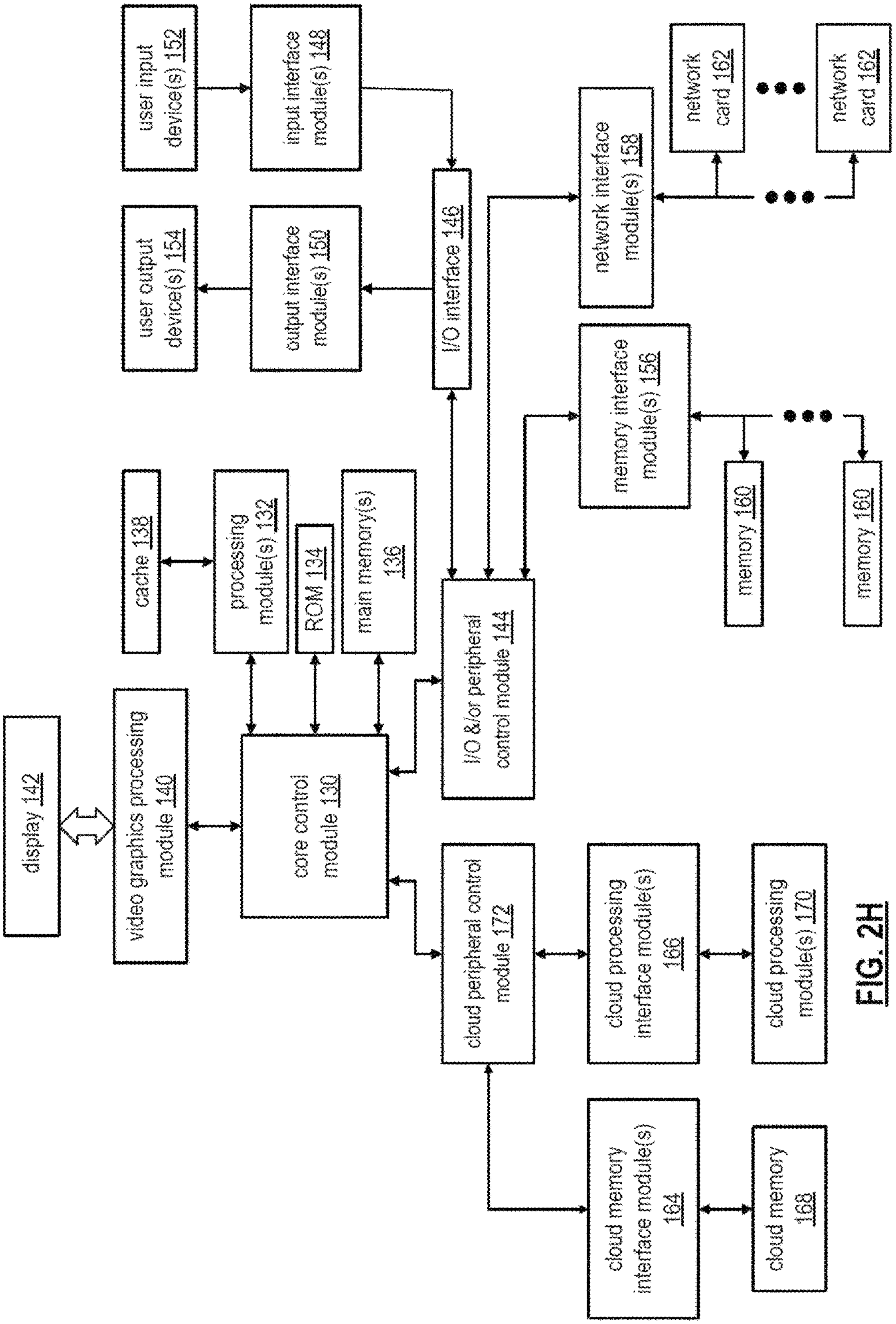
Figure 2I:
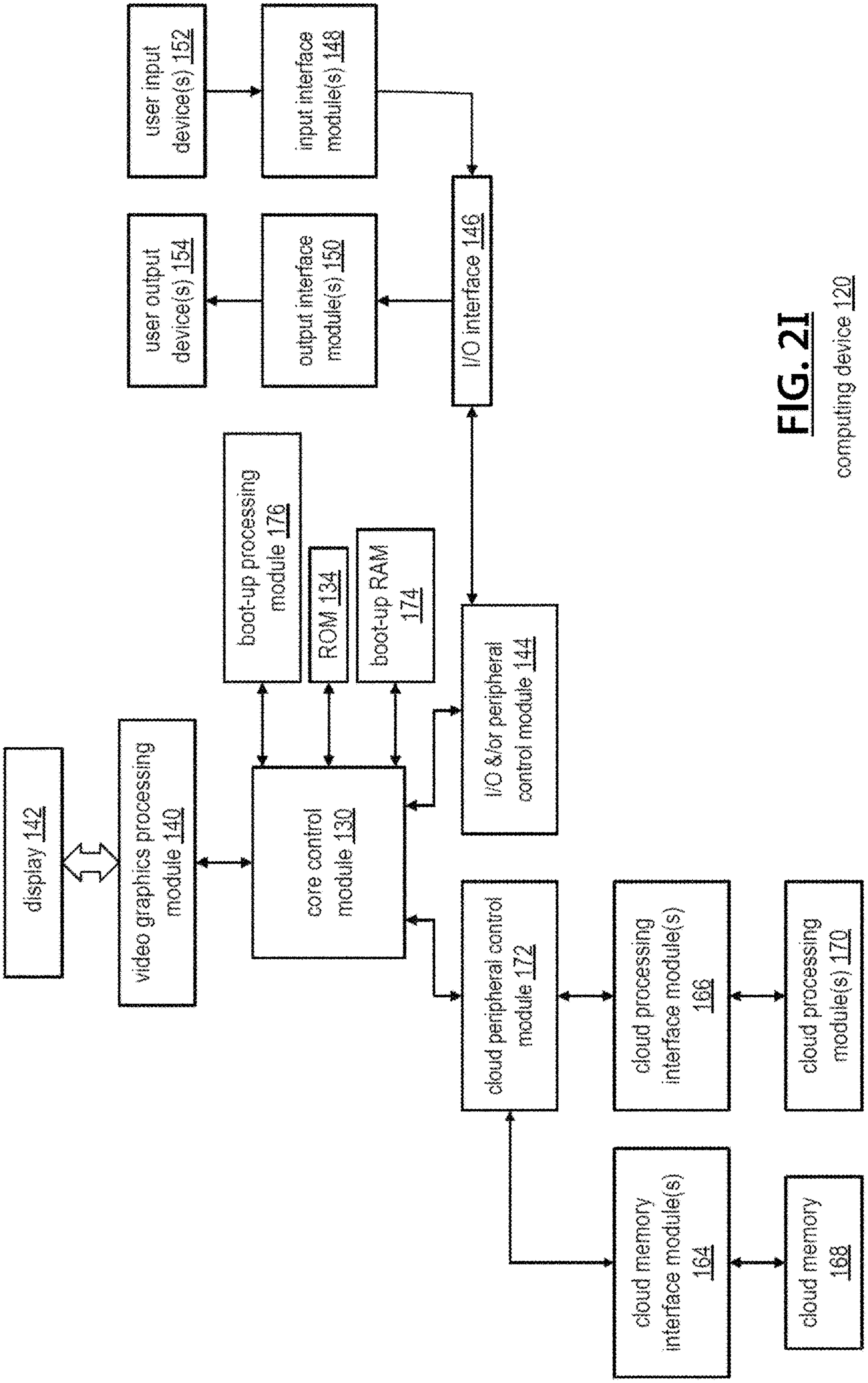
Figure 2J:
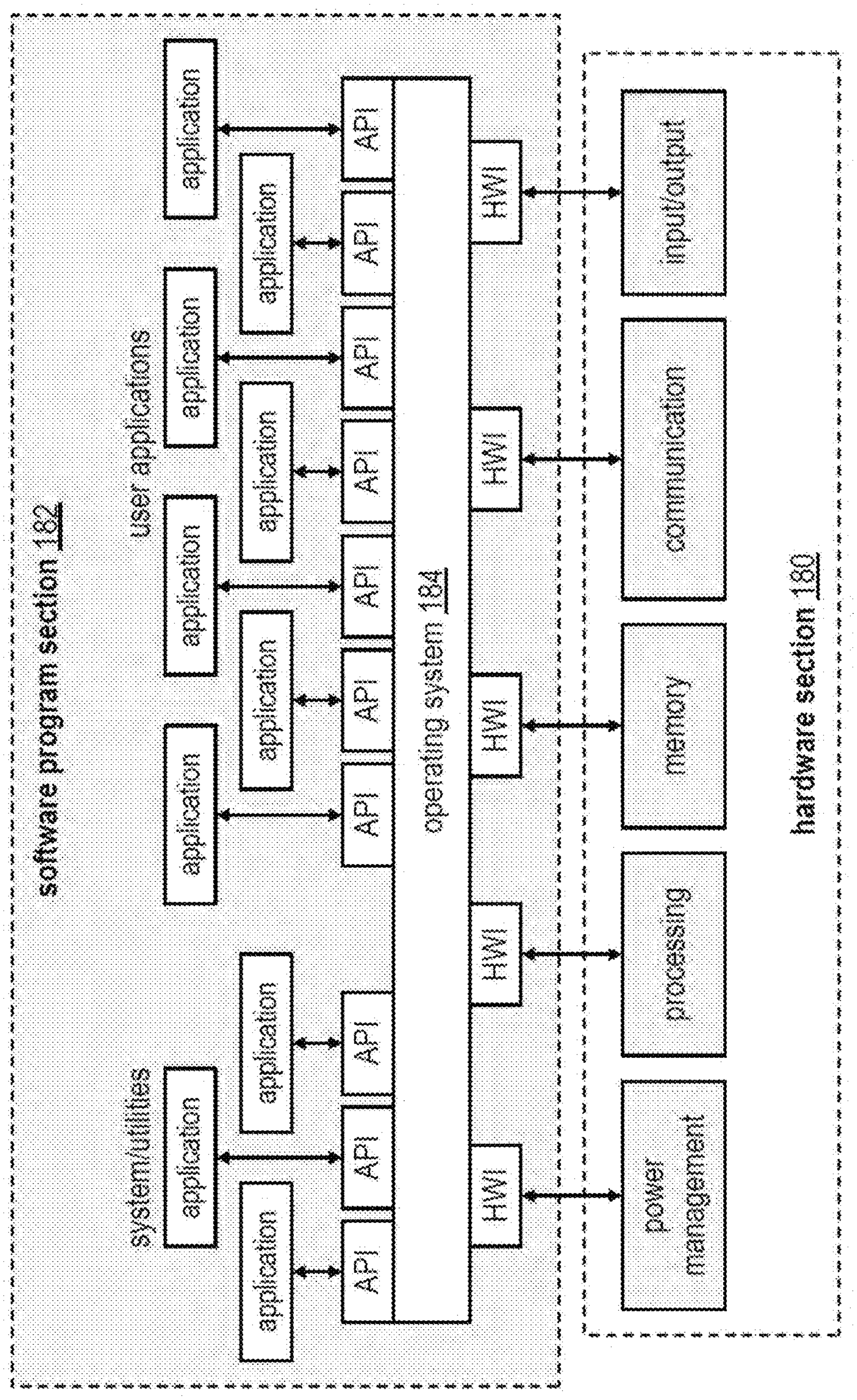
Figure 2K:
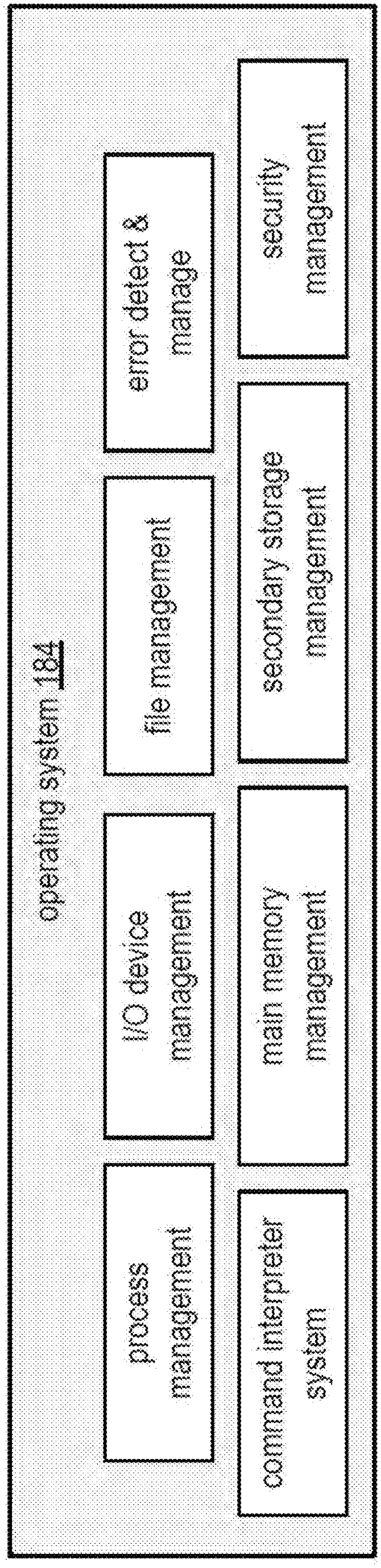
Figure 2L:
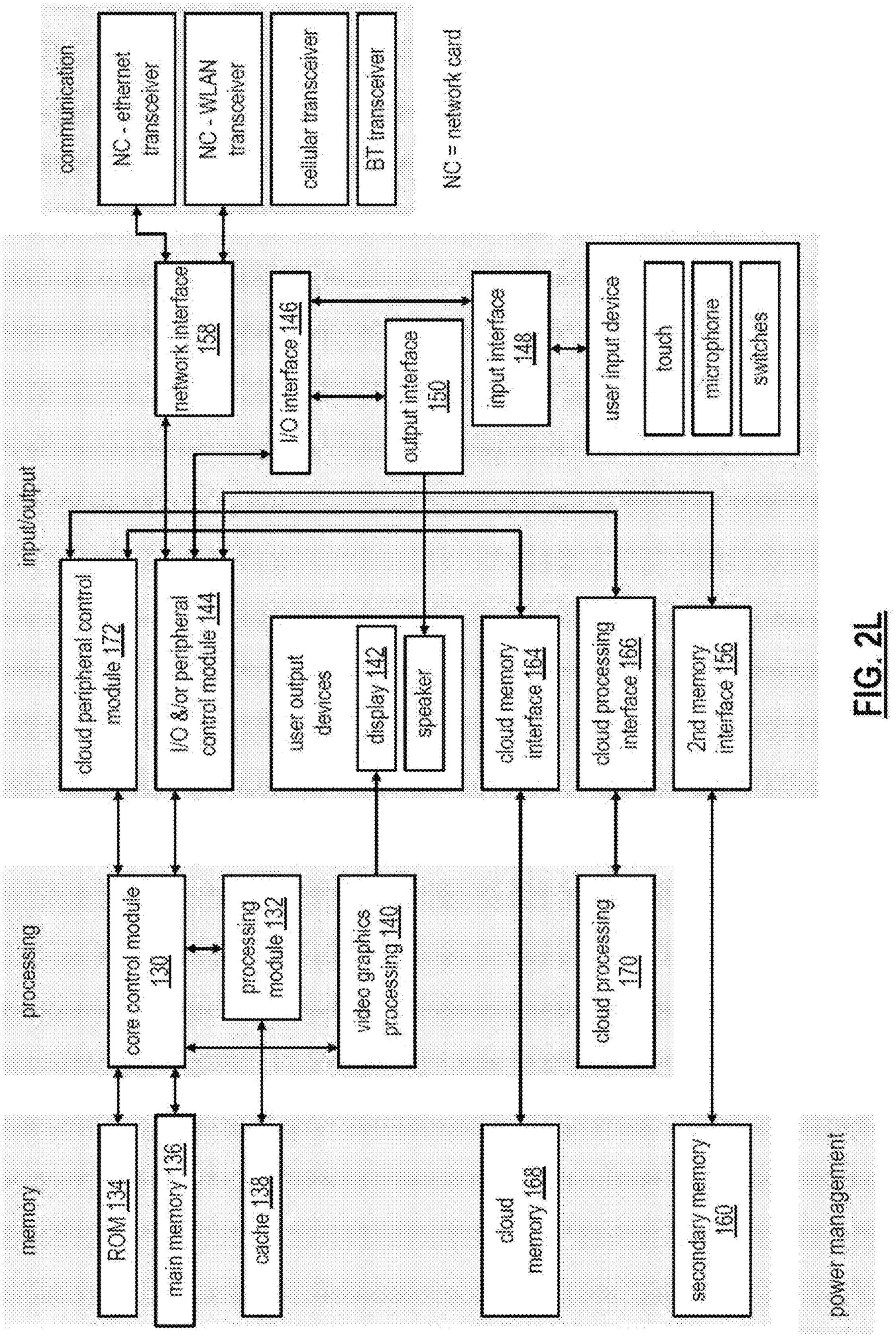
Figure 2M:
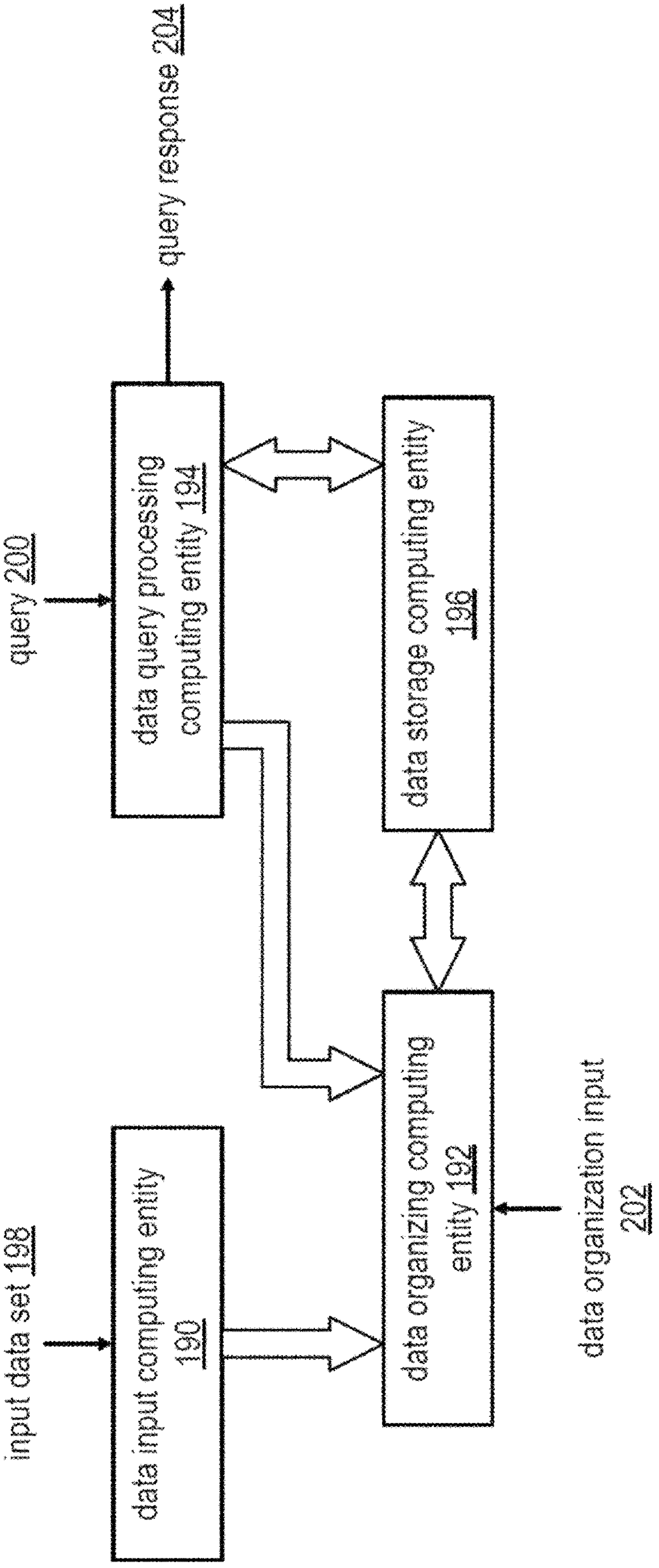
FIG. 2M is a schematic block diagram of an embodiment of a database.
Figure 2N:
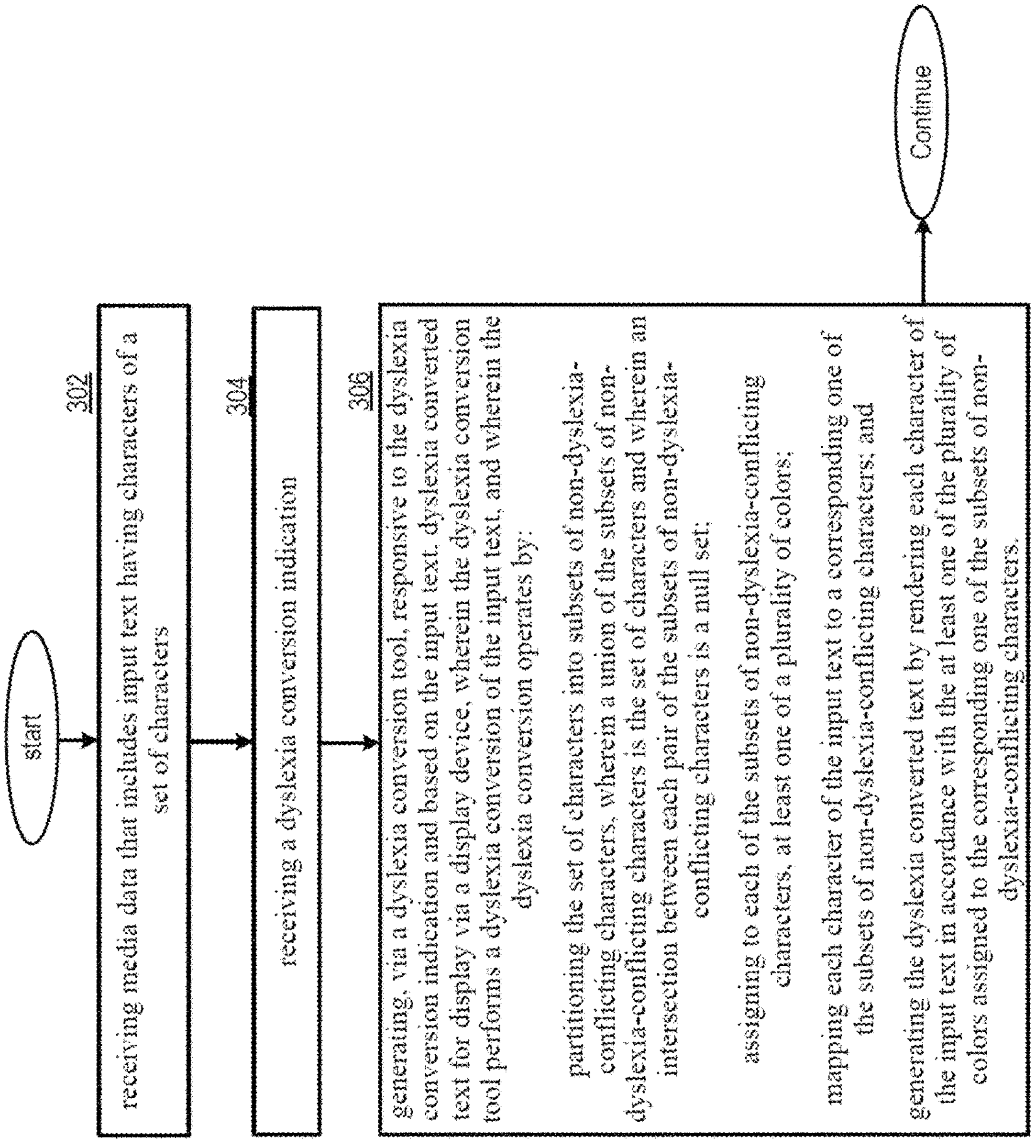
Figure 3A:
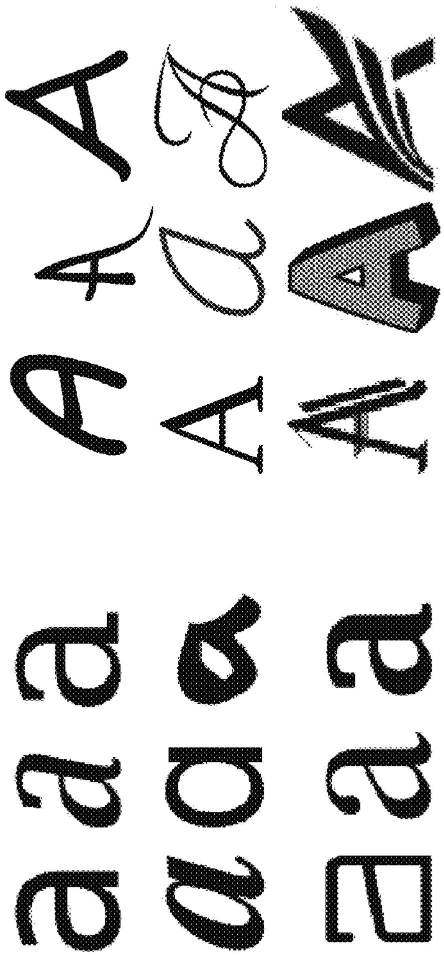
Figure 3B:
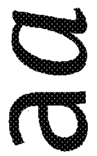
Figure 3C:
Figure 3E:
Figure 3F:
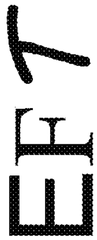
Figure 3G:
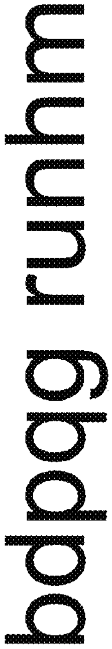
Figure 3H:
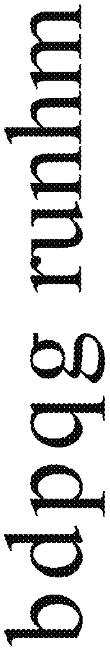
Figure 3I:
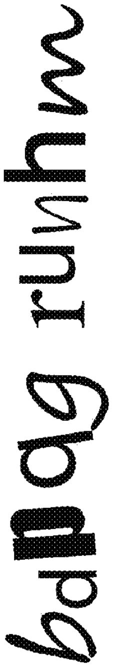
Figure 3K:
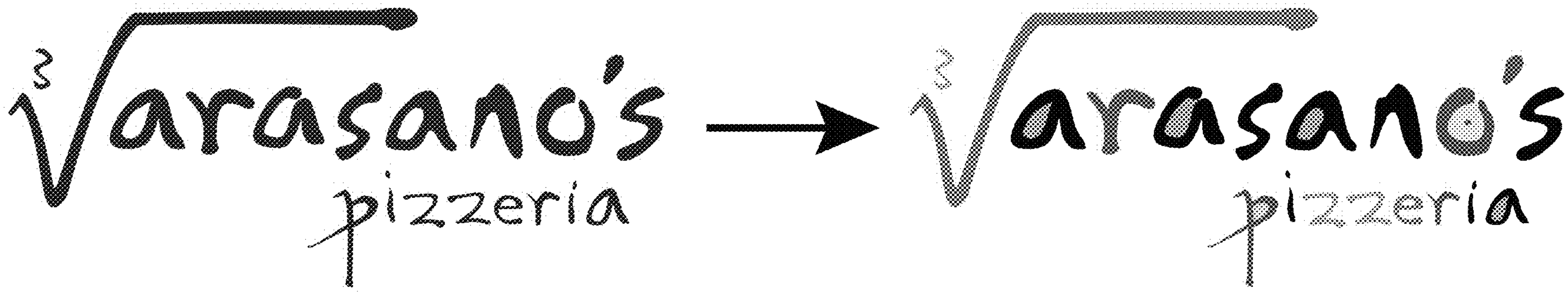
Figure 5A:
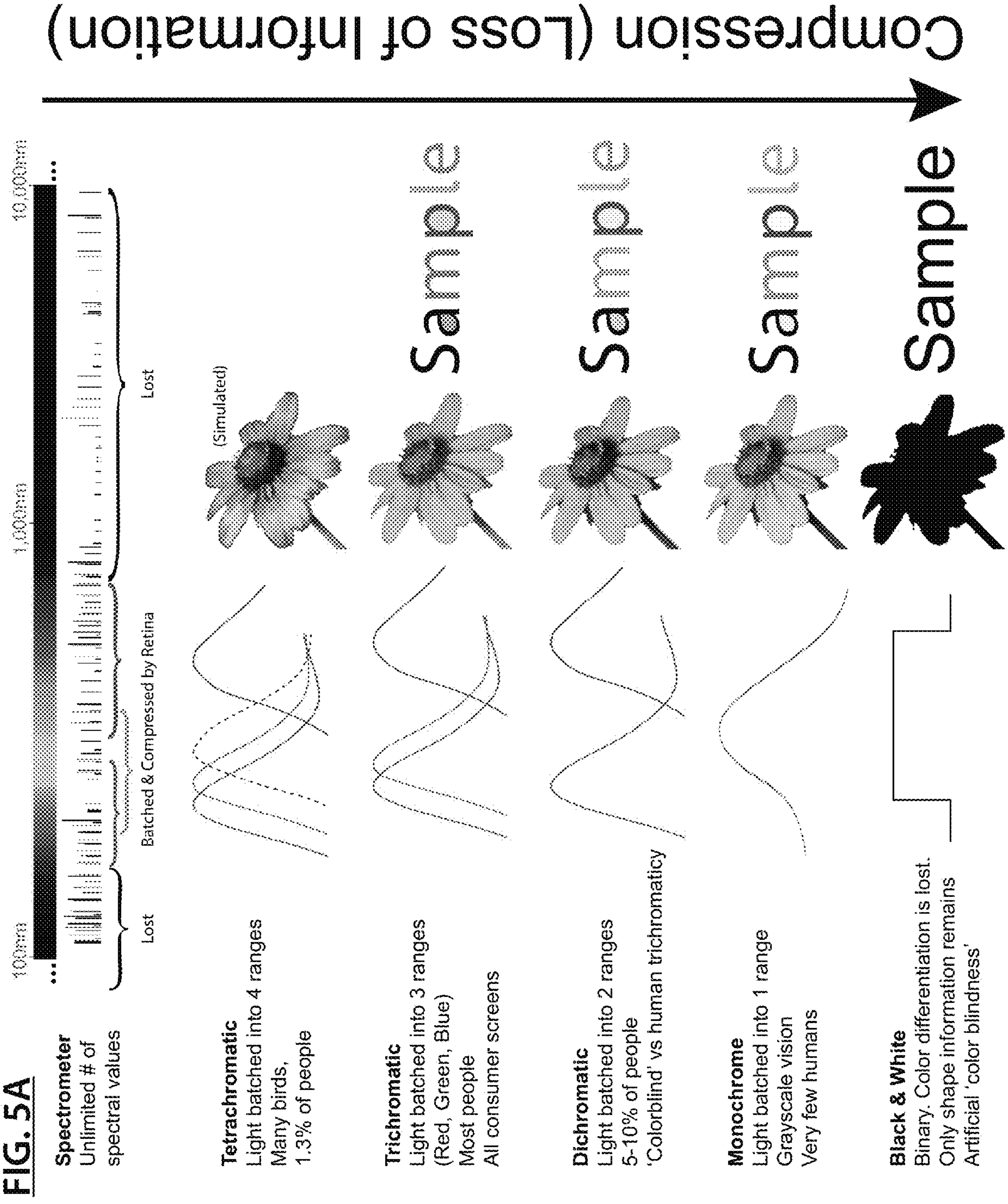
Figure 5B:
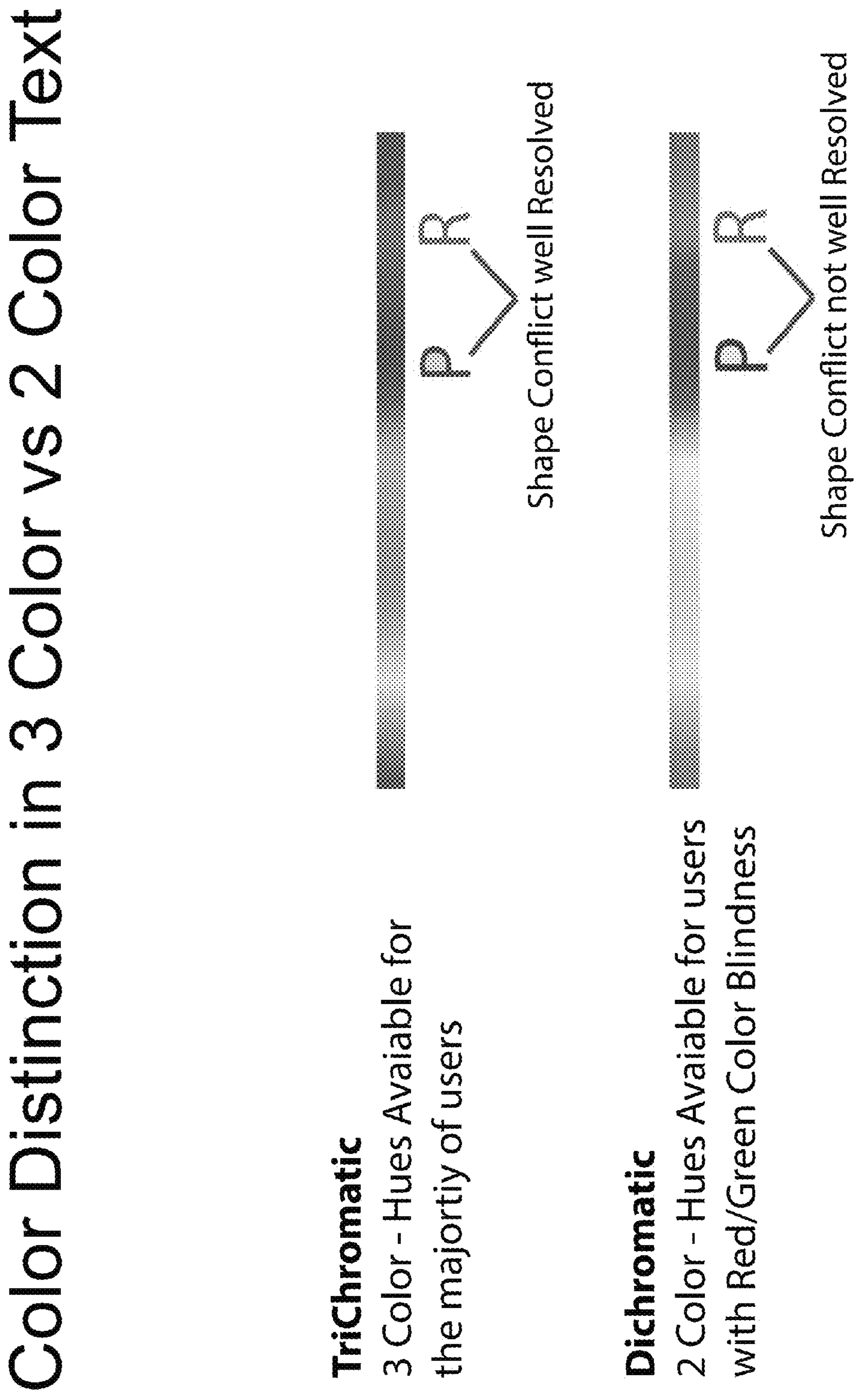
Figure 5D:
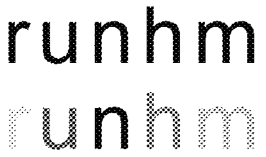
Figure 5E:
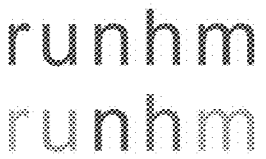
Figure 5F:
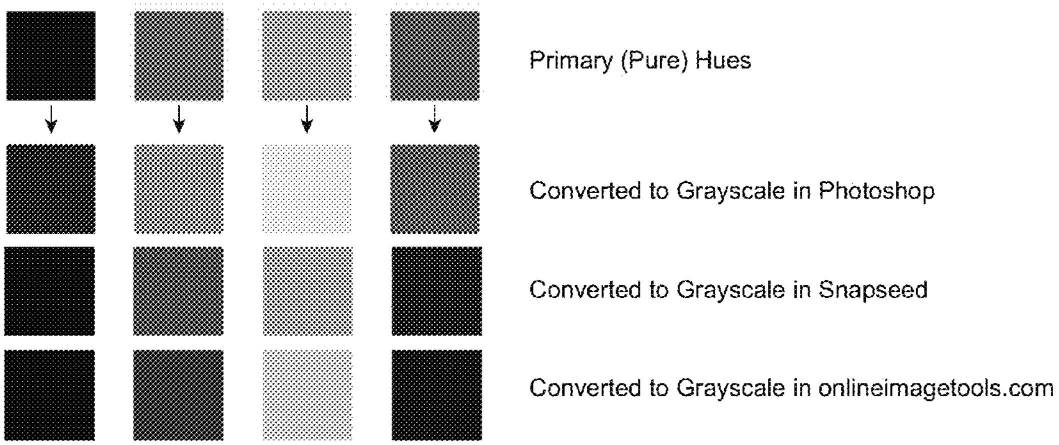
Figure 5G:
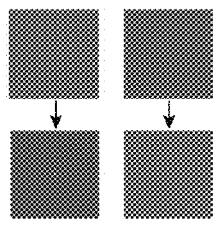
Figure 5H:
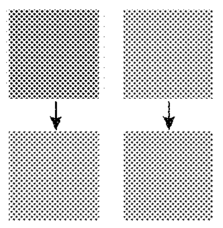
Figure 5I:
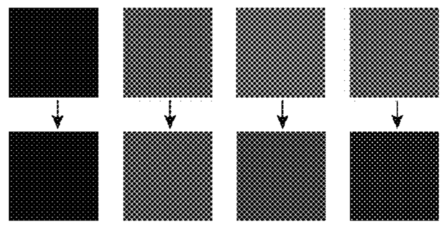
Figure 5J:
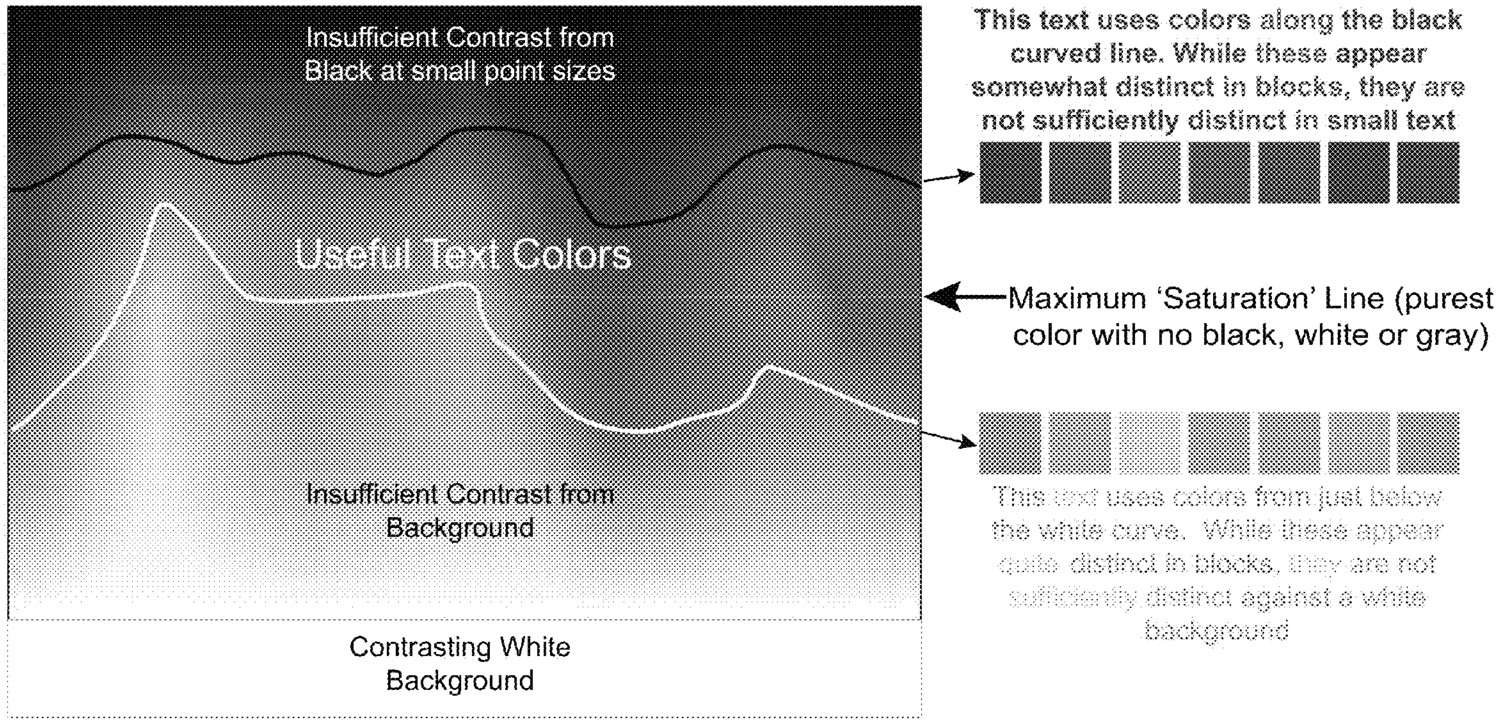
Figure 5K:
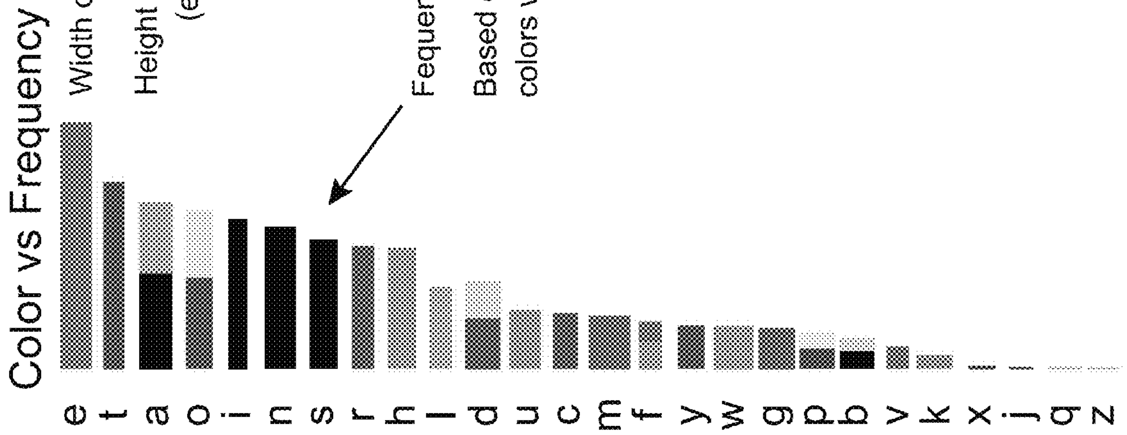
Figure 5L:
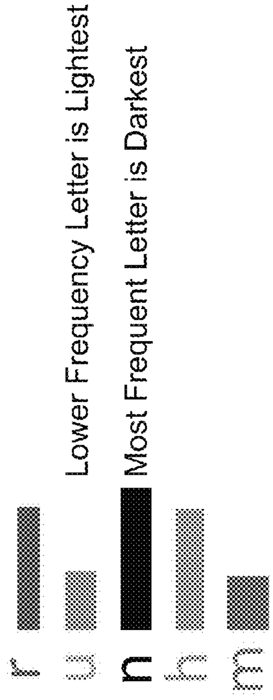
Figure 5M:
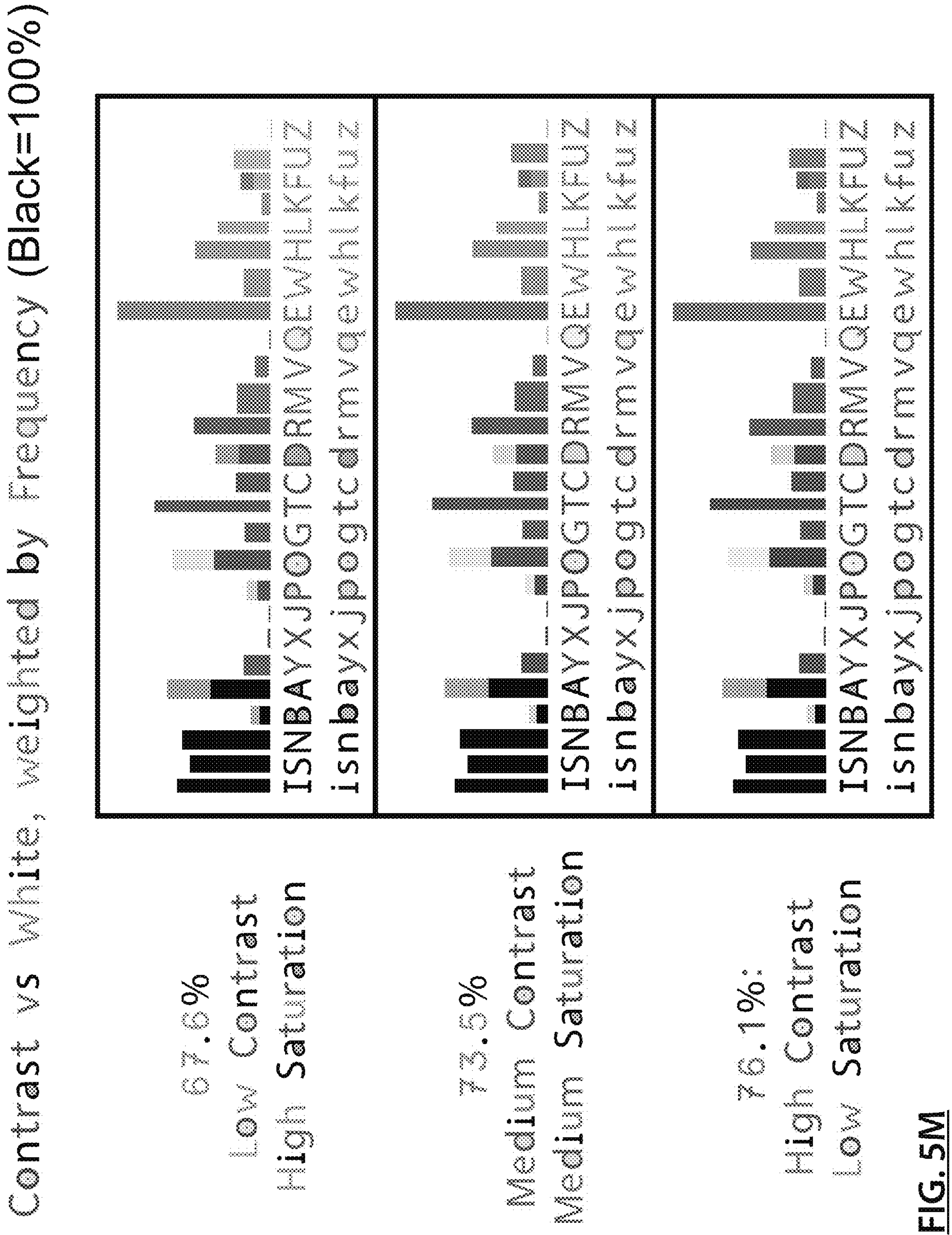
Figure 5N:
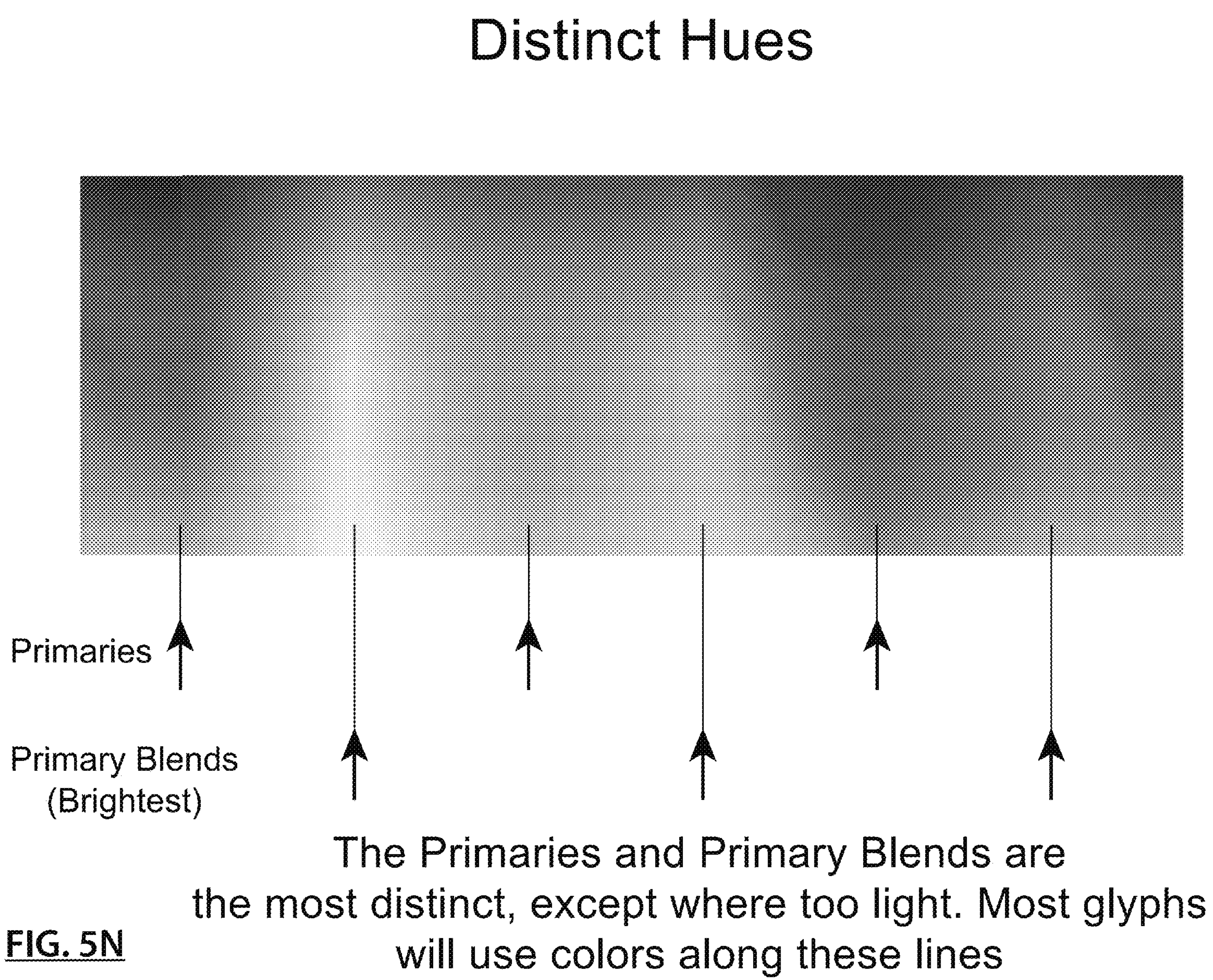
Figure 5P:
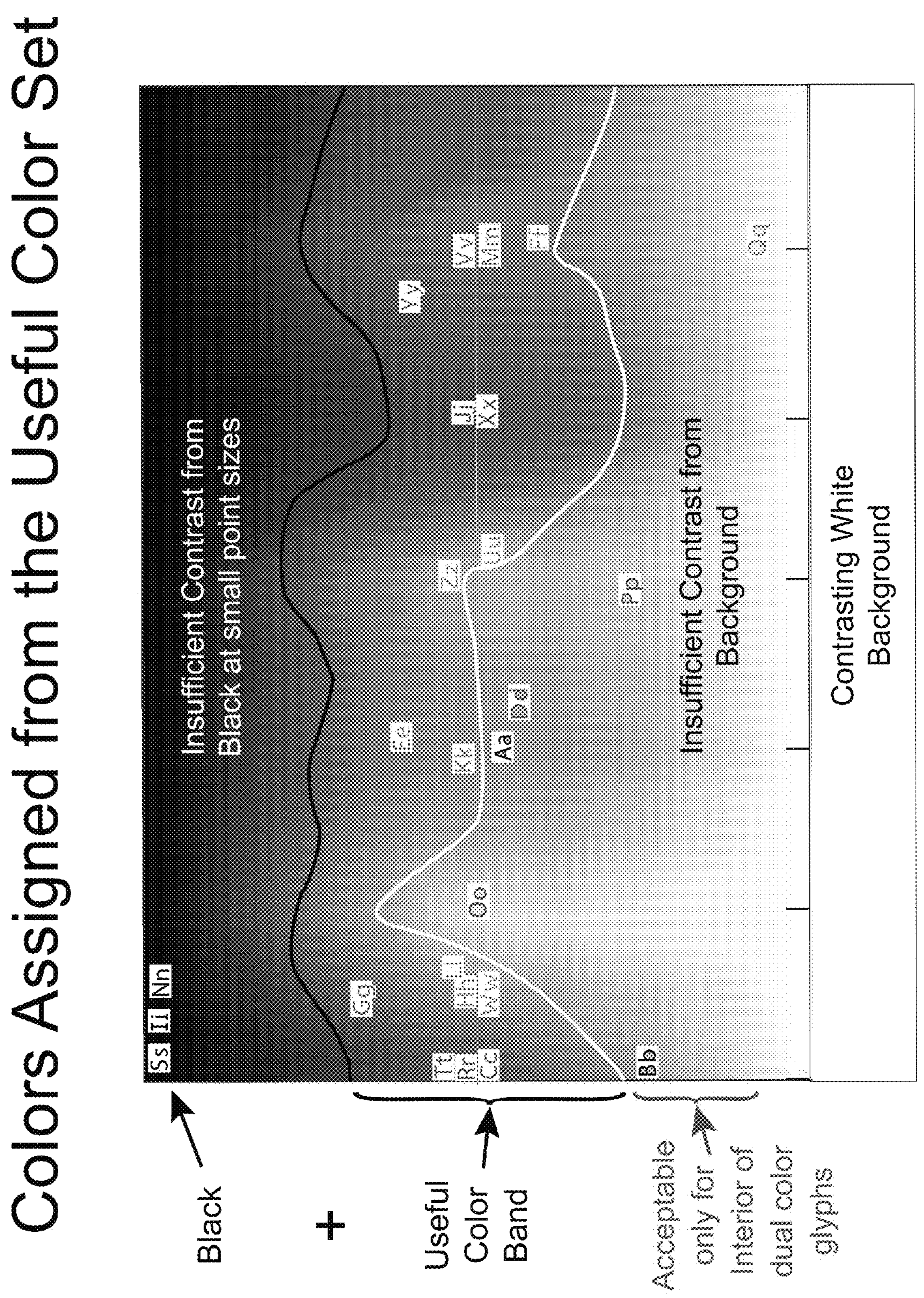
Figure 5Q:
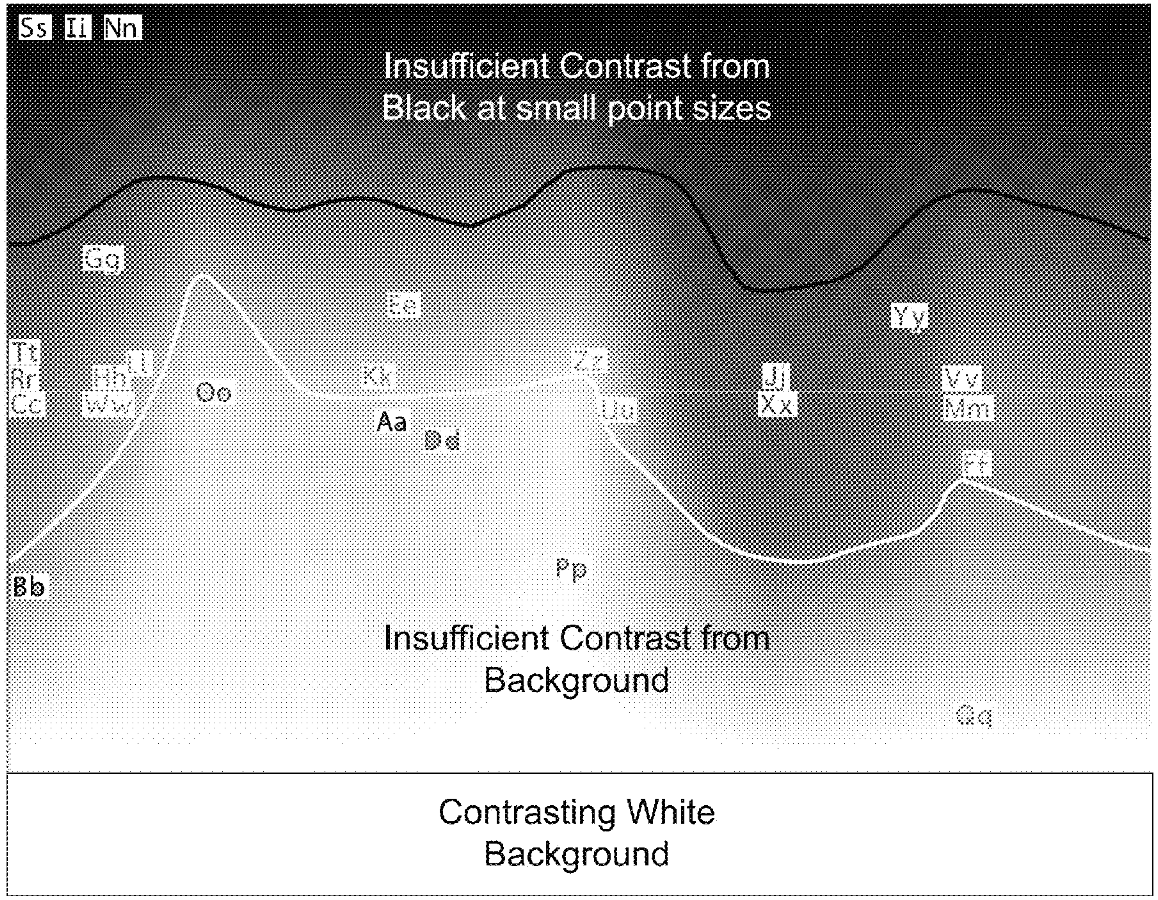
Figure 5V:
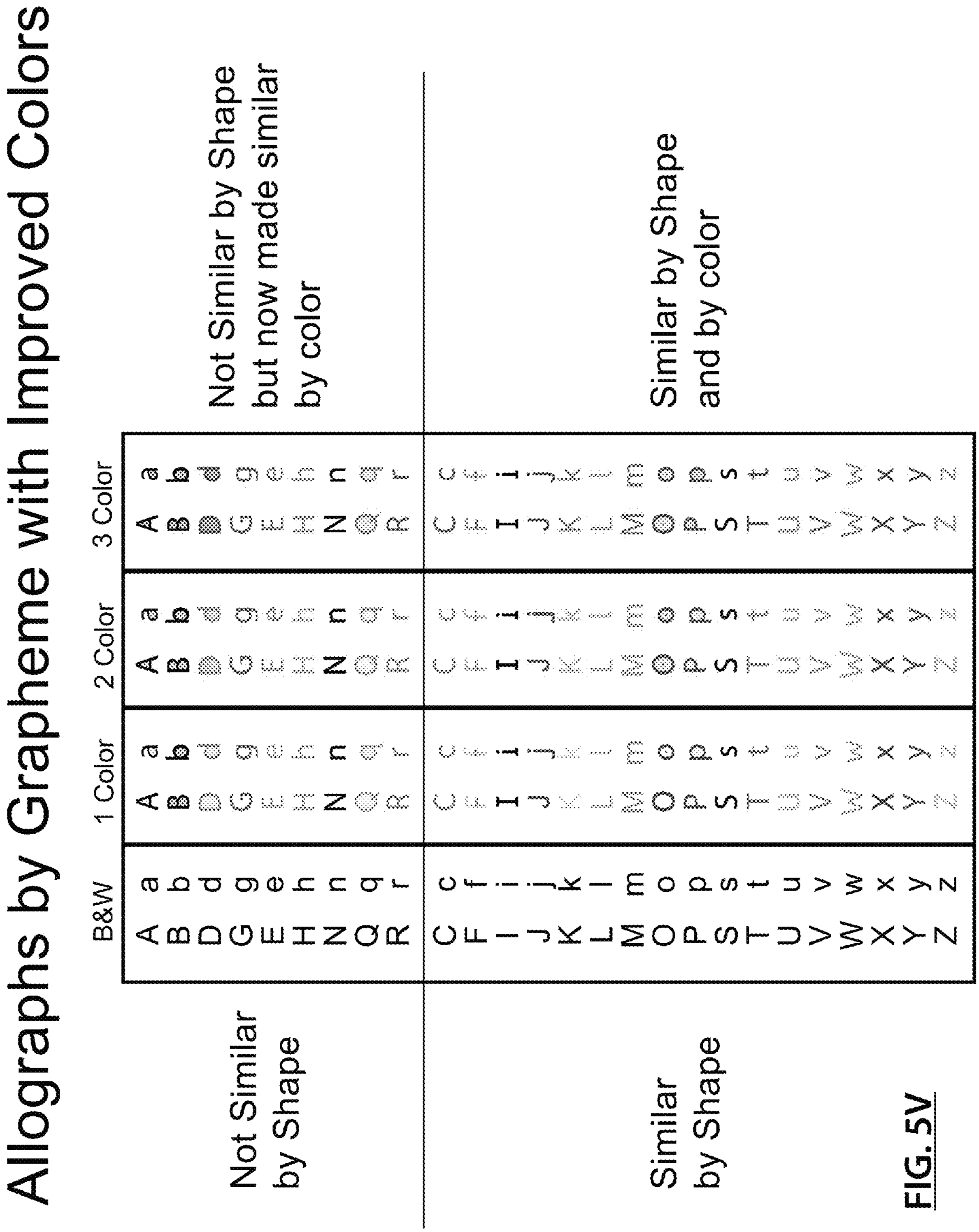
Figure 5W:
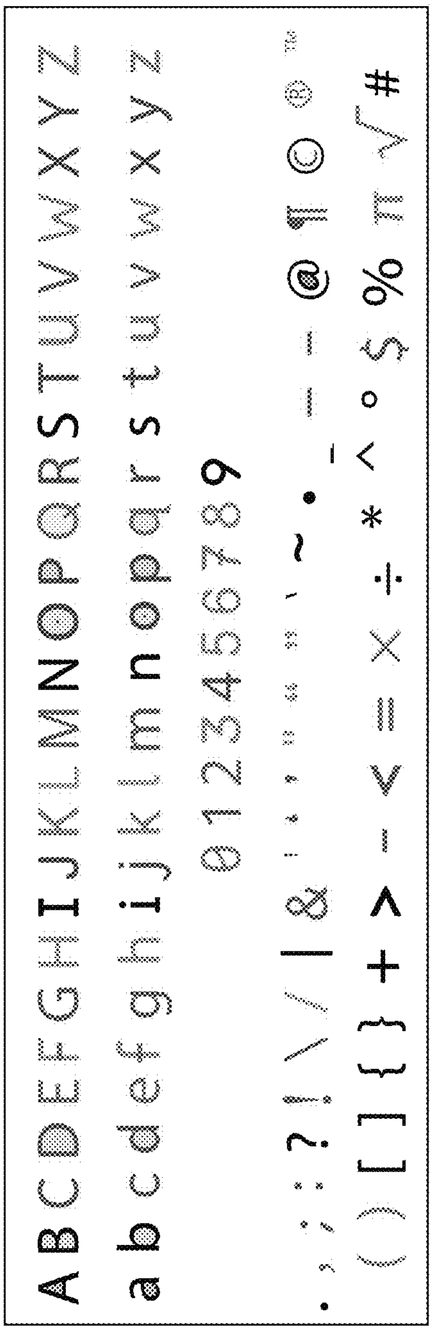
Figure 7B:
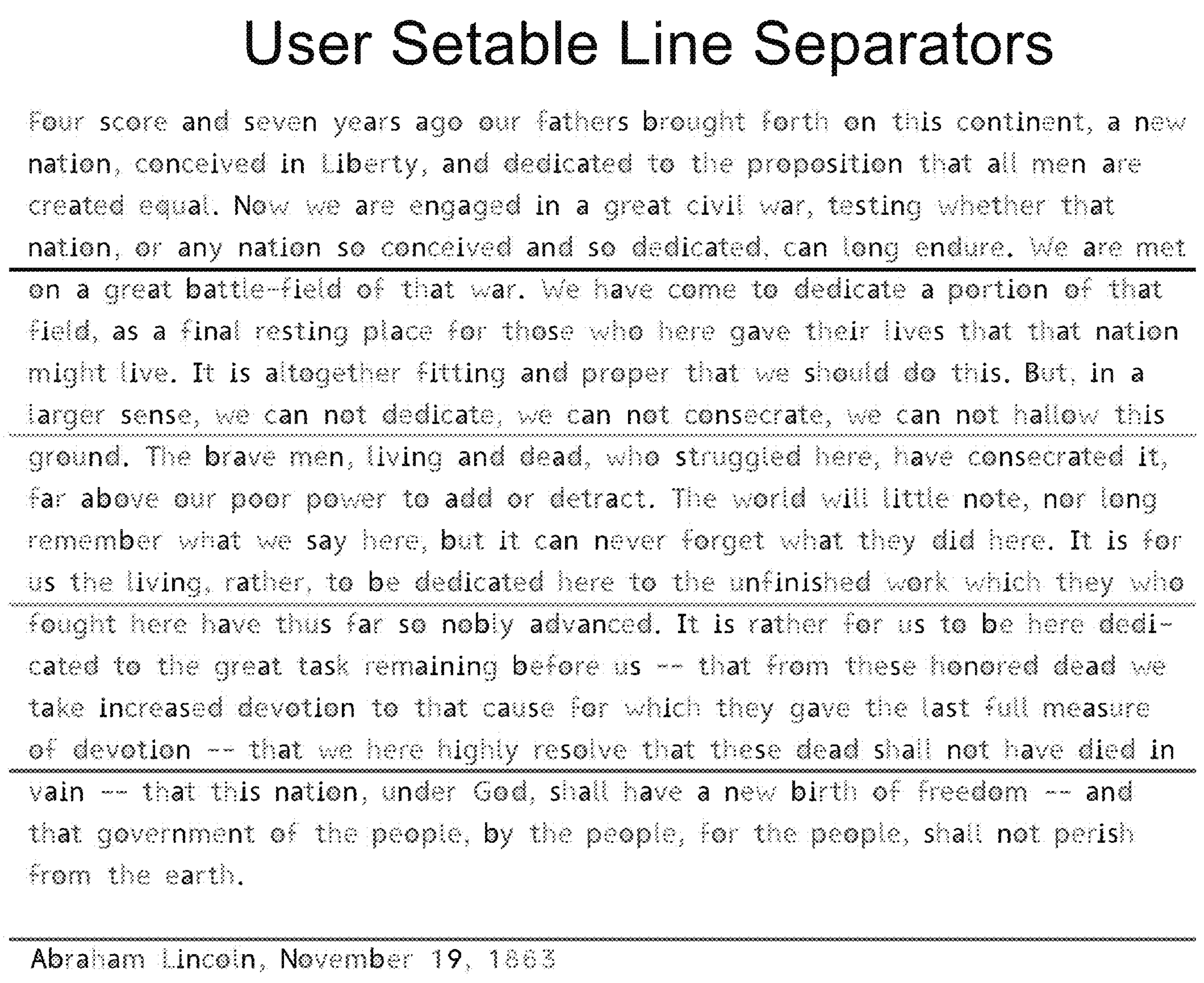

FIG. 2N presents a flowchart representation of an example method;

FIGS. 3A-3I present examples of various glyphs;

FIG. 3J presents a table of example shape selections with colors along with notes;

FIG. 3K presents the application of color only, without the application of shape adjustments, on a pre-existing styled Logo;

FIGS. 4A-4D present charts of example single and multi glyph shape conflicts;

FIG. 5A shows variations of how light is processed and compressed into Hues by humans, animals and machines;

FIGS. 5B-5C presents examples of how the hue in Text is processed by normal vs color blind users;

FIGS. 5D-5M presents example of how light intensity and contrast affect the ability to distinguish text;

FIG. 5N presents an example selection of the most useful text colors for a white background;

FIG. 5P presents an example how color selection made for 3 color users will be compressed into fewer colors for 2 Color users (Red/Green Color Blind);

FIGS. 5Q-5R present example glyphs with dual colors;

FIGS. 5S-5T present example glyphs with diacritical marks;

FIG. 5U presents both allograph sets for the Latin Alphabet (upper & lower case), and the improved order created by matching colors;

FIG. 5V presents an example of color applied to all Latin Alphabet glyphs along with numbers, punctuation and other common items;

FIG. 5W presents an example of glyphs sorted by color for the purpose of checking for conflicts among shapes in both 3 color and 2 color versions;

FIGS. 6A-6J present example tools to examine shape conflicted glyphs to confirm the improved distinctiveness of colored text using both 3 and 2 color versions, so as to identify any remaining conflicts;

FIGS. 7A-7B present examples of user set-able features; and

Figure 8A:
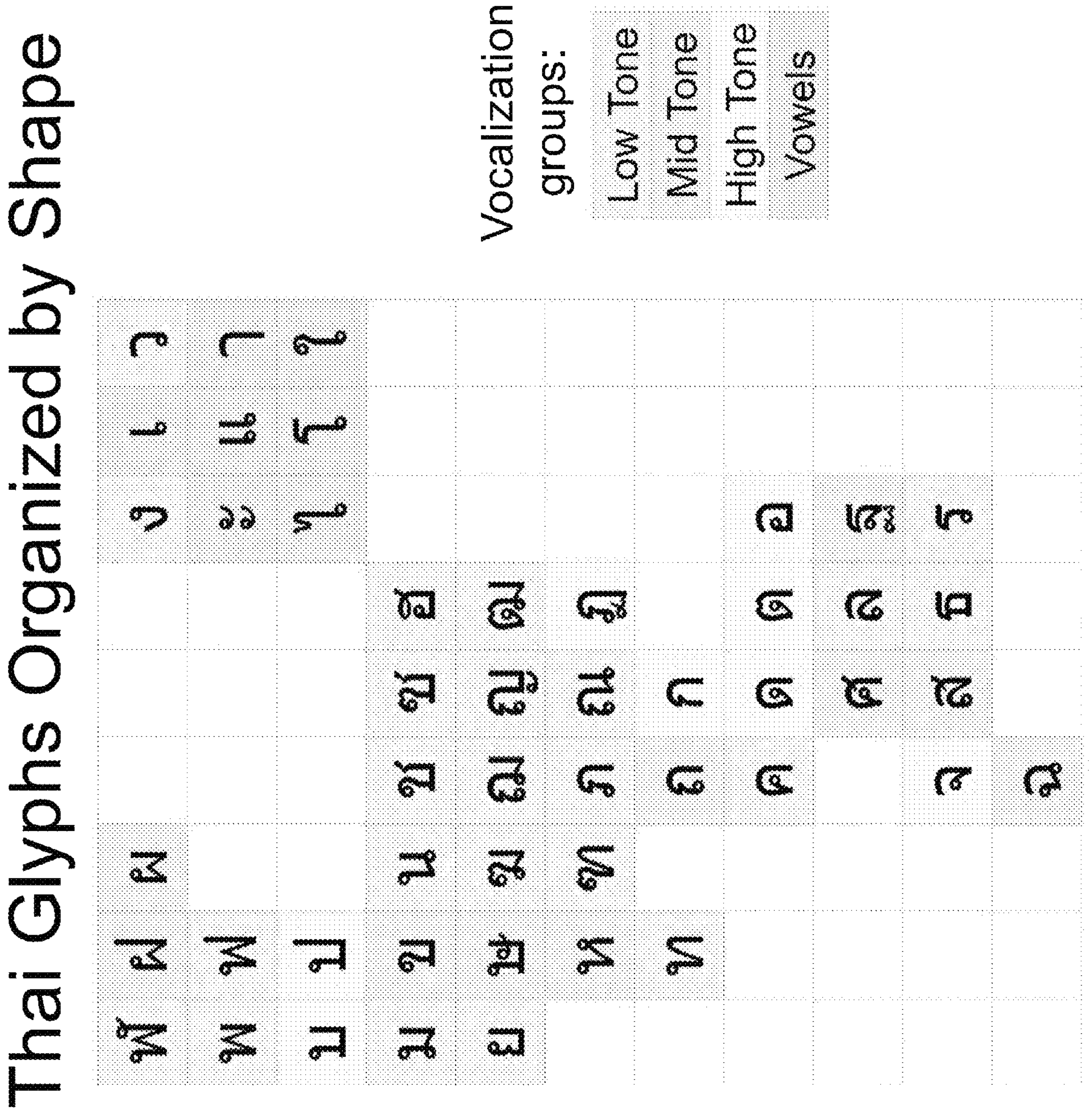

FIGS. 8A-8B present examples of the application of the conversion analysis process to additional languages.

DETAILED DESCRIPTION OF THE INVENTION

The present disclosure relates to dyslexia text conversion using multicolor renderings. These conversions, renderings and the techniques described herein rely on color and therefore can be best understood in light of the many color drawings that are presented herein.

Figure 1A:
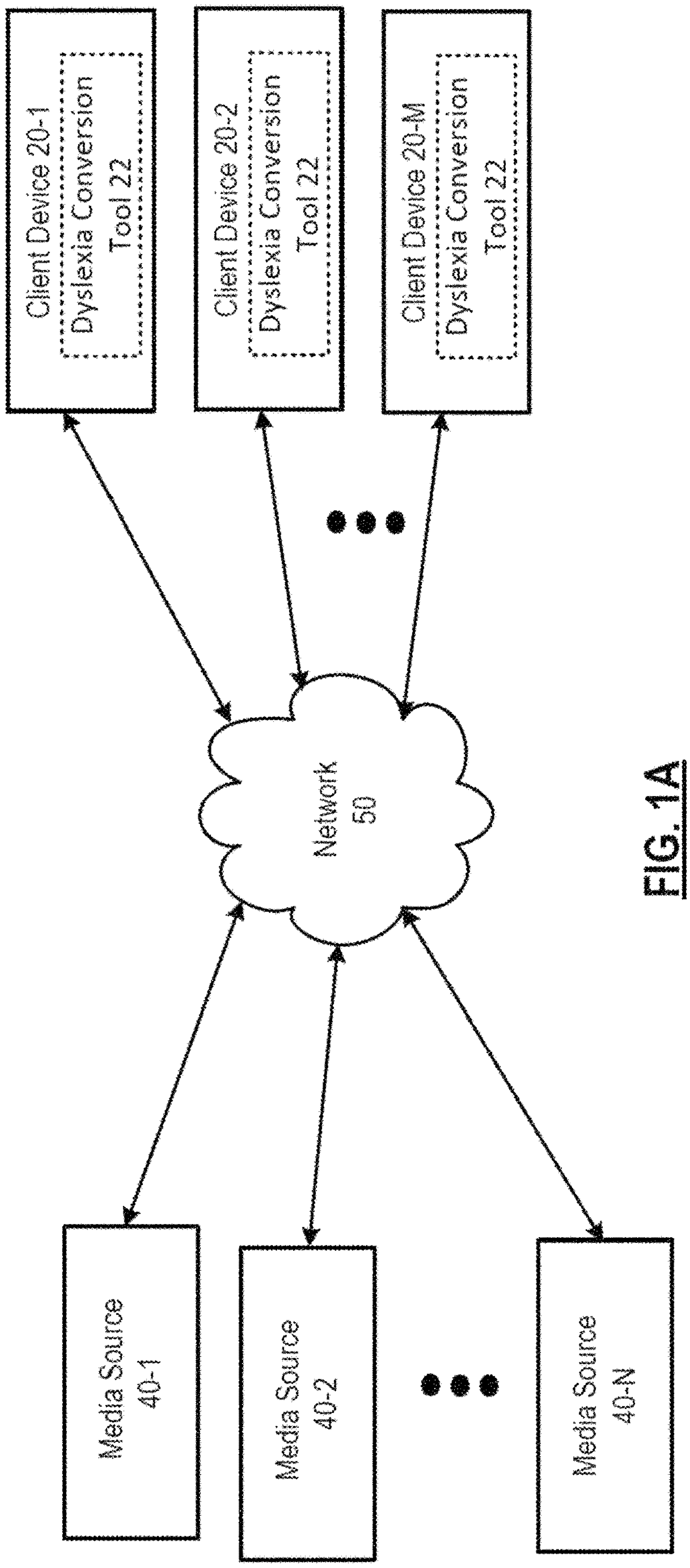
FIG. 1A is a schematic block diagram of a processing system.

FIG. 1A is a schematic block diagram of a processing system 10-1 that communicates via network 50. The network 50 can include a wired and/or wireless network and can, for example, include the Internet or other wide area or local area network, either public or private.

The processing system 10-1 includes a media sources 40 (such as media sources 40-1, 40-2, . . . 40-N) that communicate with M client devices 20 (such as client devices 20-1, 20-2, . . . 20-M) associated with users. Each of the client devices includes a dyslexia conversion tool 22 that operates via a custom media application or a standard media application (app) such as a browser, social media app, communication application, news, sports or streaming video application, gaming application, or other media application that receives, generates or otherwise displays textual characters, with or without other media that is either received from one of the media sources 40 or generated internally via the client device 20 itself. In operation, the dyslexia conversion tool 22 performs a dyslexia conversion of such input text into dyslexia converted text for display via a display device associated with the client device 20 such as a color monitor, touch screen or other display screen and/or a color printer that generates a printed display. In this fashion, the effects of dyslexia can be reduced by aiding in a user's perception and comprehension of text. While much of the discussion that follows focuses on dyslexic users, the dyslexia converted text as described herein can further aid the reading ability of other users.

In various examples, the client devices 20 and the media sources 40 can each be implemented via a computing entity 110 that will be described in greater detail in conjunction with FIGS. 2A-2N that follow. More specifically, the client devices 20 can each be implemented via a smartphone, tablet, laptop or other personal computing system associated with a user and the media sources 40 can be implemented via servers and/or other components of a cloud computing environment.

Consider the following example where a client device 20 includes at least one computing device having a processor and a memory that stores executable instructions that, when executed by the at least one computing device, cause the client device to:

- receive media data that includes input text having characters of a set of characters;
- receive a dyslexia conversion indication; and
- generate, via a dyslexia conversion tool, responsive to the dyslexia conversion indication and based on the input text, dyslexia converted text for display via a display device, wherein the dyslexia conversion tool performs a dyslexia conversion of the input text.

In various examples, the dyslexia conversion operates by:

- partitioning the set of characters into subsets of non-dyslexia-conflicting characters, wherein a union of the subsets of non-dyslexia-conflicting characters is the set of characters and wherein an intersection between each pair of the subsets of non-dyslexia-conflicting characters is a null set;
- assigning to each of the subsets of non-dyslexia-conflicting characters, at least one of a plurality of colors;
- mapping each character of the input text to a corresponding one of the subsets of non-dyslexia-conflicting characters; and
- generating the dyslexia converted text by rendering each character of the input text in accordance with the at least one of the plurality of colors assigned to the corresponding one of the subsets of non-dyslexia-conflicting characters.

In addition or in the alternative to any of the foregoing, the set of characters includes a plurality of allographs each of the plurality of allographs corresponding to a grapheme, and each of the plurality of allographs having a plurality of glyphs and wherein partitioning the set of characters into the subsets of non-dyslexia-conflicting characters assigns the plurality of glyphs of each of the plurality of allographs to a single one of the subsets of non-dyslexia-conflicting characters. For example, the set of characters can include upper and lower case letters (i.e., an allograph set) that can be represented by glyphs. In addition or in the alternative to any of the foregoing, the set of characters includes numbers, punctuation and/or symbols that can be represented by glyphs.

In addition or in the alternative to any of the foregoing, partitioning the set of characters into the subsets of non-dyslexia-conflicting characters assigns each glyph from a group of shape-conflicting glyphs into differing ones of the subsets of non-dyslexia-conflicting characters.

In addition or in the alternative to any of the foregoing, the plurality of colors are each different.

In addition or in the alternative to any of the foregoing, at least one of the subsets of non-dyslexia-conflicting characters is assigned to two of the plurality of colors, and wherein each character of the at least one of the subsets of non-dyslexia-conflicting characters is rendered in the two of the plurality of colors.

In addition or in the alternative to any of the foregoing, the executable instructions, when executed by the at least one computing device, further cause the computing entity to: overlay a background on the media data; and overlay the dyslexia converted text on the background.

In addition or in the alternative to any of the foregoing, rendering each character of the input text in accordance with the at least one of the plurality of colors assigned to the corresponding one of the subsets of non-dyslexia-conflicting characters includes applying the at least one of the plurality of colors to one of the characters of the input text and/or applying the at least one of the plurality of colors to spaces within one of the characters of the input text.

Figure 6A:
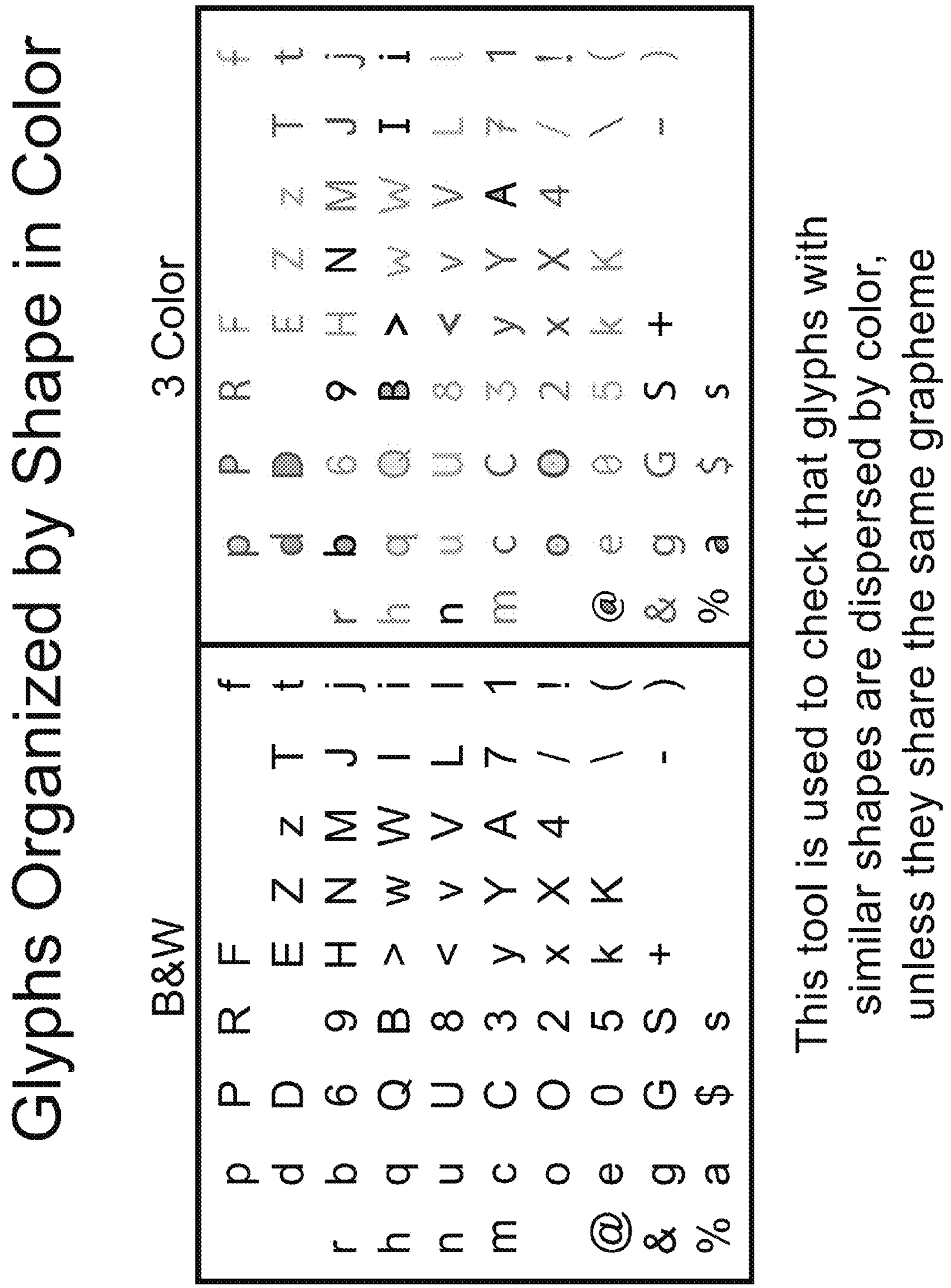

Consider the following example, presented in FIG. 6D, where the partitioning of a set of characters (e.g., glyphs) that includes upper and lower case letters (i.e., allograph sets), numbers, punctuation and symbols yields subsets of non-dyslexia-conflicting characters, (e.g., non-conflicting shapes and/or matching graphemes) as follows:

Aa@
Bb
SsIiNn.+>?%#*
Qq
Ff
Pp
Oo
Dd
Ee$
Kk6π( )
ZzUu5"
XxJj81:\¶
VvMm2
Yy,=
CcRrTt4;!-<&'
HhWwL13/Gg

Figure 6B:
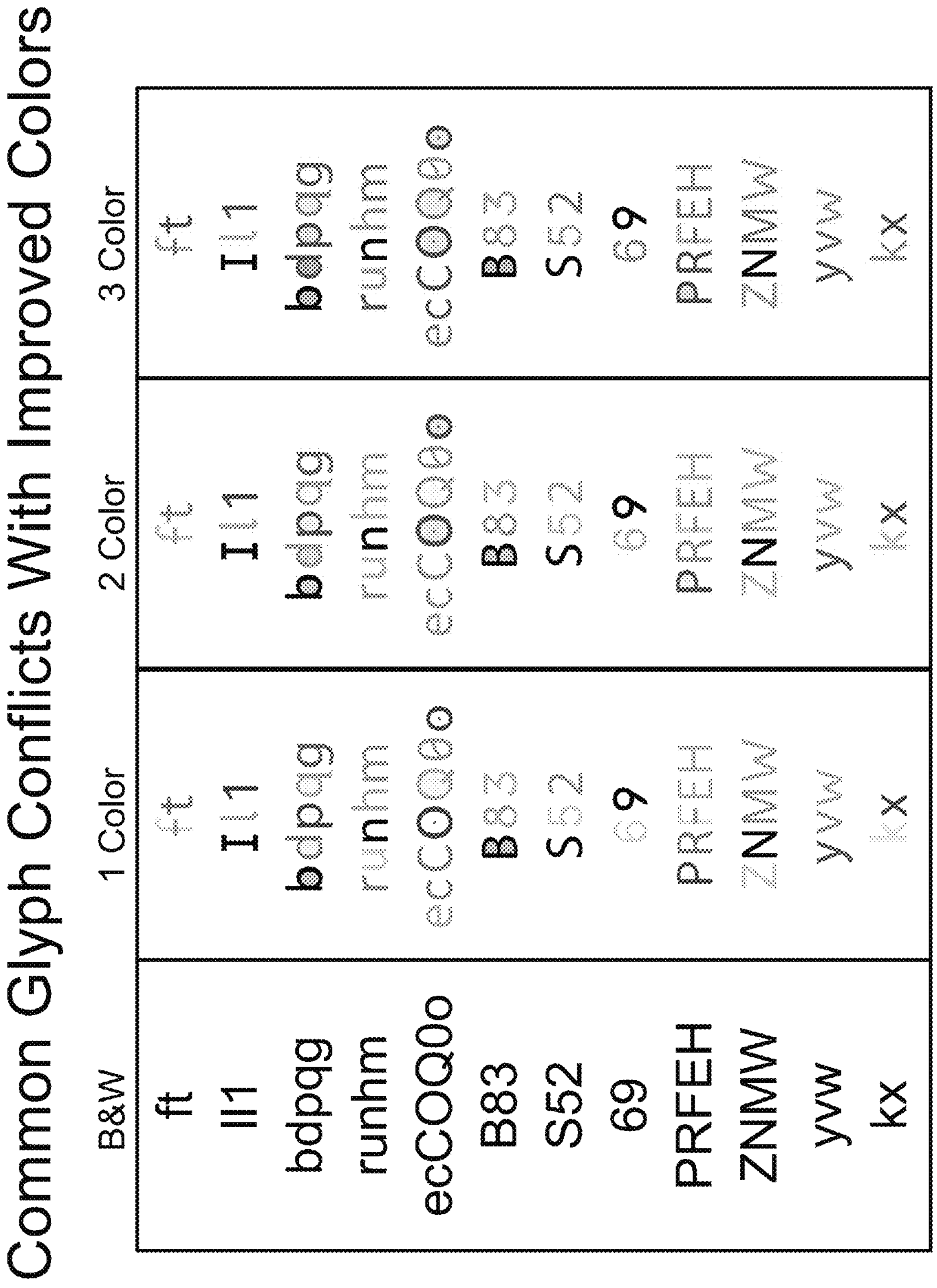
Figure 6D:
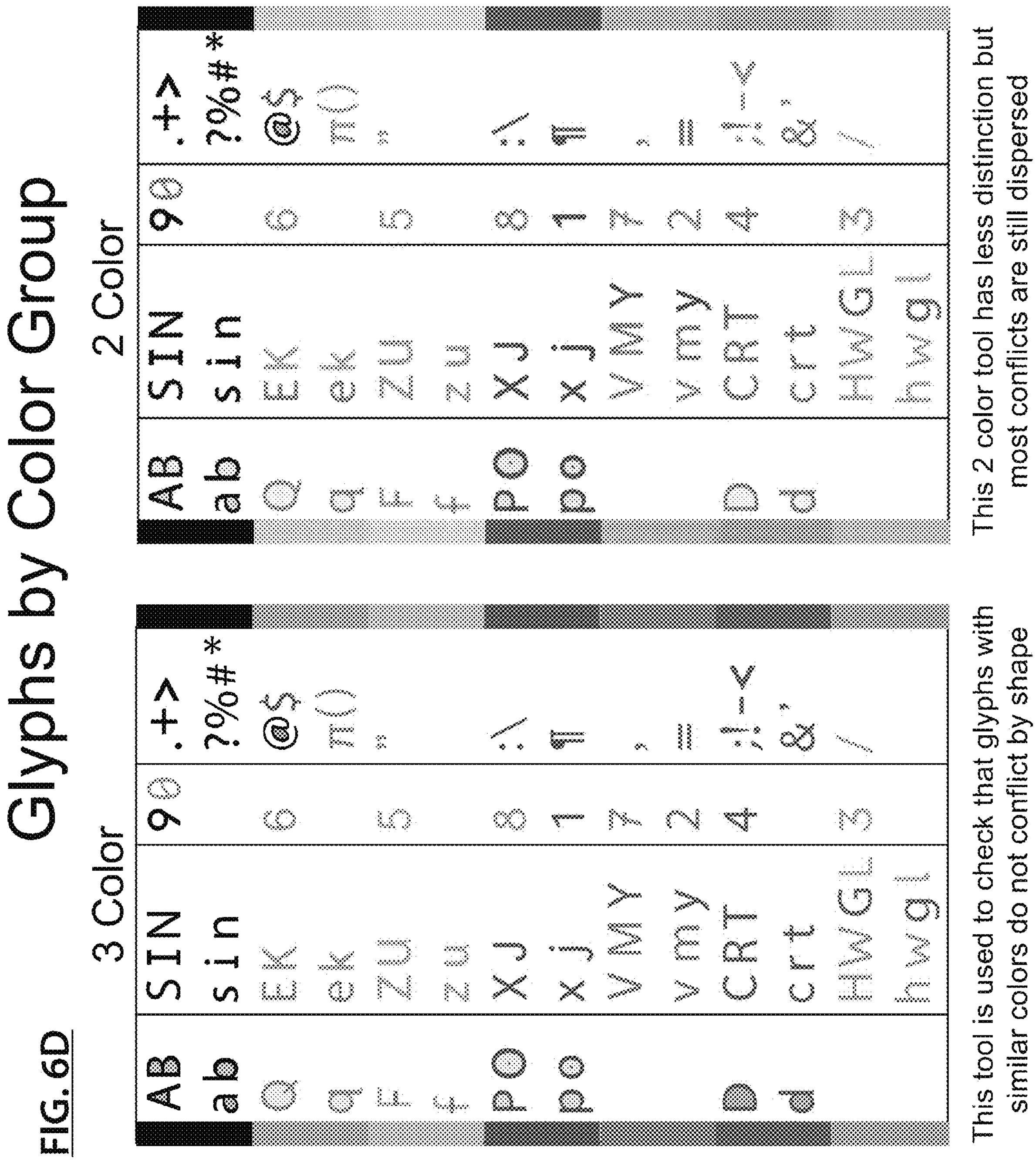

It can be noted from the partitioning above, and shown in FIG. 6B that each glyph from a group of shape-conflicting glyphs is assigned to differing subsets. In this fashion, the glyphs Il1 are separated, bdpqg are separated, B83 are separated, S52 are separated, 69 are separated, PR are separated, ZN are separated, EFHNMW are separated yvw are separated kx are separated, etc. With the partitioning above, each different subset can be mapped to a unique color or combination of two colors as shown in color groupings presented in FIG. 6D. In this fashion, the dyslexia converted text can represent the set of characters via the plurality of glyphs that are shown. It is noted that color mappings include the selective use of color filling, and/or other use of two colors to implement selective glyphs. It is also noted that, portions of the dyslexia converted text represent a plurality of allograph sets (e.g. upper and lower case letters), as presented in FIG. 5U, wherein each of the plurality of allograph sets corresponds to a grapheme (e.g., the corresponding letter itself in English and similarly for allograph sets in other languages). Further details regarding the operation of the processing system 10-1, including several optional implementations, functions and features are also described in conjunction with the figures that follow.

Figure 1B:
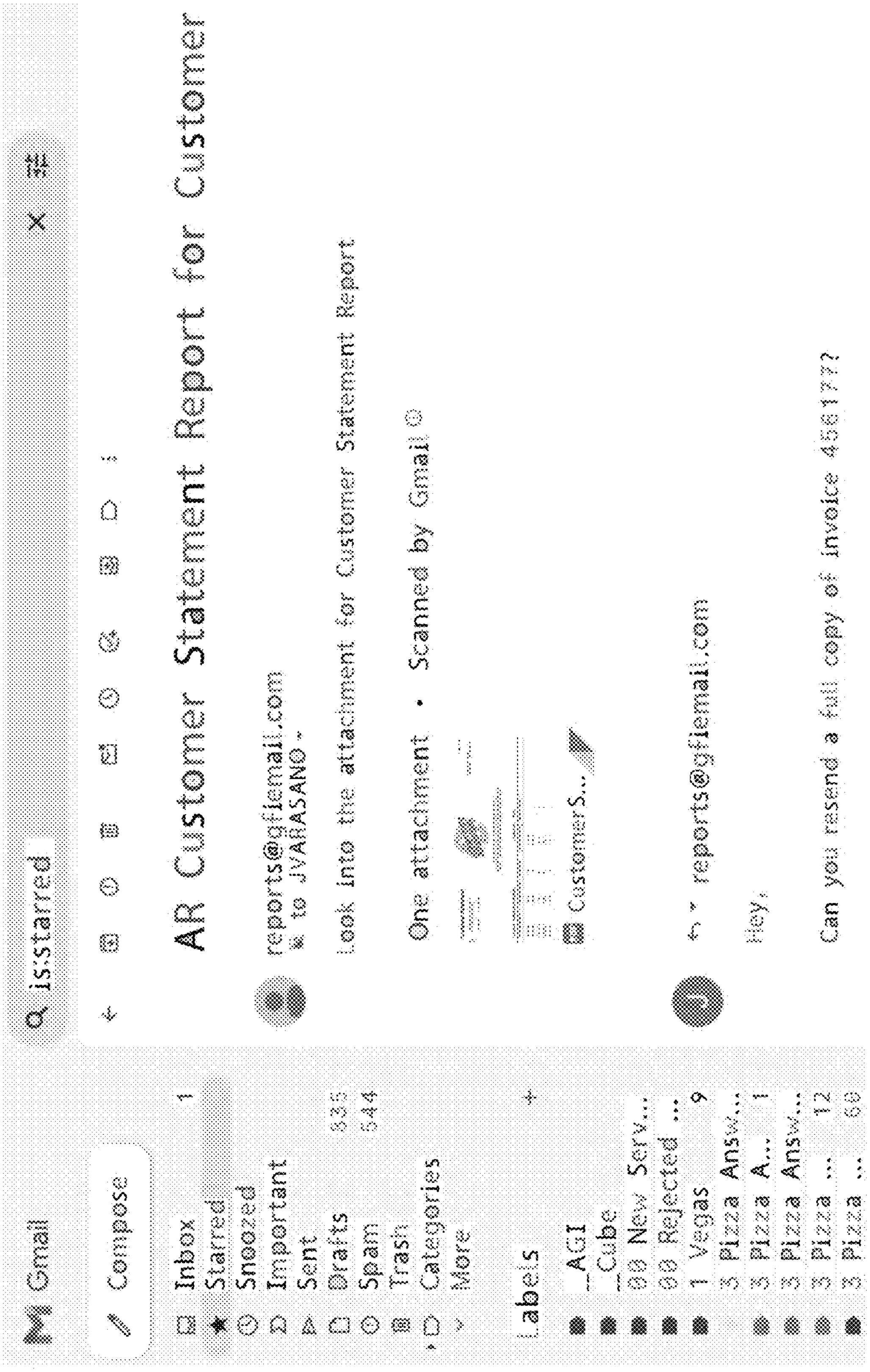
FIGS. 1B through 1E are pictorial diagrams of example screen displays.
Figure 1C:
Figure 1D:
Figure 1E:
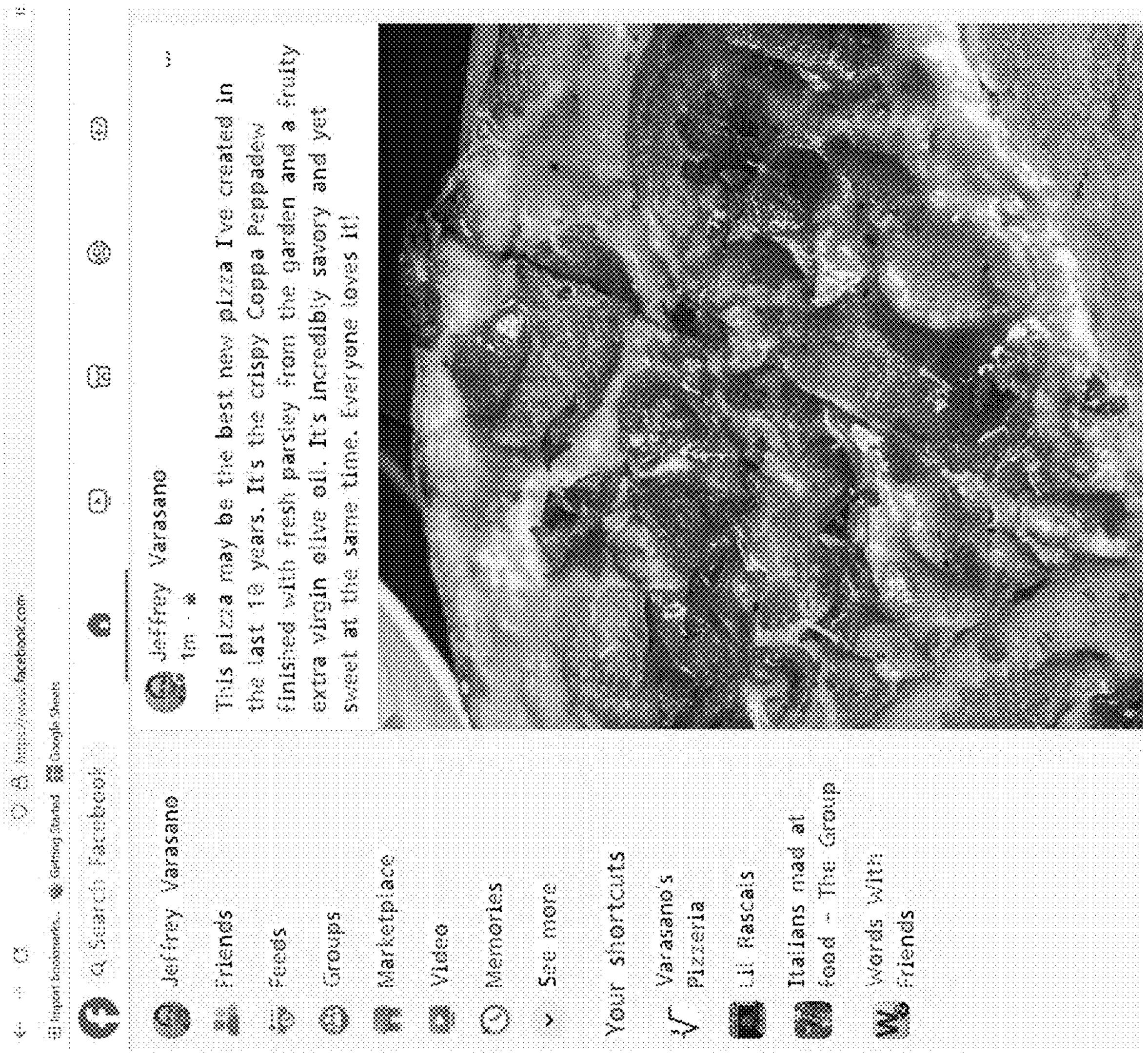

Consider further an example where the user of client device has elected to implement the dyslexia conversion tool 22 via a browser, such as Firefox, on a client device 20. As a result, when input text is received by the browser, it can be converted and displayed as dyslexia converted text. In FIG. 1B, the user has accessed the user's Gmail account. Associated text, whether received or input by the user, is displayed as dyslexia friendly text via a typeface with distinct colorings and selected shapes that aid the user in distinguishing between character shapes that could otherwise be confused. Similar results are obtained for TikTok in FIG. 1C, a spreadsheet in FIG. 1D, and Facebook in FIG. 1E.

The processing system 10-1 improves the technology of computing systems for dyslexic users to provide a dyslexia conversion indication, such as the click of a button, selection of a setting, or other interaction with a graphical user interface associated with the client device 20, the loading of a dyslexia conversion tool 22, selection of a dyslexia converting font from a list of fonts or other indication generated in response to actions of the user, by converting standard text into dyslexic converted text that is easier for dyslexic users to perceive.

Figure 1F:
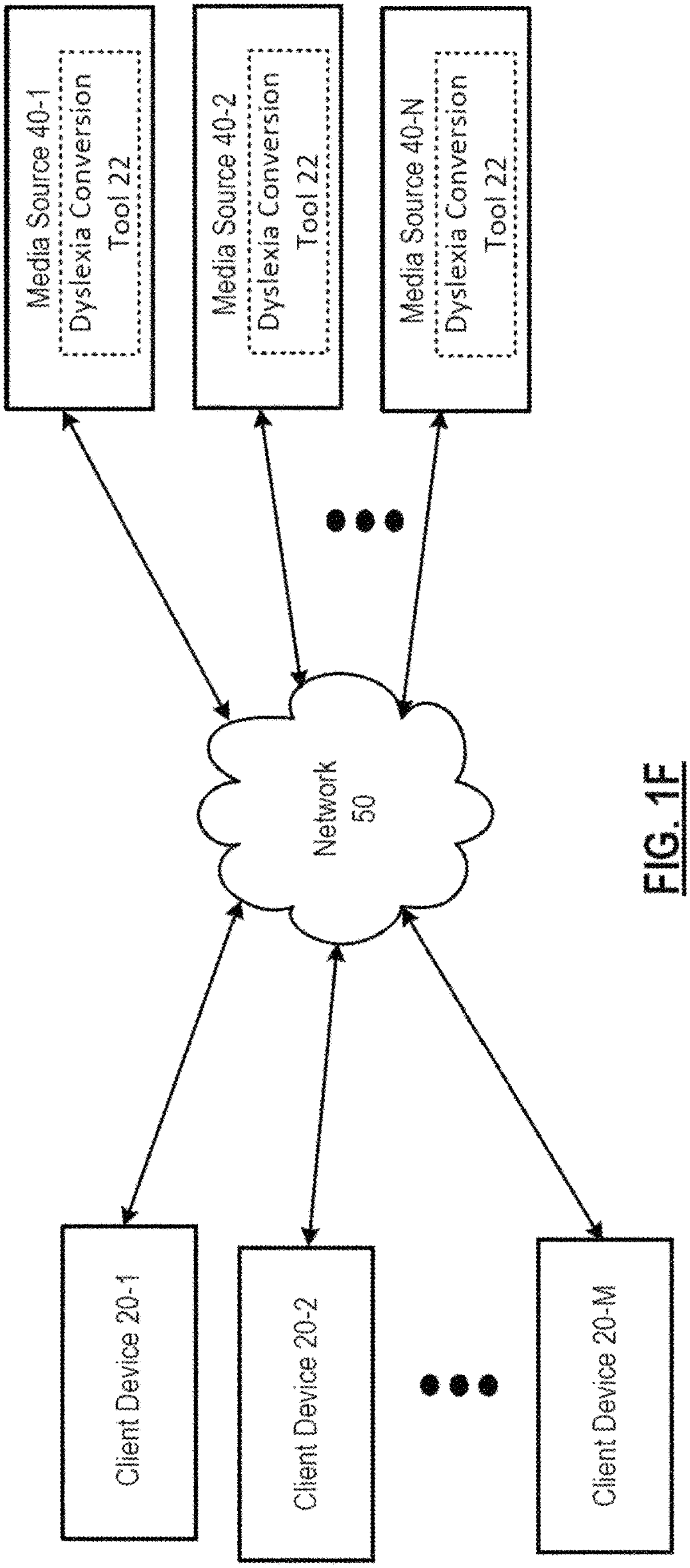
FIG. 1F is a schematic block diagram of a processing system.

While much of the foregoing has focused on the implementation of the dyslexia conversion tool 22 in the client device, it should be noted that, in other examples, the media sources 40 could themselves implement the tool as shown in the processing system of FIG. 1F. In particular, a media source 40 includes at least one computing device having a processor and a memory that stores executable instructions that, when executed by the at least one computing device, cause the client device to:

- receive media data that includes input text having characters of a set of characters;
- receive a dyslexia conversion indication; and
- generate, via a dyslexia conversion tool, responsive to the dyslexia conversion indication and based on the input text, dyslexia converted text for display via a display device, wherein the dyslexia conversion tool performs a dyslexia conversion of the input text.

As previously discussed, the dyslexia conversion can operate by:

- partitioning the set of characters into subsets of non-dyslexia-conflicting characters, wherein a union of the subsets of non-dyslexia-conflicting characters is the set of characters and wherein an intersection between each pair of the subsets of non-dyslexia-conflicting characters is a null set;
- assigning to each of the subsets of non-dyslexia-conflicting characters, at least one of a plurality of colors;
- mapping each character of the input text to a corresponding one of the subsets of non-dyslexia-conflicting characters; and
- generating the dyslexia converted text by rendering each character of the input text in accordance with the at least one of the plurality of colors assigned to the corresponding one of the subsets of non-dyslexia-conflicting characters.

Figure 1G:
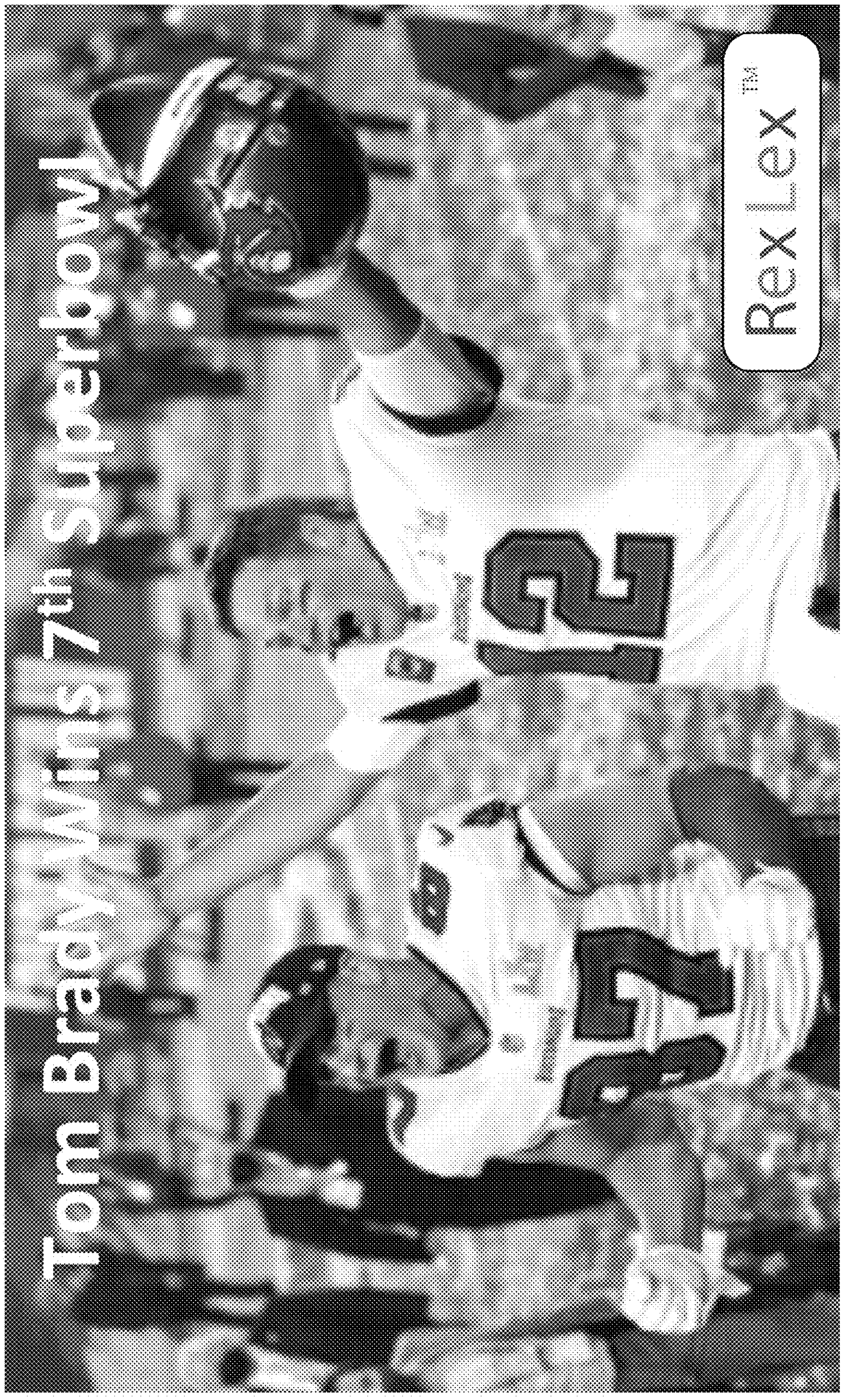
FIGS. 1G and 1H are pictorial diagrams of example screen displays.
Figure 1H:
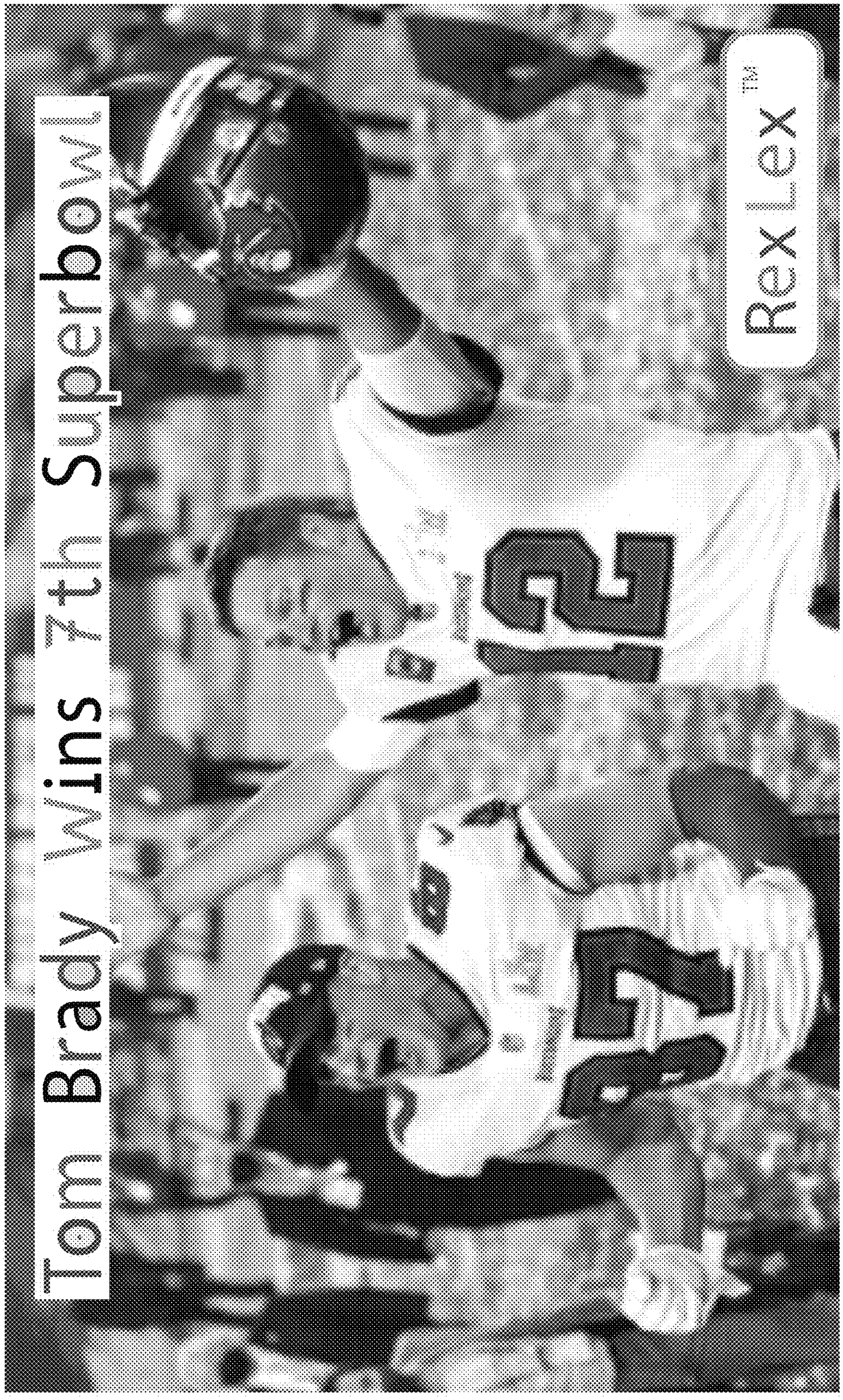

Consider the following further example. In FIG. 1G, the user has accessed media from a media source 40 with standard monochromatic text. When the user selects the RexLex button, a dyslexia conversion indication is generated by the user interface, this indication is received by the media source 40 and triggers the media source 40 to change modes to dyslexia text conversion. It should be noted, that while a button is shown, other dyslexia conversion indications could likewise be implemented. The result is shown in FIG. 1H, with the dyslexia converted text automatically overlaid with a white background to enhance visibility.

The processing system 10-2 also improves the technology of computing systems for dyslexic users to provide a dyslexia conversion indication, such as the click of a button or other interaction with a graphical user interface associated with the client device 20, the loading of a dyslexia conversion tool 22 or indication generated in response to actions of the user, by converting standard text into dyslexic converted text that is easier for dyslexic users to comprehend.

FIGS. 2A through 2E are schematic block diagram of embodiments of computing entities that form at least part of an improved computer technology. In particular, these computing entities can be used to implement the property maintenance platform 30, the client devices 20 and/or 25, and/or the property systems 40.

FIG. 2A is schematic block diagram of an embodiment of a computing entity 110 that includes a computing device 120 (e.g., one or more of the embodiments of FIGS. 2F-2L). A computing device may function as a user computing device, a server, a system computing device, a data storage device, a data security device, a networking device, a user access device, a cell phone, a tablet, a laptop, a printer, a game console, a satellite control box, a cable box, etc.

FIG. 2B is schematic block diagram of an embodiment of a computing entity 110 that includes two or more computing devices 120 (e.g., two or more from any combination of the embodiments of FIGS. 2F-2L). The computing devices 120 perform the functions of a computing entity in a peer processing manner (e.g., coordinate together to perform the functions), in a master-slave manner (e.g., one computing device coordinates and the other support it), and/or in another manner.

FIG. 2C is schematic block diagram of an embodiment of a computing entity 110 that includes a network of computing devices 120 (e.g., two or more from any combination of the embodiments of FIGS. 2F-2L). The computing devices are coupled together via one or more network connections (e.g., WAN, LAN, cellular data, WLAN, etc.) and perform the functions of the computing entity.

FIG. 2D is schematic block diagram of an embodiment of a computing entity 110 that includes a primary computing device (e.g., any one of the computing devices of FIGS. 2F-2L), an interface device (e.g., a network connection), and a network of computing devices 120 (e.g., one or more from any combination of the embodiments of FIGS. 2F-2L). The primary computing device utilizes the other computing devices as co-processors to execute one or more functions of the computing entity, as storage for data, for other data processing functions, and/or storage purposes.

FIG. 2E is schematic block diagram of an embodiment of a computing entity 110 that includes a primary computing device (e.g., any one of the computing devices of FIGS. 2F-2L), an interface device (e.g., a network connection) 122, and a network of computing resources 124 (e.g., two or more resources from any combination of the embodiments of FIGS. 2F-2L). The primary computing device utilizes the computing resources as co-processors to execute one or more the functions of the computing entity, as storage for data, for other data processing functions, and/or storage purposes.

FIGS. 2F-2L are schematic block diagram of embodiments of computing devices that form at least a portion of a computing entity. FIG. 2F is a schematic block diagram of an embodiment of a computing device 120 that includes a plurality of computing resources. The computing resources, which form a computing core, include one or more core control modules 130, one or more processing modules 132, one or more main memories 136, a read only memory (ROM) 134 for a boot up sequence, cache memory 138, one or more video graphics processing modules 140, one or more displays 142 (optional), an Input-Output (I/O) peripheral control module 144, an I/O interface module 146 (which could be omitted if direct connect IO is implemented), one or more input interface modules 148, one or more output interface modules 150, one or more network interface modules 158, and one or more memory interface modules 156.

A processing module 132 is described in greater detail at the end of the detailed description section and, in an alternative embodiment, has a direction connection to the main memory 136. In an alternate embodiment, the core control module 130 and the I/O and/or peripheral control module 144 are one module, such as a chipset, a quick path interconnect (QPI), and/or an ultra-path interconnect (UPI).

The processing module 132, the core module 130, and/or the video graphics processing module 140 form a processing core for the improved computer. Additional combinations of processing modules 132, core modules 130, and/or video graphics processing modules 140 form co-processors for the improved computer for technology. Computing resources 124 of FIG. 2E include one more of the components shown in this FIG. and/or in or more of FIGS. 2G-2L.

Each of the main memories 136 includes one or more Random Access Memory (RAM) integrated circuits, or chips. In general, the main memory 136 stores data and operational instructions most relevant for the processing module 132. For example, the core control module 130 coordinates the transfer of data and/or operational instructions between the main memory 136 and the secondary memory device(s) 160. The data and/or operational instructions retrieved from secondary memory 160 are the data and/or operational instructions requested by the processing module or will most likely be needed by the processing module. When the processing module is done with the data and/or operational instructions in main memory, the core control module 130 coordinates sending updated data to the secondary memory 160 for storage.

The secondary memory 160 includes one or more hard drives, one or more solid state memory chips, and/or one or more other large capacity storage devices that, in comparison to cache memory and main memory devices, is/are relatively inexpensive with respect to cost per amount of data stored. The secondary memory 160 is coupled to the core control module 130 via the I/O and/or peripheral control module 144 and via one or more memory interface modules 156. In an embodiment, the I/O and/or peripheral control module 144 includes one or more Peripheral Component Interface (PCI) buses to which peripheral components connect to the core control module 130. A memory interface module 156 includes a software driver and a hardware connector for coupling a memory device to the I/O and/or peripheral control module 144. For example, a memory interface 156 is in accordance with a Serial Advanced Technology Attachment (SATA) port.

The core control module 130 coordinates data communications between the processing module(s) 132 and network(s) via the I/O and/or peripheral control module 144, the network interface module(s) 158, and one or more network cards 162. A network card 160 includes a wireless communication unit or a wired communication unit. A wireless communication unit includes a wireless local area network (WLAN) communication device, a cellular communication device, a Bluetooth device, and/or a ZigBee communication device. A wired communication unit includes a Gigabit LAN connection, a Firewire connection, and/or a proprietary computer wired connection. A network interface module 158 includes a software driver and a hardware connector for coupling the network card to the I/O and/or peripheral control module 144. For example, the network interface module 158 is in accordance with one or more versions of IEEE 802.11, cellular telephone protocols, 10/100/1000 Gigabit LAN protocols, etc.

The core control module 130 coordinates data communications between the processing module(s) 132 and input device(s) 152 via the input interface module(s) 148, the I/O interface 146, and the I/O and/or peripheral control module 144. An input device 152 includes a keypad, a keyboard, control switches, a touchpad, a microphone, a camera, etc. An input interface module 148 includes a software driver and a hardware connector for coupling an input device to the I/O and/or peripheral control module 144. In an embodiment, an input interface module 148 is in accordance with one or more Universal Serial Bus (USB) protocols.

The core control module 130 coordinates data communications between the processing module(s) 132 and output device(s) 154 via the output interface module(s) 150 and the I/O and/or peripheral control module 144. An output device 154 includes a speaker, auxiliary memory, headphones, etc. An output interface module 150 includes a software driver and a hardware connector for coupling an output device to the I/O and/or peripheral control module 144. In an embodiment, an output interface module 150 is in accordance with one or more audio codec protocols.

The processing module 132 communicates directly with a video graphics processing module 140 to display data on the display 142. The display 142 includes an LED (light emitting diode) display, an LCD (liquid crystal display), and/or other type of display technology. The display has a resolution, an aspect ratio, and other features that affect the quality of the display. The video graphics processing module 140 receives data from the processing module 132, processes the data to produce rendered data in accordance with the characteristics of the display, and provides the rendered data to the display 142.

FIG. 2G is a schematic block diagram of an embodiment of a computing device 120 that includes a plurality of computing resources similar to the computing resources of FIG. 2F with the addition of one or more cloud memory interface modules 164, one or more cloud processing interface modules 166, cloud memory 168, and one or more cloud processing modules 170. The cloud memory 168 includes one or more tiers of memory (e.g., ROM, volatile (RAM, main, etc.), non-volatile (hard drive, solid-state, etc.) and/or backup (hard drive, tape, etc.)) that is remoted from the core control module and is accessed via a network (WAN and/or LAN). The cloud processing module 170 is similar to processing module 132 but is remote from the core control module and is accessed via a network.

FIG. 2H is a schematic block diagram of an embodiment of a computing device 120 that includes a plurality of computing resources similar to the computing resources of FIG. 2G with a change in how the cloud memory interface module(s) 164 and the cloud processing interface module(s) 166 are coupled to the core control module 130. In this embodiment, the interface modules 164 and 166 are coupled to a cloud peripheral control module 172 that directly couples to the core control module 130.

FIG. 2I is a schematic block diagram of an embodiment of a computing device 120 that includes a plurality of computing resources, which includes include a core control module 130, a boot up processing module 176, boot up RAM 174, a read only memory (ROM) 134, a one or more video graphics processing modules 140, one or more displays 48 (optional), an Input-Output (I/O) peripheral control module 144, one or more input interface modules 148, one or more output interface modules 150, one or more cloud memory interface modules 164, one or more cloud processing interface modules 166, cloud memory 168, and cloud processing module(s) 170.

In this embodiment, the computing device 120 includes enough processing resources (e.g., module 176, ROM 134, and RAM 174) to boot up. Once booted up, the cloud memory 168 and the cloud processing module(s) 170 function as the computing device's memory (e.g., main and hard drive) and processing module.

FIG. 2J is a schematic block diagram of another embodiment of a computing device 120 that includes a hardware section 180 and a software program section 182. The hardware section 180 includes the hardware functions of power management, processing, memory, communications, and input/output. FIG. 2L illustrates the hardware section 180 in greater detail.

The software program section 182 includes an operating system 184, system and/or utilities applications, and user applications. The software program section further includes APIs and HWIs. APIs (application programming interface) are the interfaces between the system and/or utilities applications and the operating system and the interfaces between the user applications and the operating system 184. HWIs (hardware interface) are the interfaces between the hardware components and the operating system. For some hardware components, the HWI is a software driver. The functions of the operating system 184 are discussed in greater detail with reference to FIG. 2K.

FIG. 2K is a diagram of an example of the functions of the operating system of a computing device 120. In general, the operating system function to identify and route input data to the right places within the computer and to identify and route output data to the right places within the computer. Input data is with respect to the processing module and includes data received from the input devices, data retrieved from main memory, data retrieved from secondary memory, and/or data received via a network card. Output data is with respect to the processing module and includes data to be written into main memory, data to be written into secondary memory, data to be displayed via the display and/or an output device, and data to be communicated via a network care.

The operating system 184 includes the OS functions of process management, command interpreter system, I/O device management, main memory management, file management, secondary storage management, error detection & correction management, and security management. The process management OS function manages processes of the software section operating on the hardware section, where a process is a program or portion thereof.

The process management OS function includes a plurality of specific functions to manage the interaction of software and hardware. The specific functions include:

- load a process for execution;
- enable at least partial execution of a process;
- suspend execution of a process;
- resume execution of a process;
- terminate execution of a process;
- load operational instructions and/or data into main memory for a process;
- provide communication between two or more active processes;
- avoid deadlock of a process and/or interdependent processes; and
- control access to shared hardware components.

The I/O Device Management OS function coordinates translation of input data into programming language data and/or into machine language data used by the hardware components and translation of machine language data and/or programming language data into output data. Typically, input devices and/or output devices have an associated driver that provides at least a portion of the data translation. For example, a microphone captures analog audible signals and converts them into digital audio signals per an audio encoding format. An audio input driver converts, if needed, the digital audio signals into a format that is readily usable by a hardware component.

The File Management OS function coordinates the storage and retrieval of data as files in a file directory system, which is stored in memory of the computing device. In general, the file management OS function includes the specific functions of:

- File creation, editing, deletion, and/or archiving;
- Directory creation, editing, deletion, and/or archiving;
- Memory mapping files and/or directors to memory locations of secondary memory; and
- Backing up of files and/or directories.

The Network Management OS function manages access to a network by the computing device. Network management includes

- Network fault analysis;
- Network maintenance for quality of service;
- Network access control among multiple clients; and
- Network security upkeep.

The Main Memory Management OS function manages access to the main memory of a computing device. This includes keeping track of memory space usage and which processes are using it; allocating available memory space to requesting processes; and deallocating memory space from terminated processes.

The Secondary Storage Management OS function manages access to the secondary memory of a computing device. This includes free memory space management, storage allocation, disk scheduling, and memory defragmentation.

The Security Management OS function protects the computing device from internal and external issues that could adversely affect the operations of the computing device. With respect to internal issues, the OS function ensures that processes negligibly interfere with each other; ensures that processes are accessing the appropriate hardware components, the appropriate files, etc.; and ensures that processes execute within appropriate memory spaces (e.g., user memory space for user applications, system memory space for system applications, etc.).

The security management OS function also protects the computing device from external issues, such as, but not limited to, hack attempts, phishing attacks, denial of service attacks, bait and switch attacks, cookie theft, a virus, a trojan horse, a worm, click jacking attacks, keylogger attacks, eavesdropping, waterhole attacks, SQL injection attacks, and DNS spoofing attacks.

FIG. 2L is a schematic block diagram of the hardware components of the hardware section 180 of a computing device. The memory portion of the hardware section includes the ROM 134, the main memory 136, the cache memory 138, the cloud memory 168, and the secondary memory 160. The processing portion of the hardware section includes the core control module 130, the processing module 132, the video graphics processing module 140, and the cloud processing module 170.

The input/output portion of the hardware section includes the cloud peripheral control module 172, the I/O and/or peripheral control module 144, the network interface module 158, the I/O interface module 146, the output device interface 150, the input device interface 148, the cloud memory interface module 164, the cloud processing interface module 166, and the secondary memory interface module 156. The IO portion further includes input devices such as a touch screen, a microphone, and switches. The IO portion also includes output devices such as speakers and a display.

The communication portion includes an ethernet transceiver network card (NC), a WLAN network card, a cellular transceiver, a Bluetooth transceiver, and/or any other device for wired and/or wireless network communication.

FIG. 2M is a schematic block diagram of an embodiment of a database that includes a data input computing entity 190, a data organizing computing entity 192, a data query processing computing entity 194, and a data storage computing entity 196. Each of the computing entities is an implementation in accordance with one or more of the embodiments of FIGS. 2A through 2E.

The data input computing entity 190 is operable to receive an input data set 198. The input data set 198 is a collection of related data that can be represented in a tabular form of columns and rows, and/or other tabular structure. In an example, the columns represent different data elements of data for a particular source and the rows corresponds to the different sources (e.g., employees, licenses, email communications, etc.).

If the data set 198 is in a desired tabular format, the data input computing entity 190 provides the data set to the data organizing computing entity 192. If not, the data input computing entity 190 reformats the data set to put it into the desired tabular format.

The data organizing computing entity 192 organizes the data set 198 in accordance with a data organizing input 202. In an example, the input 202 is regarding a particular query and requests that the data be organized for efficient analysis of the data for the query. In another example, the input 202 instructions the data organizing computing entity 192 to organize the data in a time-based manner. The organized data is provided to the data storage computing entity for storage.

When the data query processing computing entity 194 receives a query 200, it accesses the data storage computing entity 196 regarding a data set for the query. If the data set is stored in a desired format for the query, the data query processing computing entity 194 retrieves the data set and executes the query to produce a query response 204. If the data set is not stored in the desired format, the data query processing computing entity 194 communicates with the data organizing computing entity 192, which re-organizes the data set into the desired format.

FIG. 2N presents a flowchart representation of an example method. In particular a method 300 is presented for use in conjunction with a processing system 10-1 or 10-2 and/or in conjunction with any of the other functions/features described herein. Step 302 includes receiving media data that includes input text having characters of a set of characters. Step 304 includes receiving a dyslexia conversion indication. Step 306 includes generating, via a dyslexia conversion tool, responsive to the dyslexia conversion indication and based on the input text, dyslexia converted text for display via a display device, wherein the dyslexia conversion tool performs a dyslexia conversion of the input text, and wherein the dyslexia conversion operates by:

- partitioning the set of characters into subsets of non-dyslexia-conflicting characters, wherein a union of the subsets of non-dyslexia-conflicting characters is the set of characters and wherein an intersection between each pair of the subsets of non-dyslexia-conflicting characters is a null set;
- assigning to each of the subsets of non-dyslexia-conflicting characters, at least one of a plurality of colors;
- mapping each character of the input text to a corresponding one of the subsets of non-dyslexia-conflicting characters; and
- generating the dyslexia converted text by rendering each character of the input text in accordance with the at least one of the plurality of colors assigned to the corresponding one of the subsets of non-dyslexia-conflicting characters.

In various embodiments, any set of the various examples listed above can be implemented in tandem, for example, in conjunction with performing some or all steps of FIG. 2N, some or all steps of and/or any other function, feature and/or methodology described herein.

The various additional examples hereinafter provide further definitions, motivations, details, examples and optional functions and features regarding the dyslexia conversion process and how it can be implemented that can be used in various embodiments and further combinations.

Definitions

Grapheme—The smallest functional unit of a writing system. For example, the general concept of the letter A is a grapheme, regardless of a specific representation, whether upper or lower case, script, size, typeface, etc. Numbers and punctuation marks are also graphemes Unicode—is an international standards body which maintains standard encoding numbers and rules for all modern computers. It's the official registry for mapping allographs to assigned numbers, which are called encoding numbers. It currently has registered 149,186 character encodings which includes languages from around the world, plus historical languages, math symbols, emojis and computer control characters.

ASCII—the subset of Unicode encodings for the first 128 characters which includes all the Latin (English) letters, punctuation, standard numbers, and basic math operators.

Glyph—the specific shape, design, or representation of a character. 18 separate glyphs of the single grapheme for the letter a are presented in FIG. 3A.

Figure 4A:
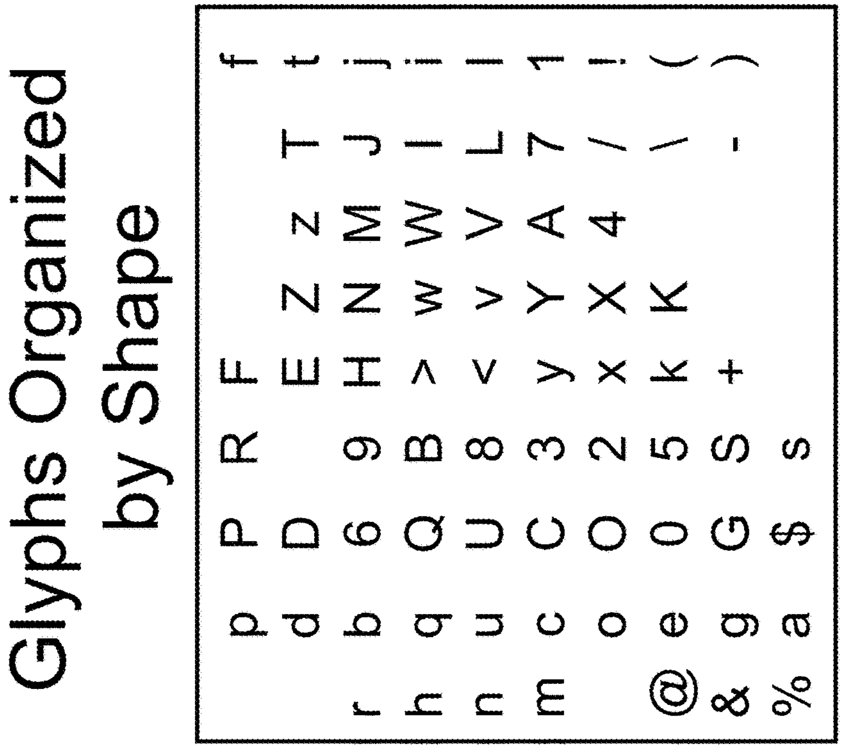
Figure 4B:
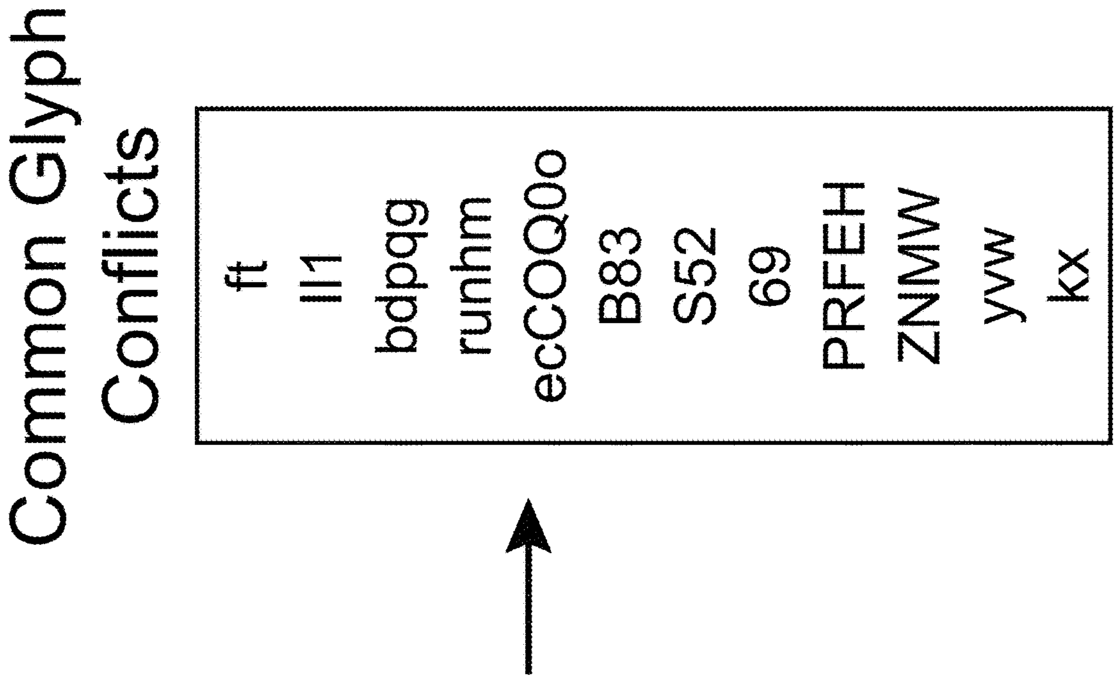
Figure 4D:
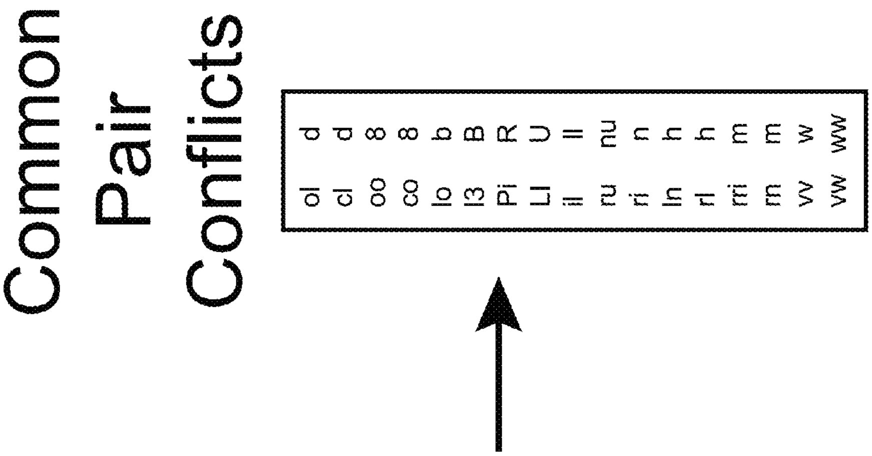
Figure 4C:
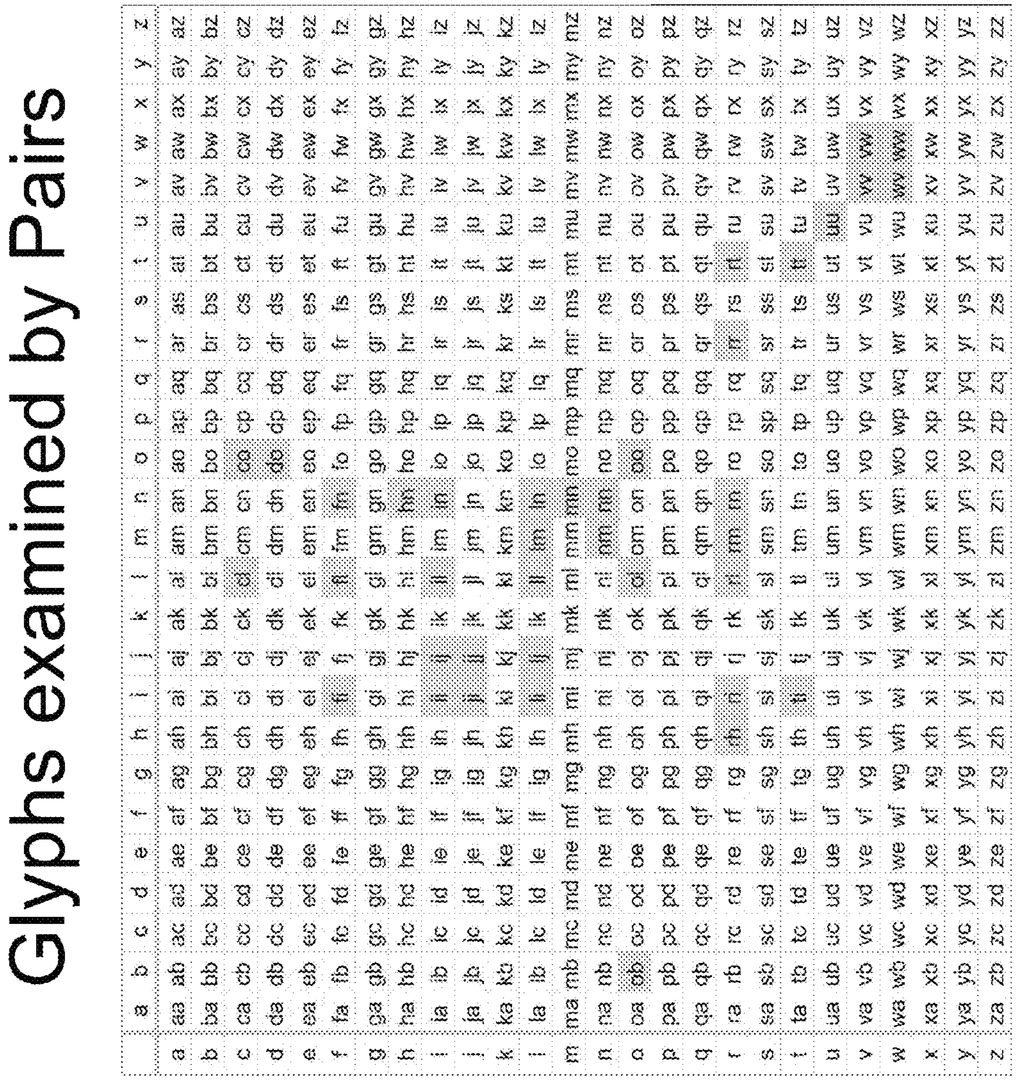

Allograph—denotes any glyphs that are considered variants of a letter or other grapheme. FIG. 3B presents an example of 2 generally accepted forms for the grapheme a. Additionally there is the concept of the Allograph Set—An obvious example in English (and many other writing systems) is the distinction between uppercase and lowercase letter sets. So, a and A are allographs of the general concept of the grapheme a. However, as shown in FIG. 3B even within the lower case a, these two basic shapes are also considered common allographs (variants) of the grapheme a. In Unicode, lower-case a is assigned one character number (encoding), with these two allographs variations being the choice of the typeface. Uppercase A is assigned a different Unicode encoding. Similarly, g & G are allographs of the general concept of the grapheme g. FIG. 4C presents 2 common uppercase allographs and 3 common lowercase allographs of the grapheme g. So these shapes of g represent: 1 grapheme, 2 Characters encodings (one for uppercase and one for lowercase), 5 allographs (generally recognized shape variations) and then various typefaces will create thousands of individual glyphs within the BASIC guidelines of the 5 allographs.

Allograph Set—a group of glyph shape variations that all denote a common usage. For example, Uppercase and Lowercase represent distinct Allograph Sets, with graphemes having separate glyphs within each set. In Arabic, instead of uppercase and lowercase there are 4 Allograph Sets which depend on a grapheme's position in a word (beginning, middle, end or standalone). The example of FIG. 3D shows the first few Arabic letters and their 4 common Allograph Sets. Other languages may have different distinct Allograph Sets such as formal vs informal. FIG. 3C shows 2 allographs of the grapheme g which are members of the uppercase Allograph Set and 3 allographs which are members of the Lowercase Allograph Set.

Character Encoding—A standard assignment of a character to a number for representation in a computer. Based on the above, this can lead to some confusion and compromise. For example, G and g are assigned separate encoding numbers—there are 2 encodings per grapheme, one for uppercase and one for lowercase. However, the 5 allographs of G & g are not separately encoded, and instead are mapped to either the of the 2 character encodings (upper or lower). Then an unlimited number of typefaces can represent those 5 allographs with an unlimited number of glyphs. In Arabic there are 4 encodings per grapheme (beginning, middle, end or standalone). Given all the variations in languages, it's impossible to create 100% consistency. For example, these dashes:

- – — are assigned 3 separate encoding numbers (45, 8211, 8212) despite being minor variations. Whereas the 5 allographs for the grapheme g are assigned just 2 despite their greater variation. Unicode is responsible for the official assignment of encoding numbers.

Writing System is a set of graphemes and glyphs for recording a language. For example the Latin Alphabet is a writing system which is used to record English, Spanish, Italian, Swedish and dozens of other languages. Different languages may have a different number of graphemes, drawn from a similar glyph set. For example, Spanish uses ñ as a separate grapheme, whereas English does not. Different writing systems can include alphabets, such as Latin, Greek and Cyrillic. Other writing systems are not alphabets. Chinese Hanzi is Logographic, where glyphs represent whole words. Hebrew and Arabic are considered Abjads not alphabets. Abjads have symbols that only include part of the word, such as consonants, whereas other parts such as vowels can be left out or indicated by supplemental diacritical marks or overlaid over each other to form more complete concepts. Additionally there are other writing systems where glyphs represent syllables (also classified as abugidas or syllabaries).

Diacritical Marks—lines, dots, or squiggles that are added to glyphs to indicate pronunciation, stress, joining vowels, or other characteristics. They can appear above or below a letter, or within the letter or between two letters.

Computer Typeface/Font—is a table which stores definitions of glyphs—it organizes glyphs by encoding. Font files can also contain coding blocks or instructions which can adjust glyphs based on various situations, enabling glyphs to be made bold, italic, etc., or to oversee more complex runtime decisions such as combing multiple characters into single character ligatures (ex: æ) or other letter swaps which are common in languages such as Arabic where letter position alters glyph selection. Most typefaces are mono-color. Although glyphs can be converted to any color for display in a particular word, the font table usually contains no color definition and it's up to the user to alter any shape to any color. In other words, there's not a color defined in the font table for the letter A and another for B. There's no mapping of colors to glyphs, graphemes or encodings within the font file. Modern Typeface file formats do allow glyphs to specify color information, however multiple companies had competing formats and did not agree on a standard until 2016, when Adobe's Open Type-SVG format emerged as the recognized standard within .otf files. However, in practice, not all software implements the new color standard.

Perception—is the process of converting sensory detection into a conscious experience. Visual Sensory detection begins when light enters the eye. It is generally believed that Conscious Experience begins when information from the sensory detection makes its way to the cerebral cortex and attaches to specific memories. For example, light from a banana enters the eye. A discrete time later, a memory of a previous banana is activated in the cerebral cortex. Perception is all the steps going from the eye and connecting to that memory. These include at least the following:

Perception Steps which precede 'Conscious Experience':

- sensory detection (eye movement, focal & peripheral reception, retinal stimulation)
- sensory measurement (optical processing in a section of the brain that is not conscious)
- search/match previous memories:
  - a. Comparison to determine similarity of current sensory measurement to past sensory measurements;
  - b. The weighing of multi-dimensional comparisons (finding the best or top few matches).
- The blending and reconciliation of memories into a consistent depiction.

Additionally Perception depends on the following which occur before and after sensory detection and measurement:

- memory formation
- memory linking (forming relationships between memories)
- memory compression of duplicate or largely similar info
- memory consolidation (abstraction of multiple instances into fewer concepts)
- memory deletion.

Dyslexia—is a condition in which the perception of text is distorted in some way. Glyphs can attach to the wrong memories creating an experience that is, in effect, an optical illusion. Follow-up perceptions can attach to alternate memories, creating the experience that the glyphs are changing from moment to moment. Glyphs can appear rotated or flipped.

Examples herein present various multicolored fonts, each comprising a table of glyphs which includes color information and where necessary other tables and code blocks necessary to fully implement writing systems. Various examples further describe the process of converting a standard mono-color font into a multicolored font with the goal of reducing the effects of Dyslexia. The introduction of color can affect each of the steps of perception listed above. For some people the search for memories of glyphs by shape alone is not providing enough dimensions of information for the steps to eliminate similar shapes, thus creating false experiences. Adding more dimensions of comparison per sample of text, such as hue and light intensity, can serve to distinguish similar shapes and can thus aid the perception process resulting in more accurate experiences with fewer illusions, mirrors, and other cascading effects.

More generally dyslexia text conversion is the process of developing a multicolor font by altering standard fonts for maximum perception by assigning or altering shapes and/or colors so that glyphs are sufficiently uniquely identifiable from small perception samples. Dyslexia text conversion additionally provides user tools to alter text by adding space between letters words or lines, or other aides such as separator lines which reduce perception errors. This process results in a multicolor font that aids in perception and comprehension for both Dyslexics and non-Dyslexics.

Example processes for developing such multicolor fonts are presented in the sections that follow along with various considerations and examples.

Consider Encodings Relevant to the Language. This includes Allograph sets such as, uppercase, lowercase, shape extenders: diacritical marks and similar symbols add-ons (accents, umlauts, carets, etc.), numbers and/or symbols.

Strive for Consistency Across Languages. Where characters are similar to other languages (for example, numbers are the same in most languages), show those in the colors already established for multicolor fonts for other languages, as these should be kept consistent.

Color can be implemented independent of Shape Optimization. Standardized color patterns can be applied to pre-existing shapes in, e.g. typefaces such as Gothic, Arial, Calibri, Comic Sans or any other standard or custom font. FIG. 3K shows the application of dyslexia conversion colors to an existing stylized logo, without altering the shapes of the original glyphs.

Shape Optimization. However in additional to color, shape can be optimized and work together with color to improve distinction. The process of optimizing shape can include determining the best allographs and glyphs, employing the following considerations:

Default typefaces for Android and iPhone. These are by far the standards that most people have become used to. While some letters have multiple allographs historically, if those allographs didn't make it into the default typefaces for mobile devices, they are or will become less relevant. For example, the script versions of the letter G in FIG. 3C are likely no longer recognized by young students. So the bias for allograph selection is towards the device defaults.

Bias Towards Sans Serif Fonts. In general, letters having a common style with each other actually reduces identifiability. One way to understand this is that measurements can be divided into "signal" or "noise". Signal is a measurement that helps the identification's search process by mapping to a unique solution. If at the end of processing any bit of information, the number of potentially matching choices is fewer, and still includes the correct choice, then that information can be thought of as a signal. Everything else is noise-either counter productive or a waste of time. For example, consider serifs. Serifs are slight projections finishing off a stroke of a letter in certain typefaces. Processing the 3 serifs pointed to in FIG. 3E does nothing to separate these letters from each other, since they all have the same element. Therefore they are considered "noise"-extra processing work for no gain. In contrast, as in FIG. 3F, if only some glyphs had serifs, then serifs would be signal, as they would then serve to eliminate some choices. So if the shapes in 3F were consistently used, the identification of a serif would only point to the memory of an F glyph and eliminate the E and T glyphs. Similarly, the lack of a serif would eliminate the F and point to E & T.

All Style is Noise. The concept of style is that different things should be joined by common elements. The concept of identification is that things should be separated by distinct elements. Glyphs have elements such as line thickness, shape, color, angles, curves, size, rotation, etc. The more common elements, the more noise, as these serve to join things together, not distinguish them. The serifs In FIG. 3E worsen the signal-to-noise ratio because they add 12 shape elements for perception to process, yet do nothing to narrow choices. In contrast, the LACK of style can add distinction as in FIG. 3F. In this example, the presence of the serif in the F immediately eliminates the E and the T and is therefore a signal and the lack of a serif would likewise eliminate the F. The diagonals and uneven thickness of the lines of the T also eliminates its competitors. In the absence of color, one could test wild variations of shape style with dyslexics. Of course this could produce very ugly typefaces, but it could add distinction, allowing tiny visual samples to be sufficient to separate letters. FIG. 3G, shows letters in Arial, the default sans serif typeface for Android Phones. These letters have a high amount of noise because they are similar shapes, line thicknesses, angles, etc. The noise is a function of the basic allographs themselves, as the shapes evolved through history to be quite similar. FIG. 3H shows an example which is even more noisy. It has the same allograph problems, plus serifs. A few serifs add signal because they are not all identical, but overall the serifs add much more noise. The example of FIG. 3I adds more signal-they are all quite unique and even small samples of each letter could serve to eliminate most others. However this font could be viewed as being quite ugly. Additionally, to achieve sufficient shape distinctions, a font would be in conflict with shapes seen out in the world (on signs, products, etc.) and this could increase learning and errors in a different way. In contrast, color variations can be seen as largely supplemental to uni-color text shapes seen in public.

Consider Shape Variations. Of course more subtle options could be selected than the ones in FIG. 3I, but small shape differences are hard to see on mobile devices, which are the bulk of reading. Examples of shape and other variations include:

- Stripes across strokes
- Stripes or outlines along strokes
- Gradients
- Differing stroke widths per stroke or variable within a stroke
- Angled strokes
- Swapping curves and straights
- Altered angles
- Varying widths of overall shapes
- Super or sub scripting (beginning off the baseline)
- Altering heights or variable heights
- Variable height ascenders
- Variable overall letter sizing
- Rotations
- Intermittent use of selected Serifs
- Tricks to suppress mirrors and rotations such as providing a consistent rotational indicator such as underlining of words, or corner markers of a different color
- Coloring the blank space between words
- Background color assortments other than white
- Fixed point fonts, increasing the utility of the brain's word width measurement distinguish words with varying letter counts
- Colored Serifs Considering the factors above, the most robust designs employ both shape and color—with color being the primary driver of distinction (signal). The various examples herein adhere to the following principles, 1—Use a sans serif font to avoid unnecessary noise.
2—Begin with a typeface very similar to the ones mobile devices have made ubiquitous.
3—Avoid making shape changes that are not in common usage, so as to continue shape harmony with text seen in public.
4—Examine very well known allographs selecting a unique mix where possible to avoid mirrors. For example, 6,9 are mere rotations, whereas 6,9 are different shapes.
5—Select shapes from among well known allographs with the intention of avoiding minor conflicts. While some minor adjustments are hard to utilize at small point sizes, they may be worth making in conjunction with color to provide additional differentiation. For example, some common allographs of the number 7 add a slash to distinguish it from a 1.
6—Design a slightly larger glyph per point size. For example, when a 12 point font is selected, you don't always get the same size letters. Different typefaces can vary by as much as 10 or even 15%. Tests on readability suggest that larger shapes are easier to read. Therefore, without being noticeably out of line with what's expected, designs can err on the high side. This helps with many phone apps where changing the point size is made difficult, but slightly larger sizes can be built into the letters themselves.

FIG. 3J presents an example of shape selections with colors along with notes that discuss possible shape considerations. Further components of glyph conflict analysis are discussed in the sections that follow.

Conflicting Single Glyphs. A chart of shape conflicts is presented in FIG. 4A. The process of discovering shape conflicts begins by laying out all Glyphs and organizing them by major features. Loops, curves, straight verticals, horizontals, diagonals or any noticeable features. Glyphs can be considered to conflict if they are visually similar along many dimensions. For Example, Overlays—these are the most basic conflicts such as: EF, COQ0 or Il1

Rotations, or mirrors such as: dbpq, rnhum, 69 overall "busyness":, such as % &@ga

Conflicting shapes are placed in vertical strips or near each other to the left or right. All letters have some similarity to multiple letters, not just their nearest neighbors. Because the similarities are along many dimensions, it's impossible to come up with a perfect representation, but this chart outlines many common problems. Some common glyph conflicts are isolated and presented in FIG. 4B. A similar shape conflict analysis is presented for Thai glyphs in FIG. 8A.

Conflicting Pairs or Groups. Using a spreadsheet, letter pairs are examined for conflicts with each other and with single glyphs. In addition to overlays and rotations, dyslexics may discount space, so objects should be examined with the space between letters nearly closed. Conflicts are highlighted in yellow in FIG. 4C. This is just a sample, as all encoded pairs in a writing system are examined (upper and lower letters, numbers, punctuation, etc.) Pairs with visual conflicts are put through a computer program which checks vocabulary words and large blocks of texts and reports on the actual frequency of the occurrence of conflicting pairs and groups. Some common paired conflicts are isolated and presented in FIG. 4D.

The dyslexia conversion process distinguishes these shape conflicts by color. Example processes for selecting colors are described in the discussions that follow.

FIG. 5A presents a representation of how users detect and measure light. Not all users detect light in the same way. There are many more frequencies of light than can be detected and processed by any animal. Instead, animals greatly simplify light perception. First they exclude the bulk of frequencies and then batch the rest into 1-4 ranges. Most humans batch light into 3 ranges, centered around red, green and blue. However, some users have expanded color with 4 ranges and others diminished color with just any 2 of the standard 3. The batching system compresses away most of the detail which could be detected-entire ranges and all their detail is instead summed into just one value per batch. Even users with the highest resolution (those with 4 ranges), are only detecting a small fraction of the detail that's detectable by machine. The many colors we perceive are a result of the system calculating ratios between the few values it gets.

All commercially available consumer screens emit light designed to trigger the 3 detectors present in most human eyes (Red, Green & Blue). Cameras don't measure, and monitors don't display all the spectral values present in the light of objects. Instead they opt to mimic the limited spectrum compression techniques that most humans use.

Colors that are distinct for users with normal 3 color vision may be indistinct for users with only 2 color vision. FIG. 5B presents an example of shape conflicted glyphs P & R which are assigned colors that are distinct for 3 color users, but become indistinct for 2 color users. FIG. 5C shows further examples.

There are competing requirements. Personal devices, such as cell phones, allow users to enjoy custom settings and make use of the widest amount of color information appropriate for them. However a single standard is easier to implement as a public accommodation, as with printed educational materials, SAT and other tests, signs, etc. The process outlined herein provides tools such as those in FIGS. 6A-6I to examine the tradeoffs and select the maximum use of additional dimensions of 3 color information for the majority with the least diminishment for those with color impairment.

Light has multiple dimensions of information and there are multiple models used to describe color. The foregoing explanation discussed Hue—the quality that distinguishes, red, purple, yellow, green, orange, etc. Light also has another property called intensity, also referred to as brightness or luminosity. FIG. 5J shows the 'purest' hues along the labeled center line. The colors along this line have no black, white or gray and are also referred to as the "highest saturation". Above and below, the saturated colors are mixed with black or white. Not shown, but another dimension could show the colors mixed with both black and white at the same time (various shades of gray).

Not every color is equally useful for the purpose of dyslexia conversion. There is a lot of color theory that analyzes how humans perceive and interpret color and engineers who utilize color often find there's more to it than it seems at first glance. Makers of paint, film & projectors, light bulbs, TVs & monitors, image compression software, computer graphics, sunglasses and many other fields have done a lot of work to maximize our subjective experience of color. In various examples, color selections can be based on color theories, the capabilities of various screens, the practical usage of text within media (choices of digital content makers such as text size, overlay of text on assorted backgrounds), and knowledge of perception systems and their complex steps.

For our purposes, I want to focus on 2 primary dimensions of information that characterize color and can be used for communicating information into our perception systems. These are Intensity and Hue. In addition to the information presented above regarding hue, selecting the proper color to improve glyph identification also involves consideration of intensity. A human eye's retina has approximately 91 m rods which detect intensity and only 4.5 m Red, Green and Blue cones which detect hue. Compression schemes like jpeg work by removing more hue information than intensity, knowing that intensity is a more important distinction than Hue. Our perception calculates hue as the relative balance between the Red, Green and Blue.

Intensity alone could be used to provide a dimension of information as shown in FIG. 5D and further, this intensity dimension could be used independently of any hue dimension as shown in FIG. 5E. Also consider that the 3 Primary colors produced by computer screens are not perceived as equal in intensity. As shown in FIG. 5F, "Pure Blue" is perceived as much darker than "Pure Green", which is perceived as quite light. However, there's no agreed upon formula to exactly measure the intensity, as it's subjective to individual perception systems. Likewise, various software programs have adopted slightly different formulas resulting in slightly different grayscale conversions as shown.

At very small font point sizes typical of modern devices, many colors blend together and the intensity becomes more important than the hue. However relative intensity is subjective. For example, in large swaths, the brown and purple squares presented in FIG. 5G are quite different. But in small text, such as with the letters g and y, some users report that they are indistinct as only the intensity is detected and is similar. Some even report that brown is darker, while others purple. And of course this can vary substantially on different screens or software. FIGS. 5H and 5I present additional examples.

Therefore, while in theory there are a huge number of colors to choose from and every grapheme could be made a separate color, in practice, a vastly smaller array of colors is distinguishable in small text. There are perhaps only 3-4 useful intensity shades that are distinguishable against a white background and similarly, there are only 7 major hue groups. But even then, some combinations of hue and intensity will become indistinct.

Useful Color Set for Dyslexia Text Conversion. The examples that follow are based on text over a white background. Further examples may use the techniques described herein but yield different results for 'dark mode' versions of text intended to appear over a black or other dark background. In FIG. 5J the center (show with a horizontal gray line) is the spectrum fully saturated (pure hues, no black or white). Above the gray line, colors have some black and below the gray line colors have some white. The figure shows a curved black and a curved white line going from left to right. These lines represent the approximate boundaries of the color range which is useful for text on a white background. Colors below the white line won't have sufficient contrast to easily distinguish text from a white background. Thus the effective band for color text should be skewed towards the darker side of the spectrum. Colors above the black curved line are not useful for text because they are hard to tell from each other and from black. And since pure black is the best contrast from a white background, these dark infused hues add no advantage over black. Thus the effective Useful Color Set is Black plus the middle band between the white and black boundary lines of FIG. 5J. The FIGURE is 2 dimensional. A 3 dimensional picture could additionally show hues mixed with both black AND white (gray). That picture would include some useful colors as well. Thus the full Useful Color band, if shown in 3D would form a 3D tube, and not just the flat 2D band shown in FIG. 5J. The boundaries of the range can be somewhat subjective and depend on the size of text, the device and even the software rendering the text. So in practice, the best range to assign glyphs may be even tighter than shown, in order to leave a margin for error for other factors.

FIG. 5J also presents two examples of text which have been color converted using colors outside of the useful band-both above and below. When the colors are shown in large squares, they are easily distinguished, even though they are outside the specified band. However, when used to color small point size text they are much less distinct. Colors which are too light are hard to distinguish from the white background and colors which are too dark while easy to see against the background, are hard to tell from each other.

Black text is the easiest color to distinguish over a white background because it provides the maximum possible contrast. However, mono-color text provides no useful signal to distinguish one glyph from another. The use of any color other than black will, of necessity, reduce the ease with which black & white maximizes contrast for perception systems. The goal is to keep the contrast as high as possible while also maintaining distinction.

FIG. 5K shows an example of colors vs the frequency of graphemes in English. As applied in this example, the black and other darker colors are used for the more frequent letters. However, color application cannot simply be applied darkest 1st, next darkest $2^{nd}$, etc, because distinction from each other is the bigger goal compared to high contrast over the background. For example, in FIG. 5L, a common conflict group consisting of glyphs runhm is presented. The most frequent, n, is assigned black. But assigning the next most frequent, r, to dark blue would be so close in intensity as to loose distinction from n. The closest mirror to n is u. This is assigned the lightest color to make the conflict clear, while minimizing the reduction in background contrast.

FIG. 5M shows 3 versions of the Latin Alphabet, with colors applied from the Useful Color Set. This figure shows the trade-off between Contrast against the background, vs Saturation (and contrast with each other). The first version, uses colors closer to the white curved line which bounds the band shown in FIG. 5J. The $2^{nd}$ Version is in the middle, and the $3^{rd}$ version is closer to the black curved line. Weighting the contrast of text based on the overall letter frequency we can calculate the contrast from the white background at 67.6%, 73.5% and 76.1% respectively (vs Black at 100%). As the contrast goes up vs the background, the saturation (distinction between colors) goes down.

Color Range at Different Line Thicknesses. Thicker Text allows for color perception to improve, allowing a slight expansion of the useful band, both lighter and darker, but especially towards the lighter end. A useful multicolor font can be made slightly bolder than most fonts for this reason, and some lighter color glyphs can be rendered a bit thicker than the darker letters. Letters in Cyan (light blue) can be especially thickened.

Hue Selections. FIG. 5N demonstrates, that even within the Useful Color Band, there are hues that are more distinct that others. These are the Primaries (Red, Green, Blue) and the mid-way points between the primaries (Yellow, Cyan, Magenta). However, Yellow is too light on a white background and Cyan is often too indistinct from Green. Magenta is the most distinct other than Black. Red seems like it should be the most distinct but can be hard to tell from Orange or Magenta at small point sizes. Most letters will select colors from along these Primary and Primary Blend lines.

Color Selections. Single Color Letters can be placed at differing locations in the color spectrum as shown in the example of FIG. 5P for which an RGB color space is shown. Some letters are Dual-Color and use an outer color from within the Useful Color Set. The best contrast is to have an outer color make use of a darker color so as to contrast with a white background and a second inner color that is lighter to contrast with the first. Since the inner light color is contrasting with its darker partner and not the white background, the enclosed color can be selected from below the white band line. Two color letters are shown in FIG. 5P placed next to their inner color to demonstrate their positions as exceptions below the white band, expanding the effective range. The Hues are mostly along the Primary and Primary Blend lines.

Color selections are dependent on the color space. FIGS. 5P and 5Q show the RGB color space (3 Colors, normal retina) vs the Deuteranopia color space (2 Colors-retina lacking some or all green cones). As shown in FIG. 5A, the RGB color space is compressed verses a full spectrograph, and Deuteranopia compresses it even further. We can easily see some hue distinctions that exist with the RGB color space no longer exist in the Deuteranopia color space. For example, glyphs for H & K are very distinct in RGB but in Deuteranopia they sit over nearly identical hue and intensity points. Additional tools described below help ensure that this lost distinction will have the lowest impact on the most important contrast groups.

Other Consideration of Color. In English, lowercase letters make up 96%-98% of usage and uppercase just the remaining 2-4%. Therefore, resolving lowercase letter conflicts are more important than upper, although an attempt should be made to accommodate all. For example, these upper and lower glyphs of n have different conflicts:

n conflicts with r, h, u, m

N conflicts with Z, M, V

Single vs Dual Color Letters. There are not enough distinct primary colors to make every letter unique. While there are a lot of colors in theory, at small point sizes many blend into each other on many devices. If all letters were dual colors, we could create unique combinations for every letter. However, doing so may, in some circumstances, be visually less appealing and potentially distracting. In various examples shown in FIG. 5R, 2nd colors are employed for graphemes where all allographs have enclosed loops (e.g., AaBbDdPpQqOo).

Enclosed Areas as Visual Anchors to Resolve Anagrams and create Whole-Word Signatures or "sight words". Letters with enclosed areas are 25.7% of all letter occurrences in English text. Assigning these dual colors makes them visually more distinct than the other letters. FIG. 5R shows that these dual-color letters create visual signatures for whole words. This is especially useful in preventing mirrors and anagram confusion as presented in FIG. 5S Perception and memory are recording lots of measurements which are separate from simply the shapes of individual letters. For example, if you look at a page of text and try to pick out the longest or shortest words, or bold or yellow highlighted words, you could probably do this without necessarily reading the words. Identifiable signatures require some uniqueness—the ability to quickly detect a measurement which separates items. If all of the text on a page is highlighted it's the same as none—a 'signature' is created by the differentials. Sprinkling some bold dual-color letters throughout the alphabet allows most words to take on unique signatures which are separate from individual glyph shapes. Memories are likely to record such whole-word signatures. Consider the bold letter b in the anagrams brag and grab. The b's position at the beginning or end of those words can be recorded as a separate memory measurement, which is distinct from remembering the grapheme's that compose the word. If you see an animal with distinct markings, those are remembered without necessarily giving the markings names. They simply form a visual signature—a collection of measurements that are stored as a cluster together. The brain's normal cycle is to compress similar things. A factor which contributes to some dyslexias is that the mere rearrangement of similar letters may not be enough distinction to prevent this ongoing compression. Intermittent (not overused) inclusion of bold colors creates memories which are harder to compress because they have additional distinct measurements. This can be especially important in anagrams and with dyslexics who are prone to mirror writing.

Use of Two Colors for Shape Extenders such as Diacritical Marks and Other Symbol Add-ons (accents, umlauts, carets, etc.). If the number of shape extenders used in a language is extremely minor, such as Spanish with N & Ñ, separate colors can be used, treating these as we would any other shape variation. Nn & Ñ ñ are considered are separate graphemes and can be treated as such, and provided their own colors. However, where shape extenders are used to create permutations, as shown in FIG. 5U, rather than new letters, the multicolor typeface can give the shape extenders their own consistent colors using the most distinct hues possible. The most common or the most likely conflicted extender could be assigned magenta (the most distinct color), Shape extenders can be larger and thicker than normal to allow colors to be seen clearly. Compare the vowels in Hungarian and their permutations using 3 diacritical marks shown in FIG. 5U. While the marks are still subtle, with a multicolor typeface contrast is vastly improved compared to all black glyphs.

The creation of Order for Allograph Sets (for example, upper and lower). In various examples, color order is created among Allograph Sets. This is an additional benefit distinct from dyslexia conversion and instead applies to all language learners. Languages are filled with exceptions to rules. In English, some graphemes have similar shapes for their different allographs sets but others don't. For example P & p are similar shapes, but E & e are not. Since their similarity is not detectable visually, the similarity of E & e is created via each glyph's connection to unseen relationships-joint memories to things like shared vocalizations, meanings and positions on alphabet charts. The similarity must be memorized in relationship to other memories, but can not be detected via direct visual measurement. An example of letters in a multicolor font is presented in conjunction with the table of FIG. 5V. In this example, graphemes are split into two groups, one where the allograph sets are similar by color and not by shape and a second group where they are similar by both color and shape. This multicolored typeface applies the same color scheme to all allographs of a grapheme. Glyphs of the same grapheme can now match by color, even if history has not endowed them with a consistent match by shape. Arabic has no upper and lower sets but instead has 4 allograph sets which relate to the letter's position within a word (beginning, middle, end or stand alone). FIG. 8B presents an example of how the first few graphemes of Arabic might be colored to align allograph sets.

FIG. 5W shows an example of all glyphs in the Latin Alphabet assigned to one or more colors.

Figure 6I:
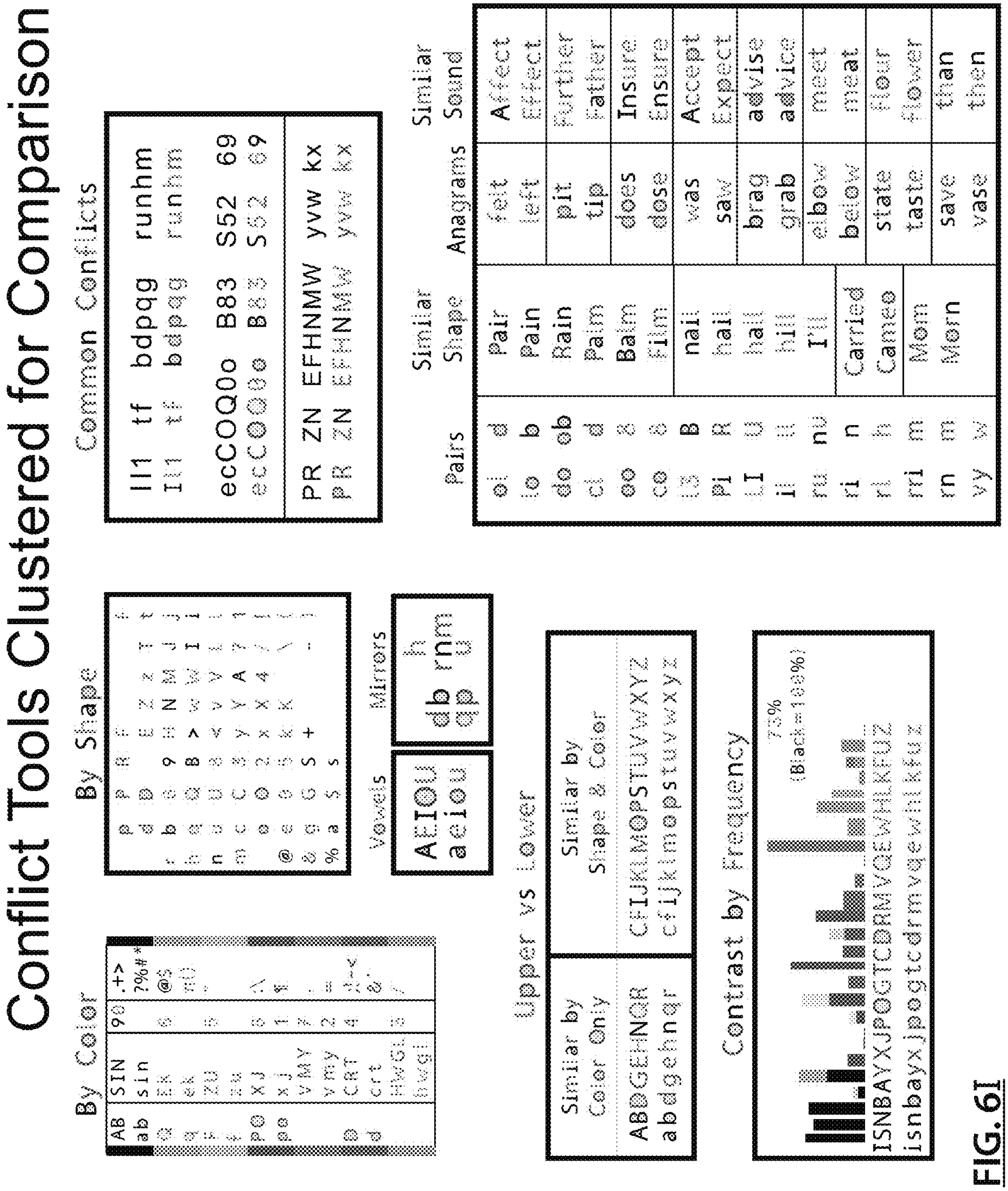
Figure 6J:
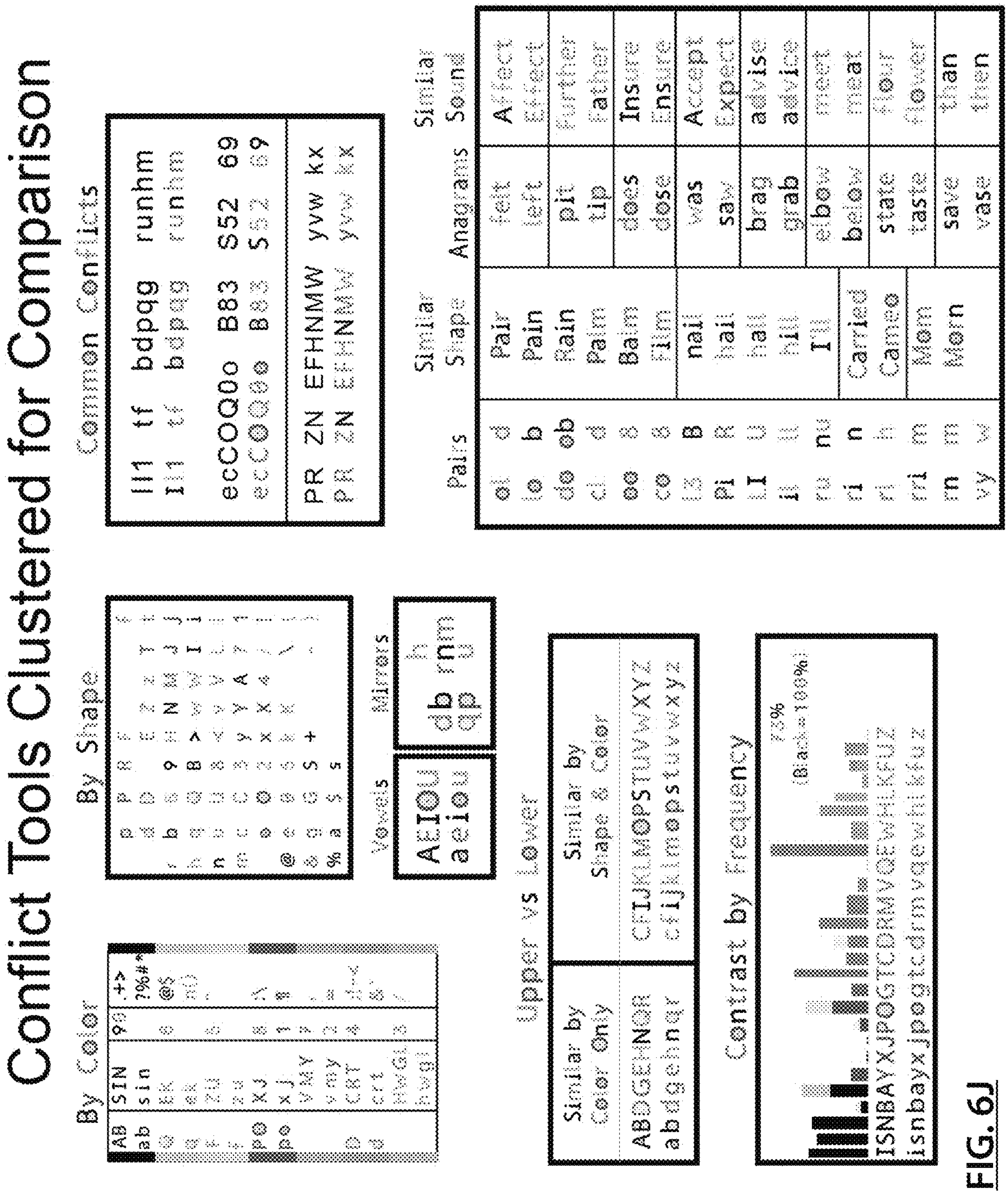

6A-6I are a series of tools that are used to cross check conflicts in a variety of ways. FIGS. 4A-4D examined B&W single glyph and pair conflicts. FIGS. 6A-6D revisit the same conflicts with added color, in order to confirm that conflicts have been adequately resolved for both 2 color and 3 color users. FIG. 6E shows an example of all glyphs in the Latin Alphabet sorted by their major color group. The first column presents letters with dual colors, categorized by their outer color. This chart is used to confirm that characters within the same hue do not conflict by shape. FIGS. 6F-6H provide additional cross checks. FIG. 6I provides many of the same tools, but clustered onto a single page which can help to more easily identify and resolve conflicts. FIG. 6J is the same in 2 Color.

User Controls—Dyslexia is a personal perception problem and as such improvements in perception can be made by providing users with the ability to tailor input using custom settings. In order to create a single standard which might be used for public accommodations such as printed educational materials or exams, common hues are preferable. However variable contrast/saturation, letter spacing, word spacing, fixed width glyph spacing, line spacing, glyph boldness, colored spaces, rotational markers and other features can be made variable and under user control on personal devices.

Variable Contrast Levels. FIG. 7A presents an example of colored text using a common hue standard, but 3 different contrast levels, similar to those detailed in FIG. 5M. Additional Contrast Levels are selectable at the discretion of the user. Dyslexia and ADHD are often linked together. Color distinctions help prevent misidentifications, and thus reduce unnecessarily having the mind drift in the direction of misidentified words and their associated memories. However, colors on their own can trigger memories which likewise cause the drifting of attention to unintended associations. Testing has shown that while learning, brighter colors are preferred but reduced colors are preferred once the color associations are memorized. Thus, it can be important that users control the amount of brightness to blend these concerns.

Variable Line Separation—Dyslexic users often have problems with eye tracking. This can result in losing one's place while reading a line and the diminished ability to move the eye reliably from the end of one line to the beginning of the next. This deficiency can be aided by a variable line separator. FIG. 7B presents an example of text which has been separated by a horizontal line, at the direction of a user setting, each 4$^{th}$ line. Having too many separators might replicate the problem the users are already having, creating too many things to reliably follow as the eye moves across the page. But having just a few lines creates a more stable anchor for the eye to position itself. Additionally, giving the users the option to have the lines be different colors makes them differentiable. Combined, these create an improved eye tracking system. As an example, on FIG. 7B finding "The 2$^{rd}$ row under the green line" is far easier than finding line 14. That improved ease is the same even if one is silently reading to oneself and loses their place.

While the foregoing has focused on text conversion using a font where both color and shape have been optimized for dyslexics, the processes and procedures described herein can be applied to stylized shapes, logos and/or other fonts utilizing any subset of the conversion process. For example, the logo shown in FIG. 3K is presented, before and after dyslexia conversion to a multicolor format. In keeping with the dyslexia conversion process, glyphs with the very lightest colors, cyan and green ("zze"), have been made slightly bolder. All other shapes are retained in their pre-conversion stylized format. Thus a selected subset of the dyslexia conversion process has been employed.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c".

In either phrasing, the phrases are to be interpreted identically. In particular, “at least one of a, b, and c” is equivalent to “at least one of a, b, or c” and shall mean a, b, and/or c. As an example, it means: “a” only, “b” only, “c” only, “a” and “b”, “a” and “c”, “b” and “c”, and/or “a”, “b”, and “c”.

As may also be used herein, the terms “processing module”, “processing circuit”, “processor”, “processing circuitry”, and/or “processing unit” may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a “start” and/or “continue” indication. The “start” and “continue” indications reflect that the steps presented can optionally be incorporated in or otherwise used in conjunction with one or more other routines. In addition, a flow diagram may include an “end” and/or “continue” indication. The “end” and/or “continue” indications reflect that the steps presented can end as described and shown or optionally be incorporated in or otherwise used in conjunction with one or more other routines. In this context, “start” indicates the beginning of the first step presented and may be preceded by other activities not specifically shown. Further, the “continue” indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term “module” is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

As applicable, one or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition-requires "artificial" intelligence—i.e., machine/non-human intelligence.

As applicable, one or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis or other high speed required by the machines that generate the data, receive the data, convey the data, store the data and/or use the data.

As applicable, one or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

As applicable, one or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

As applicable, one or more functions associated with the methods and/or processes described herein can be implemented in a system that is operable to electronically store digital data in a memory device. Such storage cannot practically be performed by the human mind because the human mind is not equipped to electronically store digital data.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computing entity comprising:

at least one computing device that includes a processor; and a memory that stores executable instructions that, when executed by the at least one computing device, cause the computing entity to:

receive media data that includes input text having characters of a set of characters;

receive a dyslexia conversion indication; and generate, via a dyslexia conversion tool, responsive to the dyslexia conversion indication and based on the input text, dyslexia converted text for display via a display device, wherein the dyslexia conversion tool performs a dyslexia conversion of the input text to a colored dyslexia font;

wherein the colored dyslexia font partitions the set of characters into subsets of non-dyslexia-conflicting characters, wherein a union of the subsets of non-dyslexia-conflicting characters is the set of characters, wherein an intersection between each pair of the subsets of non-dyslexia-conflicting characters is a null set, and wherein each of the subsets of non-dyslexia-conflicting characters is assigned to at least one of a plurality of colors;

wherein the dyslexia conversion tool maps each character of the input text to a corresponding one of the subsets of non-dyslexia-conflicting characters; and wherein the dyslexia conversion tool renders each character of the input text in accordance with the at least one of the plurality of colors assigned to the corresponding one of the subsets of non-dyslexia-conflicting characters.

2. The computing entity of claim 1, wherein the set of characters includes a plurality of allograph sets, each of the plurality of allograph sets corresponding to a grapheme, and each of the plurality of allograph sets having a plurality of glyphs and wherein partitioning the set of characters into the subsets of non-dyslexia-conflicting characters assigns the plurality of glyphs of each of the plurality of allograph sets to a single one of the subsets of non-dyslexia-conflicting characters.

3. The computing entity of claim 1, wherein partitioning the set of characters into the subsets of non-dyslexia-conflicting characters assigns each glyph from a group of shape-conflicting glyphs into differing ones of the subsets of non-dyslexia-conflicting characters.

4. The computing entity of claim 1, wherein the plurality of colors are each different.

5. The computing entity of claim 1, wherein at least one of the subsets of non-dyslexia-conflicting characters is assigned to two or more of the plurality of colors, and wherein each character of the at least one of the subsets of non-dyslexia-conflicting characters is rendered in the two or more of the plurality of colors.

6. The computing entity of claim 1, wherein the executable instructions, when executed by the at least one computing device, further cause the computing entity to:

overlay a background on the media data; and overlay the dyslexia converted text on the background.

7. A method comprising:

receiving media data that includes input text having characters of a set of characters;

receiving a dyslexia conversion indication; and generating, via a dyslexia conversion tool, responsive to the dyslexia conversion indication and based on the input text, dyslexia converted text for display via a display device, wherein the dyslexia conversion tool performs a dyslexia conversion of the input text to a colored dyslexia font;

wherein the colored dyslexia font partitions the set of characters into subsets of non-dyslexia-conflicting characters, wherein a union of the subsets of non-dyslexia-conflicting characters is the set of characters, wherein an intersection between each pair of the subsets of non-dyslexia-conflicting characters is a null set, and wherein each of the subsets of non-dyslexia-conflicting characters is assigned to at least one of a plurality of colors;

wherein the dyslexia conversion tool maps each character of the input text to a corresponding one of the subsets of non-dyslexia-conflicting characters; and wherein the dyslexia conversion tool renders each character of the input text in accordance with the at least one of the plurality of colors assigned to the corresponding one of the subsets of non-dyslexia-conflicting characters.

8. The method of claim 7, wherein the set of characters includes a plurality of allographs each of the plurality of allograph sets corresponding to a grapheme, and each of the plurality of allograph sets having a plurality of glyphs and wherein partitioning the set of characters into the subsets of non-dyslexia-conflicting characters assigns the plurality of glyphs of each of the plurality of allograph sets to a single one of the subsets of non-dyslexia-conflicting characters.

9. The method of claim 7, wherein partitioning the set of characters into the subsets of non-dyslexia-conflicting characters assigns each glyph from a group of shape-conflicting glyphs into differing ones of the subsets of non-dyslexia-conflicting characters.

10. The method of claim 7, wherein the plurality of colors are each different.

11. The method of claim 7, wherein at least one of the subsets of non-dyslexia-conflicting characters is assigned to two or more of the plurality of colors, and wherein each character of the at least one of the subsets of non-dyslexia-conflicting characters is rendered in the two or more of the plurality of colors.

12. The method of claim 7, further comprising:

overlaying a background on the media data; and overlaying the dyslexia converted text on the background.

13. The method of claim 7, wherein the set of characters include upper and lower case letters, numbers, punctuation and symbols.

14. A non-transitory computer-readable storage medium includes a memory that stores executable instructions that, when executed by at least one computing entity, cause the at least one computing entity to:

receive media data that includes input text having characters of a set of characters;

receive a dyslexia conversion indication; and generate, via a dyslexia conversion tool, responsive to the dyslexia conversion indication and based on the input text, dyslexia converted text for display via a display device, wherein the dyslexia conversion tool performs a dyslexia conversion of the input text to a colored dyslexia font;

wherein the colored dyslexia font partitions the set of characters into subsets of non-dyslexia-conflicting characters, wherein a union of the subsets of non-dyslexia-conflicting characters is the set of characters, wherein an intersection between each pair of the subsets of non-dyslexia-conflicting characters is a null set, and wherein each of the subsets of non-dyslexia-conflicting characters is assigned to at least one of a plurality of colors;

wherein the dyslexia conversion tool maps each character of the input text to a corresponding one of the subsets of non-dyslexia-conflicting characters; and wherein the dyslexia conversion tool renders each character of the input text in accordance with the at least one of the plurality of colors assigned to the corresponding one of the subsets of non-dyslexia-conflicting characters.

15. The non-transitory computer-readable storage medium of claim 14, wherein the plurality of colors are each different.

16. The non-transitory computer-readable storage medium of claim 14, wherein the set of characters includes a plurality of allograph sets, each of the plurality of allograph sets corresponding to a grapheme, and each of the plurality of allograph sets having a plurality of glyphs and wherein partitioning the set of characters into the subsets of non-dyslexia-conflicting characters assigns the plurality of glyphs of each of the plurality of allograph sets to a single one of the subsets of non-dyslexia-conflicting characters.

17. The non-transitory computer-readable storage medium of claim 14, wherein partitioning the set of characters into the subsets of non-dyslexia-conflicting characters assigns each glyph from a group of shape-conflicting glyphs into differing ones of the subsets of non-dyslexia-conflicting characters.

18. The non-transitory computer-readable storage medium of claim 14, wherein the set of characters include upper and lower case letters, numbers, punctuation and symbols.

19. The non-transitory computer-readable storage medium of claim 14, wherein at least one of the subsets of non-dyslexia-conflicting characters is assigned to two or more of the plurality of colors, and wherein each character of the at least one of the subsets of non-dyslexia-conflicting characters is rendered in the two or more of the plurality of colors.

20. The non-transitory computer-readable storage medium of claim 14, wherein the executable instructions, when executed by the at least one computing entity, further cause the at least one computing entity to:

overlay a background on the media data; and overlay the dyslexia converted text on the background.

* * * * *